(12) United States Patent
Raab et al.

(10) Patent No.: US 10,033,231 B2
(45) Date of Patent: *Jul. 24, 2018

(54) SYSTEM AND METHOD FOR PROVIDING WIRELESS POWER TRANSFER FUNCTIONALITY TO AN ELECTRICAL DEVICE

(71) Applicant: POWERMAT TECHNOLOGIES LTD., Neve Ilan (IL)

(72) Inventors: Yoel Raab, Hod Hasharon (IL); Moshe Raines, Ramat Hasharon (IL); Charle Hamisha, Kffar Saba (IL); Itai Sherman, Hod Hasharon (IL); Rotem Shraga, Kiryat Ono (IL); Arye Nudelman, Jerusalem (IL); Ilan Braha, Holon (IL); Charlie Ozana, Or Akiva (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 51 days.

This patent is subject to a terminal disclaimer.

(21) Appl. No.: 15/078,552

(22) Filed: Mar. 23, 2016

(65) Prior Publication Data

US 2017/0025884 A1    Jan. 26, 2017

Related U.S. Application Data

(63) Continuation of application No. 14/311,849, filed on Jun. 23, 2014, now Pat. No. 9,337,902, which is a
(Continued)

(51) Int. Cl.
*H04B 5/00* (2006.01)
*H02J 50/70* (2016.01)
(Continued)

(52) U.S. Cl.
CPC .............. *H02J 50/70* (2016.02); *H01F 38/14* (2013.01); *H02J 5/005* (2013.01); *H02J 7/04* (2013.01);
(Continued)

(58) Field of Classification Search
CPC .................................................... H04B 5/0037
(Continued)

(56) References Cited

U.S. PATENT DOCUMENTS 3,414,796 A    12/1968  Henquet
3,771,085 A    11/1973  Hojo et al.
(Continued)

FOREIGN PATENT DOCUMENTS

EP    0160990 A2    11/1985
EP    0160990 B1     1/1991
(Continued)

OTHER PUBLICATIONS

Liu et al. "An Analysis of Double-layer Electromagnetic Shield for a Universal Contactless Battery Charging Platform", IEEE 2005, p. 1767-1772.
(Continued)

*Primary Examiner* — April G Gonzales
(74) *Attorney, Agent, or Firm* — William Dippert; Laurence Greenberg; Werner Stemer

(57) ABSTRACT

A retrofittable wireless power receiver is disclosed for providing inductive power reception functionality to at least one host device. The retrofittable wireless power receiver comprises a support platform, a secondary inductor operable to couple inductively with a primary inductor associated with a wireless power transmitter; a power reception circuit operable to control inductive power transfer from the primary inductor to the host device, a synchrorectifier, and a near field communication antenna. The retrofittable wireless
(Continued)

power receiver further comprises an array of electrical contacts that comprises a VOUT and GND pair of terminals wired to the sychrorectifier, a DISABLE terminal wired to the power reception circuit and configured to disable power transfer, and a pair of data contacts wired to the near field communication antenna.

20 Claims, 38 Drawing Sheets

Related U.S. Application Data continuation of application No. PCT/IL2012/050544, filed on Dec. 20, 2012, and a continuation-in-part of application No. 12/883,457, filed on Sep. 16, 2010, now Pat. No. 9,136,734, which is a continuation of application No. PCT/IL2008/001641, filed on Dec. 18, 2008.

(60) Provisional application No. 61/578,348, filed on Dec. 21, 2011, provisional application No. 61/598,697, filed on Feb. 14, 2012, provisional application No. 61/655,775, filed on Jun. 5, 2012, provisional application No. 61/673,844, filed on Jul. 20, 2012, provisional application No. 61/699,876, filed on Sep. 12, 2012, provisional application No. 61/064,618, filed on Mar. 17, 2008, provisional application No. 61/071,151, filed on Apr. 15, 2008, provisional application No. 61/129,526, filed on Jul. 2, 2008, provisional application No. 61/129,859, filed on Jul. 24, 2008, provisional application No. 61/129,970, filed on Aug. 4, 2008.

(51) Int. Cl.
  *H01F 38/14* (2006.01)
  *H02J 5/00* (2016.01)
  *H02J 50/80* (2016.01)
  *H02J 50/12* (2016.01)
  *H02J 50/40* (2016.01)
  *H02J 7/04* (2006.01)
  *H01F 27/26* (2006.01)
  *H01F 27/36* (2006.01)
  *H02J 7/00* (2006.01)

(52) U.S. Cl.
  CPC .............. *H02J 50/12* (2016.02); *H02J 50/40* (2016.02); *H02J 50/80* (2016.02); *H04B 5/0037* (2013.01); *H01F 27/266* (2013.01); *H01F 27/365* (2013.01); *H01F 2038/143* (2013.01); *H02J 2007/0096* (2013.01)

(58) Field of Classification Search
  USPC ....................................................... 455/41.1
  See application file for complete search history.

(56) References Cited

U.S. PATENT DOCUMENTS

| | | | |
|---|---|---|---|
| 3,938,018 A | 2/1976 | Dahl | |
| 4,160,193 A | 7/1979 | Richmond | |
| 4,349,814 A | 9/1982 | Akehurst | |
| RE31,524 E | 2/1984 | Hoebel | |
| 4,431,948 A | 2/1984 | Elder et al. | |
| 4,580,062 A | 4/1986 | MacLaughlin | |
| 4,754,180 A | 6/1988 | Kiedrowski | |
| 4,977,515 A | 12/1990 | Rudden et al. | |
| 5,221,877 A | 6/1993 | Falk | |
| 5,278,771 A | 1/1994 | Nyenya | |
| 5,367,242 A | 11/1994 | Hulman | |
| 5,455,466 A | 10/1995 | Parks et al. | |
| 5,455,467 A | 10/1995 | Young et al. | |
| 5,486,394 A | 1/1996 | Stough | |
| 5,528,113 A | 6/1996 | Boys et al. | |
| 5,550,452 A | 8/1996 | Shirai et al. | |
| 5,600,225 A | 2/1997 | Goto | |
| 5,680,035 A | 10/1997 | Haim et al. | |
| 5,713,939 A | 2/1998 | Nedungadi et al. | |
| 5,734,254 A | 3/1998 | Stephens | |
| 5,762,250 A | 6/1998 | Carlton et al. | |
| 5,821,728 A | 10/1998 | Schwind | |
| 5,821,731 A | 10/1998 | Kuki et al. | |
| 5,907,285 A | 5/1999 | Toms et al. | |
| 5,929,598 A | 7/1999 | Nakama et al. | |
| 5,949,214 A | 9/1999 | Broussard et al. | |
| 6,042,005 A | 3/2000 | Basile et al. | |
| 6,127,799 A | 10/2000 | Krishnan | |
| 6,211,649 B1 | 4/2001 | Matsuda | |
| 6,230,029 B1 | 5/2001 | Hahn et al. | |
| 6,396,935 B1 | 5/2002 | Makkonen | |
| 6,436,299 B1 | 8/2002 | Baarman et al. | |
| 6,441,589 B1 | 8/2002 | Frerking et al. | |
| 6,484,260 B1 | 11/2002 | Scott et al. | |
| 6,532,298 B1 | 3/2003 | Cambier et al. | |
| 6,586,909 B1 | 7/2003 | Trepka | |
| 6,624,616 B1 | 9/2003 | Frerking et al. | |
| 6,644,557 B1 | 11/2003 | Jacobs | |
| 6,673,250 B2 | 1/2004 | Kuennen et al. | |
| 6,721,540 B1 | 4/2004 | Kayakawa | |
| 6,731,071 B2 | 5/2004 | Baarman | |
| 6,766,040 B1 | 7/2004 | Catalano et al. | |
| 6,803,744 B1 | 10/2004 | Sabo | |
| 6,825,620 B2 | 11/2004 | Kuennen et al. | |
| 6,888,438 B2 | 5/2005 | Hui et al. | |
| 6,894,457 B2 | 5/2005 | Germagian et al. | |
| D519,275 S | 4/2006 | Shertzer | |
| 7,043,060 B2 | 5/2006 | Quintana | |
| 7,126,450 B2 | 10/2006 | Baarman et al. | |
| 7,132,918 B2 | 11/2006 | Baarman et al. | |
| 7,164,255 B2 | 1/2007 | Hui | |
| 7,180,248 B2 | 2/2007 | Kuennen et al. | |
| 7,180,265 B2 | 2/2007 | Naskali et al. | |
| 7,224,086 B2 | 5/2007 | Germagian et al. | |
| 7,233,319 B2 | 6/2007 | Johnson et al. | |
| D553,852 S | 10/2007 | Brandenburg | |
| 7,278,310 B1 | 10/2007 | Rice et al. | |
| 7,385,357 B2 | 6/2008 | Kuennen et al. | |
| 7,392,068 B2 | 6/2008 | Dayan et al. | |
| 7,405,535 B2 | 7/2008 | Frerking et al. | |
| 7,462,951 B1 | 12/2008 | Baarman | |
| D586,809 S | 2/2009 | Jones et al. | |
| 7,518,267 B2 | 4/2009 | Baarman | |
| 7,522,878 B2 | 4/2009 | Baarman | |
| 7,576,514 B2 | 8/2009 | Hui | |
| D599,735 S | 9/2009 | Amidei et al. | |
| D599,736 S | 9/2009 | Ferber et al. | |
| D599,737 S | 9/2009 | Amidei et al. | |
| D599,738 S | 9/2009 | Amidei et al. | |
| D603,603 S | 11/2009 | Laine et al. | |
| 7,612,528 B2 | 11/2009 | Baarman et al. | |
| D607,879 S | 1/2010 | Ferber et al. | |
| D611,407 S | 3/2010 | Webb | |
| D611,408 S | 3/2010 | Ferber et al. | |
| 8,049,370 B2 | 11/2011 | Azancot | |
| 8,787,848 B2* | 7/2014 | Kielb .................... | G01D 21/00 455/117 |
| 8,847,571 B2* | 9/2014 | Kielb ................ | G05B 19/0423 323/224 |
| 2002/0057584 A1 | 5/2002 | Brockmann | |
| 2002/0158512 A1 | 10/2002 | Mizutani et al. | |
| 2003/0042740 A1* | 3/2003 | Holder .................... | G06F 1/26 290/1 A |
| 2003/0210106 A1 | 11/2003 | Cheng et al. | |
| 2004/0023633 A1 | 2/2004 | Gordon | |
| 2004/0195767 A1 | 10/2004 | Randall | |
| 2004/0203537 A1 | 10/2004 | Yoshida et al. | |
| 2004/0242264 A1 | 12/2004 | Cho | |
| 2004/0261802 A1 | 12/2004 | Griffin et al. | |
| 2005/0007067 A1 | 1/2005 | Baarman et al. | |

(56) References Cited

U.S. PATENT DOCUMENTS

| | | | |
|---|---|---|---|
| 2005/0068019 A1* | 3/2005 | Nakamura | G06F 1/26 323/355 |
| 2005/0083020 A1 | 4/2005 | Baarman | |
| 2005/0130593 A1 | 6/2005 | Michalak | |
| 2005/0164636 A1 | 7/2005 | Palermo et al. | |
| 2005/0169506 A1 | 8/2005 | Fenrich et al. | |
| 2005/0174473 A1* | 8/2005 | Morgan | H05B 33/0803 348/370 |
| 2005/0189910 A1* | 9/2005 | Hui | H01F 17/0006 320/108 |
| 2005/0192062 A1 | 9/2005 | Mickle et al. | |
| 2005/0233768 A1 | 10/2005 | Guo et al. | |
| 2006/0022214 A1* | 2/2006 | Morgan | F21K 9/00 257/99 |
| 2006/0028176 A1 | 2/2006 | Tang et al. | |
| 2006/0043927 A1* | 3/2006 | Beart | H02J 5/005 320/108 |
| 2006/0052144 A1 | 3/2006 | Seil et al. | |
| 2006/0061325 A1 | 3/2006 | Tang et al. | |
| 2006/0071632 A1 | 4/2006 | Ghabra et al. | |
| 2006/0091222 A1 | 5/2006 | Leung et al. | |
| 2006/0093132 A1 | 5/2006 | Desormiere et al. | |
| 2006/0145660 A1* | 7/2006 | Black | H02J 7/025 320/108 |
| 2006/0202665 A1 | 9/2006 | Hsu | |
| 2007/0023559 A1 | 2/2007 | Scapillato et al. | |
| 2007/0057763 A1 | 3/2007 | Blattner et al. | |
| 2007/0076459 A1 | 4/2007 | Limpkin | |
| 2007/0103110 A1* | 5/2007 | Sagoo | H02J 7/025 320/109 |
| 2007/0136593 A1 | 6/2007 | Plavcan et al. | |
| 2007/0165371 A1 | 7/2007 | Brandenburg | |
| 2007/0182367 A1* | 8/2007 | Partovi | H01F 5/003 320/108 |
| 2007/0210889 A1* | 9/2007 | Baarman | A61L 2/10 336/121 |
| 2007/0216392 A1* | 9/2007 | Stevens | H02J 5/005 323/355 |
| 2007/0279002 A1* | 12/2007 | Partovi | H02J 7/0027 320/115 |
| 2008/0001922 A1 | 1/2008 | Johnson et al. | |
| 2008/0030985 A1 | 2/2008 | Jeon et al. | |
| 2008/0049988 A1 | 2/2008 | Basile et al. | |
| 2008/0055047 A1 | 3/2008 | Osada et al. | |
| 2008/0079388 A1 | 4/2008 | Sarnowsky et al. | |
| 2008/0132293 A1 | 6/2008 | Gundlach et al. | |
| 2008/0157715 A1 | 7/2008 | Rosenboom et al. | |
| 2008/0223926 A1 | 9/2008 | Miller et al. | |
| 2008/0258680 A1 | 10/2008 | Frerking et al. | |
| 2008/0265835 A1* | 10/2008 | Reed | H02J 7/025 320/108 |
| 2009/0026959 A1 | 1/2009 | Lin et al. | |
| 2009/0040807 A1 | 2/2009 | Doumae et al. | |
| 2009/0047768 A1 | 2/2009 | Jain | |
| 2009/0047769 A1 | 2/2009 | Bhat et al. | |
| 2009/0075704 A1 | 3/2009 | Wang | |
| 2009/0079387 A1 | 3/2009 | Jin et al. | |
| 2009/0084705 A1 | 4/2009 | Justiss | |
| 2009/0097221 A1 | 4/2009 | Sayed et al. | |
| 2009/0102416 A1 | 4/2009 | Burley | |
| 2009/0134972 A1 | 5/2009 | Wu, Jr. et al. | |
| 2009/0146608 A1 | 6/2009 | Lee | |
| 2009/0153098 A1 | 6/2009 | Toya et al. | |
| 2009/0153297 A1 | 6/2009 | Gardner | |
| 2009/0174263 A1 | 7/2009 | Baarman et al. | |
| 2009/0203355 A1 | 8/2009 | Clark | |
| 2009/0212639 A1 | 8/2009 | Johnson | |
| 2009/0226050 A1 | 9/2009 | Hughes | |
| 2009/0243791 A1* | 10/2009 | Partin | G07C 9/00944 340/5.2 |
| 2009/0251102 A1* | 10/2009 | Hui | H01F 17/0006 320/108 |
| 2009/0273891 A1* | 11/2009 | Peiker | B60R 11/0241 361/679.01 |
| 2009/0278494 A1* | 11/2009 | Randall | H02J 7/0044 320/114 |
| 2010/0039066 A1* | 2/2010 | Yuan | H02J 50/12 320/108 |
| 2011/0036659 A1* | 2/2011 | Erjawetz | B60K 1/00 180/299 |
| 2011/0128694 A1* | 6/2011 | Saito | G06F 1/1658 361/679.33 |
| 2013/0043833 A1* | 2/2013 | Katz | H01M 10/46 320/108 |
| 2013/0285606 A1* | 10/2013 | Ben-Shalom | H01F 38/14 320/108 |
| 2014/0035521 A1* | 2/2014 | Endo | H02J 5/005 320/108 |
| 2014/0057575 A1* | 2/2014 | Ayukawa | G05F 1/10 455/73 |
| 2014/0349572 A1* | 11/2014 | Ben-Shalom | H04B 5/0031 455/41.1 |

FOREIGN PATENT DOCUMENTS

| | | |
|---|---|---|
| EP | 0558316 A1 | 9/1993 |
| EP | 1220150 | 7/2002 |
| EP | 1990734 A1 | 11/2008 |
| GB | 2399466 A | 9/2004 |
| GB | 2399466 B | 11/2005 |
| GB | 2429372 A | 2/2007 |
| JP | 04-156242 | 5/1992 |
| JP | 07-036556 | 2/1995 |
| JP | 07-039078 | 2/1995 |
| JP | 2001-309579 | 11/2001 |
| JP | 2005-006440 | 1/2005 |
| JP | 2005-110412 | 4/2005 |
| JP | 2006-102055 | 4/2006 |
| JP | 2007-529110 | 10/2007 |
| WO | 9602879 A1 | 2/1996 |
| WO | 0201557 A1 | 1/2002 |
| WO | 0215320 A1 | 2/2002 |
| WO | 2005041281 A1 | 5/2005 |
| WO | 2005043775 A1 | 5/2005 |
| WO | 2006015143 A2 | 2/2006 |
| WO | 2006037972 | 4/2006 |
| WO | 2008030985 A2 | 3/2008 |
| WO | 2008086080 A2 | 7/2008 |
| WO | 200809334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |
| WO | 2011036659 | 3/2011 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

(56) References Cited

OTHER PUBLICATIONS

Liu et al "Simulation Study and Experimental Verification of a Universal Contactless Battery Charging Platform With Localized Charging Features", IEEE Transactions on Power Electronics Nov. 2007, vol. 22, No. 6, p. 2202-2210.
International Search Report for PCT/IL2009/000915 Completed by the European Patent Office on Mar. 15, 2010, 3 Pages.
Search report and Written Opinion for PCT/IL2008/001282, Both completed by the US Patent Office dated Feb. 25, 2009, 9 pages all together.
Search Report and Written Opinion for PCT/IL2008/001347, Both completed by the US Patent Office dated Feb. 2, 2009, 10 Pages all together.
Search Report and Written Opinion for PCT/IL2008/001348, Both completed by the US Patent Office dated Jan. 28, 2009, 9 Pages all together.
International Search Report for PCT/IL2008/01641, Completed by the US Patents and Trademark Office dated May 21, 2009, 3 Pages.
International Preliminary Report on Patentability dated Sep. 21, 2010, for Corresponding Application PCT/IL2008/001641.
International Search Report for International Application No. PCT/IL2012/050544 dated Jun. 8, 2013.
Office Action dated Mar. 22, 2013, for Mexican Application MX/a/2011/003088.
Office Action dated Feb. 5, 2013, for Chinese Application 201110068458.7.
Office Action dated May 28, 2013, for Japanese Application 2010-526422.
Office Action dated May 28, 2013, for Japanese Application 2010-528526.
Office Action dated May 21, 2013, for Japanese Application 2011-500345.

* cited by examiner

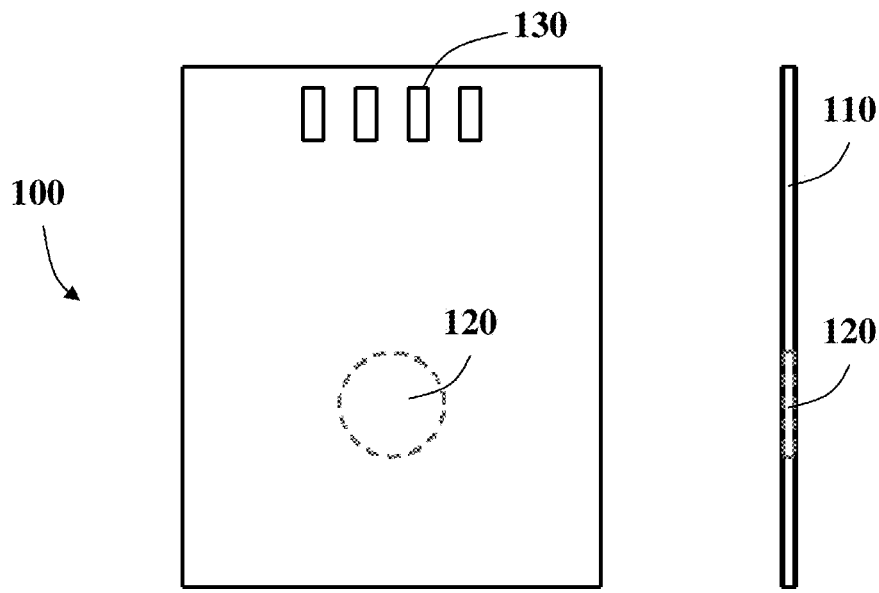
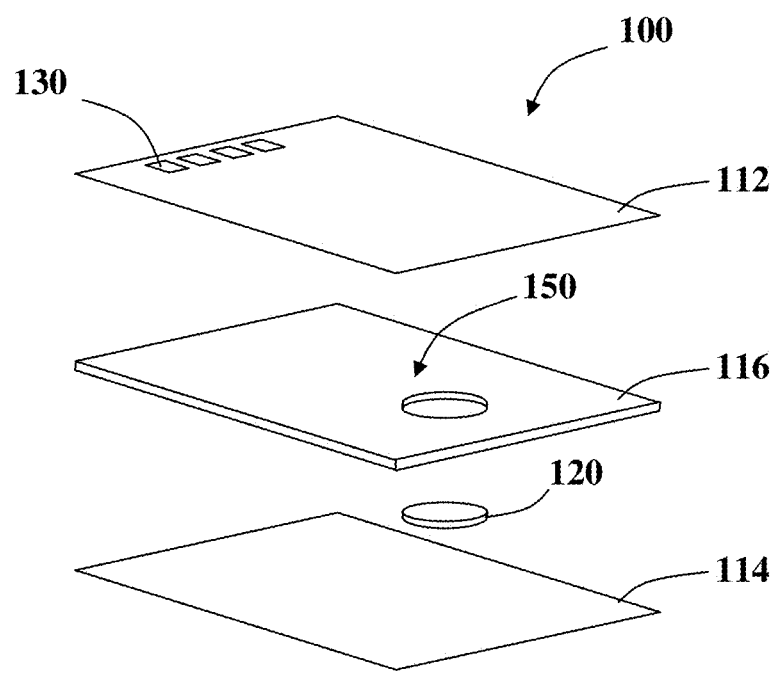

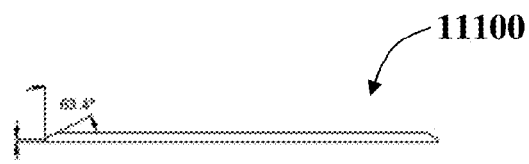
Fig. 16A
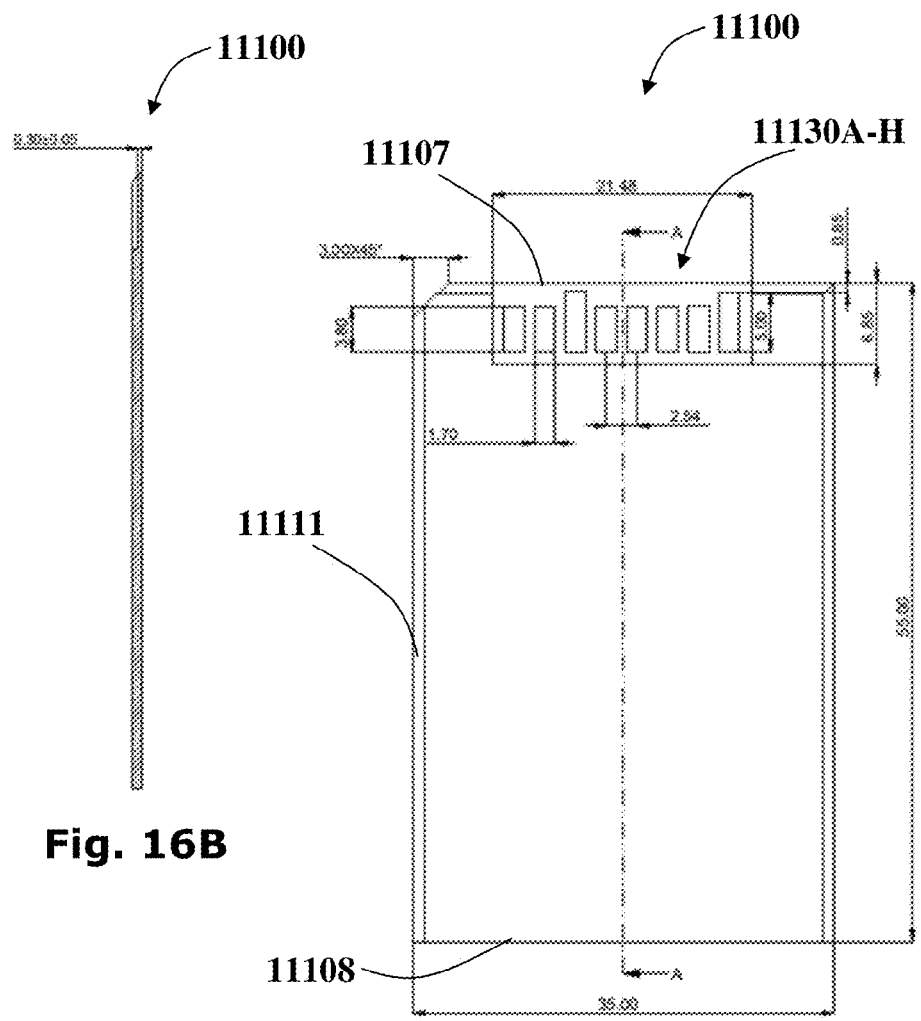
Fig. 16B
Fig. 16C

SYSTEM AND METHOD FOR PROVIDING WIRELESS POWER TRANSFER FUNCTIONALITY TO AN ELECTRICAL DEVICE

CROSS-REFERENCE TO RELATED APPLICATIONS

This application is a continuation of co-pending, commonly assigned U.S. patent application Ser. No. 14/311,849, filed Jun. 23, 2014, which (1) is a continuation of PCT Patent Application No. PCT/IL2012/050544, filed Dec. 20, 2012, which claims the benefit of U.S. Provisional Patent Applications Nos. 61/578,348 filed Dec. 21, 2011, 61/598,697, filed Feb. 14, 2012, 61/655,775, filed Jun. 5, 2012, 61/673,844, filed Jul. 20, 2012, and 61/699,876, filed Sep. 12, 2012, and (2) is a continuation-in-part of U.S. patent application Ser. No. 12/883,457, filed Sep. 16, 2010, now U.S. Pat. No. 9,136,734, which is a continuation of PCT Patent Application No. PCT/IL2008/001641, filed Dec. 18, 2008, which claims the benefit of U.S. Provisional Patent Application Ser. Nos. 61/064,618, filed Mar. 17, 2008, 61/071,151, filed Apr. 15, 2008, 61/129,526, filed Jul. 2, 2008, 61/129,859, filed Jul. 24, 2008, and 61/129,970, filed Aug. 4, 2008, the disclosures of each of which are incorporated herein by reference in their entirety.

FIELD OF THE INVENTION

The disclosure herein relates to inductive power transfer. In particular the disclosure relates to wireless power receivers for enabling electrical devices to receive power inductively.

BACKGROUND OF THE INVENTION

Power packs are often used to power mobile devices, such as cellular telephones, personal digital assistants (PDAs), media players and the like. Typically, power packs include rechargeable electrochemical cells or batteries, which are charged using a dedicated charger unit drawing power from some power source such as the mains or a vehicle battery and which may be external or internal to the device.

Charger units powered from mains or power lines usually consist of a bulky plug box, containing a step-down transformer and a rectifier, with conducting pins for connecting to the mains socket. When in use, the plug box is plugged into a mains socket and a trailing cord connects to the device via a connecting plug. If the trailing wire is snagged or jerked the wire and connectors may be damaged or the device may be pulled to the ground. Moreover, the trailing wire itself is inconvenient and unsightly particularly where a number of devices are charged from a common power socket and the trailing wires may become entangled.

Thus wireless power charging is desirable.

SUMMARY OF THE INVENTION

Wireless charging is gaining in popularity. Current receiver products are mostly aftermarket products, retrofitted on existing products in the market. As such, these products have certain limitations. For example, some receivers may be unable to interact seemlessly with device user interface (UI) and others may be limited in mechanical and industrial design by point of contact limitations.

Industry standards tend to address certain technological aspects of wireless charging, but do not generally address how the technology may be integrated into consumer electronic products. One aim of the current disclosure is to provide a standard manner by which wireless charging functionality may be integrated into consumer devices such as smartphones, tablets, computers, ultrabooks and the like. Accordingly, a wireless charging card, or the like, may be provided for consumer devices and a device socket may be integrated into devices to accommodate the wireless charging card.

According to one aspect of the current disclosure, a system is presented for providing inductive power reception functionality to at least one host device. The system comprises a wireless power receiver configured to be accommodated by a wireless power port associated with said host device, said wireless power receiver comprising a secondary inductor operable to couple inductively with a primary inductor connected to a power source via a driver; a reception circuit operable to control inductive power transfer from the primary inductor to the host device; and at least one first electrical contact upon said support platform, wherein the first electrical contact is configured to form a conductive connection with a corresponding second electrical contact incorporated in said wireless power port of the host device.

In certain embodiments, the reception circuit comprises: (a) a first half-wave rectifier having one anode wired to a first output terminal and one cathode wired to a first input terminal; (b) a second half-wave rectifier having one anode wired to said first output terminal and one cathode wired to a second input terminal; (c) a third half-wave rectifier having one anode wired to said first input terminal and one cathode wired to a second output terminal; and (d) a fourth half-wave rectifier having one anode wired to said second input terminal and one cathode wired to said second output terminal; the full-wave rectifier for providing an output of constant polarity from an input of variable polarity, wherein at least one half-wave rectifier comprises a current-triggered synchro-rectifier comprising an electronic switch configured such that when current flowing through the cathode of the electronic switch exceeds a predetermined threshold, a current-based signal triggers the electronic switch to the ON state.

In certain embodiments, the electronic switch comprises: a MOSFET device that comprises a source terminal, a drain terminal and a gate terminal; a half-wave rectifier in parallel with said MOSFET device, wired to the source terminal and the drain terminal of the MOSFET device, and a current monitor configured to monitor a drain-current flowing through the drain terminal and to send a gate signal to said gate terminal, such that said MOSFET is switched to its ON state when said drain-current exceeds a first threshold current and said MOSFET is switched to its OFF state when said drain-current falls below a second threshold current.

In certain embodiments, the current monitor comprises a current transformer.

In certain embodiments, the first half-wave rectifier comprises said current-triggered synchro-rectifier, and the second half-wave rectifier comprises said current-triggered synchro-rectifier.

In certain embodiments, at least one half-wave rectifier comprises an electronic switch configured to be switched between its ON and OFF states in synchrony with the frequency of the input signal.

In certain embodiments, said first half-wave rectifier comprises a first electronic switch configured to be in its ON state when the current flowing through its cathode exceeds a predetermined threshold; (b) said second half-wave rectifiers comprises a second electronic switch configured to be in its ON state when the current flowing through its cathode exceeds a predetermined threshold; (c) said third half-wave rectifiers comprises a third electronic switch configured to be switched between its ON and OFF states in phase with the voltage signal at said second input terminal, and (d) said fourth half-wave rectifiers comprises a third electronic switch configured to be switched between its ON and OFF states in phase with the voltage signal at said first input terminal.

In certain embodiments, the wireless power receiver may comprise a card, a cartridge, an insert or the like. Optionally, the wireless power receiver may comprise a rigid material. In some embodiments, the wireless power receiver has a generally rectangular dimensions.

In certain embodiments, the wireless power receiver is conductively connected to the host device only through said first electrical contact.

In certain embodiments, the wireless power receiver and the wireless power port are configured such that the wireless power port is insertable into and removable from the host device. Optionally, the wireless power port is configured such that wireless power port is insertable into and removable from the host device without disassembling the host device.

Where appropriate, the reception circuit may comprise a rectification unit, such as an application-specific integrated circuit (ASIC). Additionally or alternatively, the reception circuit may further comprise a memory storing an identification code. The reception circuit may be further configured to manage communication with an external power source.

In various embodiments, the system may further include at least one magnetic shield for guiding magnetic flux away from electrical components of the host device.

Where required, the system may include at least two electrical contacts configured to from a conductive path for providing direct current power supply to the electrical device. Additionally or alternatively, the system may include at least one electrical contact is configured to provide a path for communication signals between the reception circuit and the electrical device.

Optionally, the system may enable still more functionality. For example the system may additionally or alternatively comprise a near field communication circuit. Accordingly, the near filed communication circuit may comprise a data reception circuit and may further comprise a data transmission circuit.

In certain embodiments, the system may further comprising a near field communication antenna wherein said near field communication circuit may be connected to said near field connection antenna.

In certain embodiments, the near field communication circuit may be connected to the secondary inductor such that the secondary inductor is capable of functioning as a near field communication antenna.

In certain embodiments, the secondary inductor may be configured to be connectable to a near field communication circuit in said host device.

In some embodiments the system may be configured as a retrofittable inductive power receiver unit.

In another aspect of the disclosure an electrical device is presented comprising an wireless power port configured to accommodate a retrofittable inductive power receiver comprising a secondary inductor incorporated therein; and at least one electrical contact thereupon.

Optionally, the wireless power port comprises at least one electrical contact configured to couple with the electrical contact thereby forming a conductive path between the retrofittable inductive power receiver and the electrical device.

In various embodiments, the wireless power port may further comprise at least one electrical contact operable to receive communication signals from the retrofittable inductive power receiver. Alternatively, or additionally, the wireless power port may comprise at least one connecting pin having a first connector and a second connector, the first connector configured to connect to a connector of a power pack of a and the second connector configured to connect to the retrofittable inductive power receiver unit.

In still another aspect, a method is taught for providing inductive power reception functionality to at least one host device, said method comprising: obtaining a host device comprising a wireless power port configured to accommodate a wireless power receiver; obtaining said wireless power receiver comprising a secondary inductor; a reception circuit; and at least one first electrical contact; and introducing said wireless power receiver into said wireless power port of said host device such that said at least one first electrical contact conductively connects with at least one corresponding second electrical contact incorporated into said wireless power port.

Another method is taught for providing inductive power reception functionality to at least one host device, said method comprising providing an electrical device comprising a wireless power port configured to accommodate a wireless power receiver comprising a secondary inductor incorporated into said support platform; and at least one electrical contact.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIGS. 1A-C schematically represent various views of an example of a wireless power receiver card;

FIG. 1A shows a bottom view of thereof;

FIG. 1B shows a side view thereof;

FIG. 1C shows an exploded view thereof;

FIGS. 16A-C show a further possible form factor for still another embodiment of the wireless power receiver.

DETAILED DESCRIPTION OF THE INVENTION

Figure 2A:
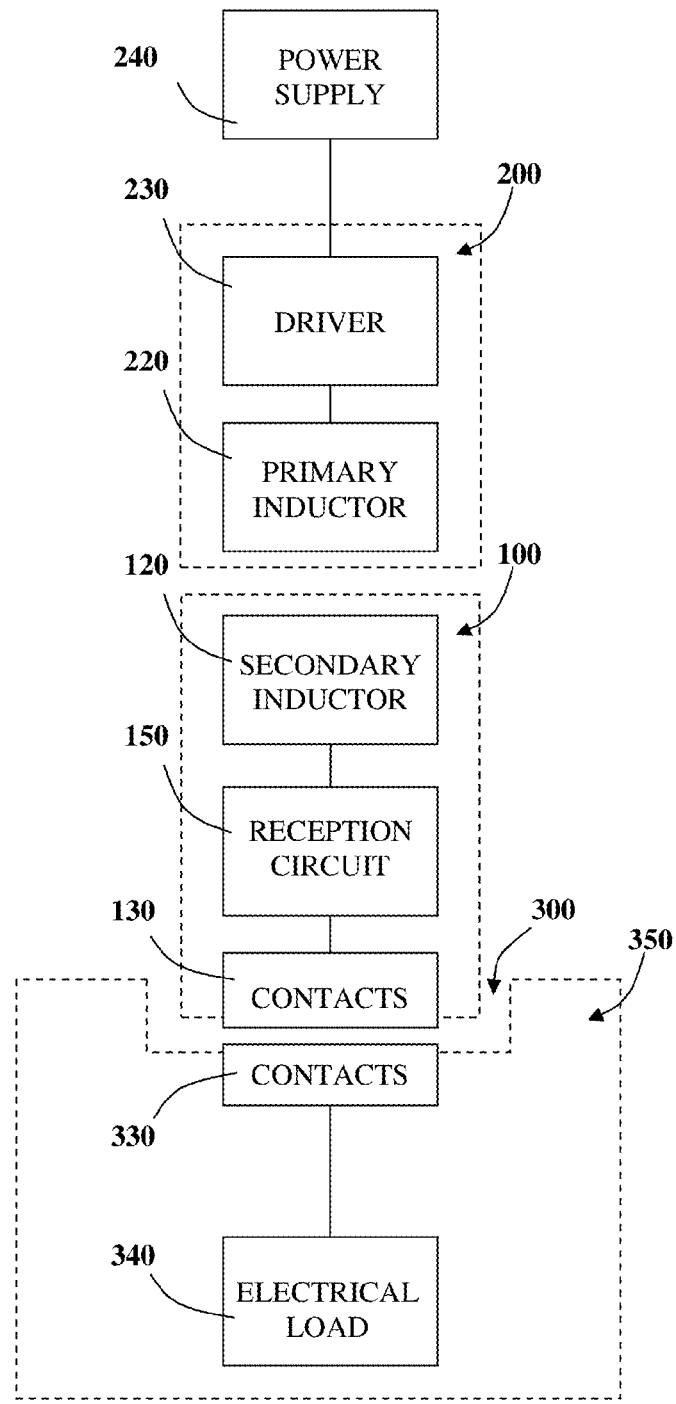
FIG. 2A is a block diagram representing selected components of one embodiment of a wireless power receiver configured to transfer power from an wireless power outlet to an electrical load.

Aspects of the present disclosure relate to systems and methods for enabling electrical devices ("host devices") to receive power wirelessly. In particular, wireless power receivers are disclosed which may be introduced into host devices as inserts, such as cards, cartridges and the like. The wireless power receiver of the disclosure may also be referred to as "retrofittable wireless power receiver", "retrofittable wireless power receiver card", "wireless power receiver card", "slot card", "wireless charging card" or "WiCC". In certain embodiments where the wireless power reception is through an inductive mechanism, the wireless power receiver may be referred to as "inductive power receiver card", "retrofittable inductive power receiver", "inductive power receiver" or "retrofittable inductive power receiver card".

The wireless power receiver may be retrofittable. "Retrofittable", as used in the present disclosure, means that the wireless power receiver and the wireless power port may be configured such that the wireless power port is insertable into and removable from the host device.

"Insertable", as used in the present disclosure, means that the wireless power receiver may be inserted into, and conductively connected to, the host device by a typical user of the host device.

"Removable", as used in the present disclosure, means that the wireless power receiver may be removed from, and conductively disconnected, the host device by a typical user of the host device.

The wireless power port may be configured such that wireless power port is insertable into and removable from the host device without disassembling the host device, e.g., through an opening or slot present in the exterior of the host device. Alternatively, disassembly that can be conducted by a typically user of the host device, e.g., removing the back cover, may be required for inserting or removing the wireless power receiver.

The host device may be an electrical device having, or is connectable to, a wireless power port that is configured to accommodate one or more of said wireless power receivers. The wireless power receiver may be conductively connected to the host device only through said first electrical contact.

Variously, the electrical device may be selected from a group consisting of: desktop computers, laptop computers, tablets, remote control units, telephones, media players, PDAs, Walkmans, portable music players, dictaphones, portable DVD players, mobile communications devices, calculators, mobile phones, smartphones, hairdryers, shavers, defoliators, delapidators, wax-melting equipment, hair curlers, beard trippers, lights, radios, electric knives, cassette players, CD players and the like.

Furthermore, host devices are disclosed incorporating one or more wireless power ports configured to accommodate one or more of said wireless power receivers.

The wireless power port may include a space available for the insertion of an wireless power receiver card and at least a securing mechanism for securing the wireless power receiver card in place. The wireless power port may further include least one electrical contact unit for data and power transmission between the wireless power receiver card and the host device via a conductive electrical connection. Alternatively, the wireless power port may position the wireless power receiver card such that it can form a conductive connection (via one or more electrical contacts) with the electrical contact unit of the host device.

The system may be operable to utilize various wireless power reception methods such as tightly coupled inductive power transfer, loosely coupled inductive power transfer, capacitive power transfer, conductive power transfer or the like. Optionally, an inductive power enabling system may provide inductive power reception functionality to at least one host device by introducing a retrofittable unit such as a card into the host device. The retrofittable unit may include a rigid platform, for example fashioned from a plastic or some other insulating material, supporting a secondary inductor operable to couple inductively with a primary inductor and thereby to provide power to the host device, a reception circuit operable to control inductive power transfer from the primary inductor to the host device; and electrical contacts configured to align with a corresponding electrical contacts in a host device.

It is noted that the systems and methods of the disclosure herein may not be limited in its application to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Reference is now made to FIGS. 1A-C showing an example of a retrofittable wireless power receiver 100. The wireless power receiver 100 may be used to enable electrical devices ("host devices") to receive power wirelessly, for example, inductively. FIG. 1A shows a bottom view, FIG. 1B shows a side view and FIG. 1C shows an exploded view of such a wireless power receiver unit 100.

The wireless power receiver 100 includes a secondary inductor 120, and an array of electrical contacts 130. The wireless power receiver 100 may be a card or the like fashioned from a rigid material. For example, the wireless power receiver 100 may include a rigid base 116 sandwiched between to laminating layers 112, 114. The rigid base 116 may provide a substrate onto which electronic elements, such as the secondary inductor 120, reception circuit 150, communication antennas, connecting wires and the like, may be fashioned. The laminating layers 112, 114 may provide electrical insulation, magnetic shielding, heat dissipation functionality or the like as required.

The secondary inductor 120, such as a coil or the like, which may be printed or otherwise incorporated onto the wireless power receiver 100, may be operable to inductively couple with a primary inductor of an inductive power outlet thereby receiving power inductively therefrom.

The electrical contacts 130 are provided for conductively connecting the retrofittable wireless power receiver 100 with a host device. Accordingly, power received by the secondary inductor 120 from an inductive power outlet may be transferred may be transferred to the host device. Optionally, a plurality of electrical contacts may form a plurality of conductive channels providing various functions such as power transfer, data transfer, communication signal transfer and the like.

It is a particular feature of the retrofittable wireless power receiver 100 that it may have standard dimensions such that it may be introduced into a variety of corresponding wireless power ports of a plurality of host devices and the electrical contacts 130 connect with corresponding electrical contacts within the host device.

Where appropriate, the wireless power receiver may be coated with an adhesive layer to support its location in the host device and to ensure a good connection therewith.

The host device may be configured to periodically query the presence of the wireless power receiver. The host device may be configured to automatically detect and establish a functional connection with a newly inserted wireless power receiver while the host device is on (known as "hot swapping"). Alternatively, the host device may be required to shut down before connecting with the retrofittable wireless power receiver.

It is particularly noted that the wireless power receiver may be fashioned having a width and a length of substantially standard dimensions, a pair of longer edges and pair of shorter edges, and a connector portion disposed along one of the edges and having a connector for electrically connecting the wireless power receiver to the host device connector.

Optionally the wireless power receiver may have a wrong insertion preventing structure for preventing insertion of the wireless power receiver into the host device connector in an orientation other than the connector portion of the wireless power receiver. A host device connector for receiving the connector portion of the wireless power receiver may have a wrong insertion preventing structure for preventing further insertion of the wireless power receiver card by cooperating with the card when the wireless power receiver is inserted in an incorrect orientation. A connecting system may include the wireless power receiver and the host device connector including the described features.

It is further noted that a thermally conducting element may be provided as a heat sink for heat removal. Indeed, according to certain embodiments, a thermally conducting magnetic shielding material may itself and perform both functions.

The present disclosure provides a universal wireless power port compatible with a variety of devices. Accordingly, manufacturers of electrical devices may provide wireless power reception ready devices without having to provide the electronic elements associated with wireless power receivers. A user of a wireless power reception ready device may choose to add wireless power reception functionality to the device by introducing the retrofittable wireless power receiver to the host device.

It is further noted that the wireless power receiver may be further provided with a reception circuit 150, possibly as part of an integrated circuit incorporated therein. The reception circuit 150 may include a rectifier, a regulator and the like such as described at least in the applicants co-pending applications PCT/IL2010/000640, PCT/IL2010/000759 and PCT/IL2011/000550 all of which are incorporated herein by reference.

An integrated circuit (IC), for example, may be provided for an inductive or resonance wireless power receiver for connecting to a host device connector.

Referring now to the block diagram of FIG. 2A selected components are shown of one embodiment of a wireless power receiver 100 configured to transfer power from an wireless power outlet 200 to an electrical load 340.

It is noted that power may be delivered to various electrical loads 340 such as to charge internal power storage units of the host device 350, such as power packs, electrochemical cells, capacitors, supercapacitors and the like. Alternatively, it is noted that the electrical load 340 may be an electronic component such as screens, integrated circuits, speakers, motors, sensors and the like, with the power from the wireless power receiver 100 being delivered directly to the electrical load 340 for its operation.

The wireless power receiver includes a secondary inductor 120, a reception circuit 150 and electrical contacts 130. The wireless power receiver 100 is configured to couple with a host device 350. The host device 350 includes a wireless power port 300 having an electrical contact unit 330. Where appropriate, electrical contact units 130, 330 may include power transmission contacts for providing a power channel as well as data contacts for providing a signal transfer channel for use passing control signals.

It is noted that the wireless power port 300 may be provided in the host device by a manufacturer to enable a user to add wireless power transfer functionality to the host device after purchase. Optionally the wireless power port may have additional contacts providing other communication channels. This may allow the wireless power port to additionally serve as a communications port, a memory port or the like as well as combinations thereof, as required. Accordingly, the wireless power port may be a universal multifunctional port saving space in the host device.

The wireless power outlet 200 includes a primary inductor 220, which is wired, via a driving unit 230, to a power supply 240, such as the mains or a vehicle battery for example. The driving unit 230 is configured to provide an oscillating driving voltage to the primary inductor 220. As will be described below, in certain embodiments, the oscillating driving voltage may be selected to be at a frequency other than the resonant frequency of the inductive coupling system.

In operation, the secondary inductor 120 of the wireless power receiver 100 is operable to couple inductively with the primary inductor 220 and to receive power therefrom. Optionally the secondary inductor 120 may be aligned to the primary inductor 220 allowing for strong coupling therebetween. Accordingly, the wireless power port 300 may be located adjacent or close to the casing of the host device 350 such that the secondary inductor 120 may be brought into proximity with the primary inductor when the host device 350 is rested upon or otherwise brought into the vicinity of an wireless power outlet 200.

Additionally or alternatively, the secondary inductor 120 may be configured to loosely couple with the primary inductor 220 is not aligned thereto. For example, power transmission at the resonant frequency of the system may allow for power to be transmitted over larger ranges.

The secondary inductor 120 of the wireless power receiver 100 may comprise an induction coil or the like configured to inductively couple with a primary inductor 220. It is noted that a magnetic flux guide may be provided to direct magnetic flux from the primary inductor 220 to the secondary inductor 320 and to reduce flux leakage to the surroundings. Where appropriate, the wireless power receiver unit 100 may further include a magnetic shield for guiding magnetic flux away from electrical components of the host device 350.

A thin magnetic flux guide may be constructed from amorphous ferromagnetic material for example, which may be a few microns thick. Such a magnetic flux guide may be provided to shield an electrochemical cell as well as the host device from undesirable eddy currents within their conductive components. Certain embodiments may use ferromagnetic flux guiding material with a thickness of about 20 microns or so, which, when laminated by a polymer laminate on both sides may have an overall thickness of around 60 microns, for example. Various methods for fabricating magnetic guiding elements from amorphous ferromagnetic material include, inter alia: printing, stamping, cutting, amorphous ferromagnetic microwire cloth and the like.

As noted hereinabove, the wireless power receiver may be further provided with a reception circuit 150, possibly as part of an integrated circuit incorporated therein. The reception circuit may include a rectifier, a regulator and the like such as described at least in the applicants co-pending applications PCT/IL2010/000640, PCT/IL2010/000759 and PCT/IL2011/000550 all of which are incorporated herein by reference.

Accordingly, the reception circuit 150 of the wireless power receiver 100 may be operable to modify, filter, regulate or to otherwise control inductive power transfer to the electrical load 340. The reception circuit 150 may include a rectification unit for converting AC (alternating current) voltage output from the secondary inductor 120 to DC (direct current) for supply to the host device. It is noted that the rectification unit may be particularly useful where the wireless power receiver is used to charge a power storage unit of the host device that requires DC input.

It is a particular feature of embodiments of the wireless power receiver 100 that it may be operable to manage communication between the electric load 340 and the wireless power outlet 200. Accordingly, in various embodiments the reception circuit 130 may be configured to perform a variety of functions including, but not limited by: rectification of alternating current (AC) generated by the secondary inductor 120 into direct current (DC) for charging an electrochemical cell; regulating the charging voltage across an electrochemical cell; regulating the charging current to an electrochemical cell; regulating the temperature of an electrochemical cell for example by controlling the charging current; sending feedback signals to the primary inductor; controlling the energy transfer from the wireless power outlet 200; automatically terminating the charging process; automatically disconnecting an electrochemical cell from the electric load 400; detecting faults; prevention of deep discharge of the electromechanical cell; and synchronization/communication with battery pack electronics.

Such functionality may be provided by the incorporation of an application specific integrated circuit (ASIC) onto the wireless power receiver. Furthermore, an internal memory may be provided for storing data such as identification codes, historical data, reference parameters, operational data and the like. Optionally the reception circuit 130 may be further configured to manage communication with an external power source.

Figure 2B:
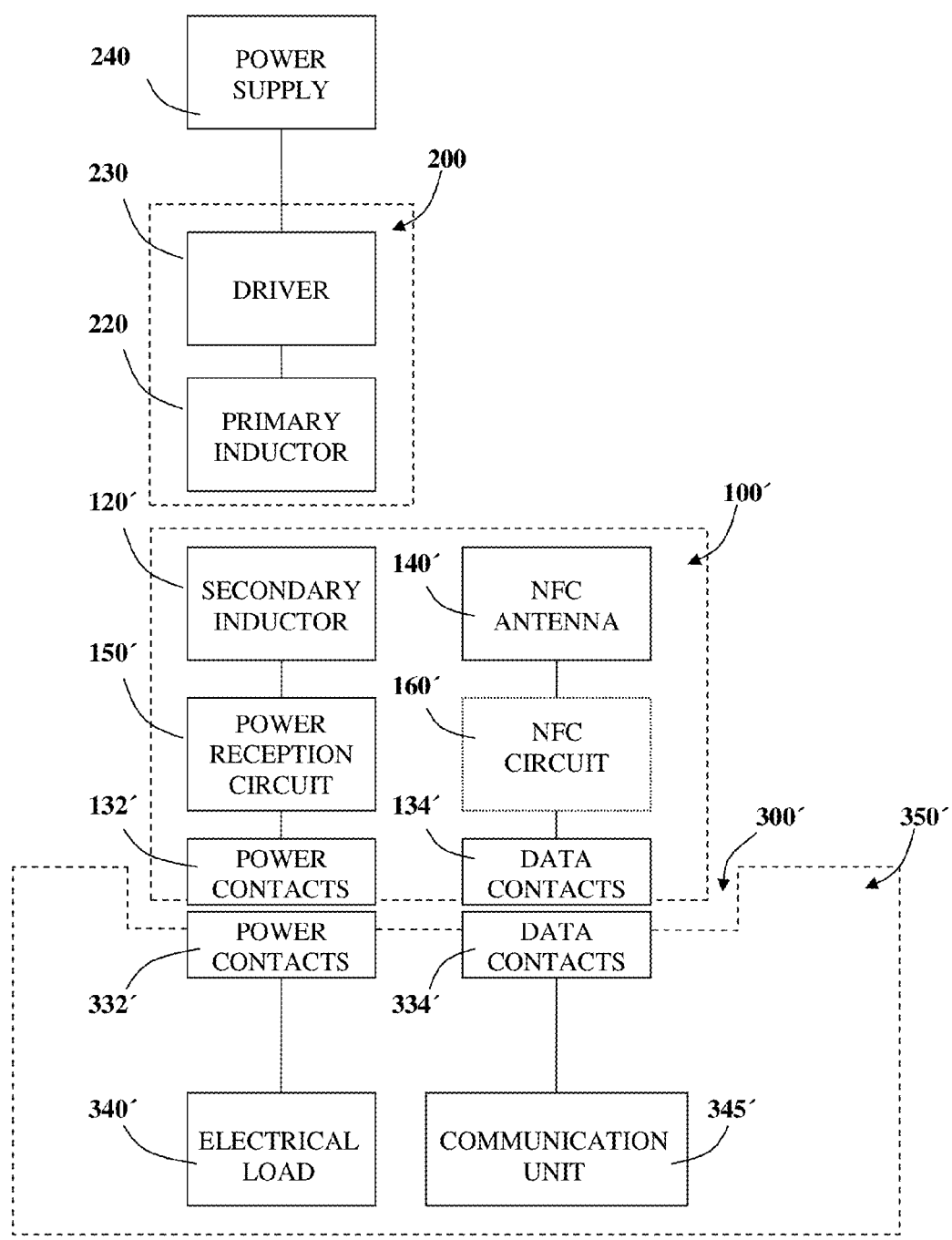
FIG. 2B is a block diagram representing selected components of another embodiment of a wireless power receiver configured to transfer power from an inductive power outlet to an electrical load and to provide a near field communication channel.

Referring now to the block diagram of FIG. 2B, selected components are shown of another embodiment of a wireless power receiver 100'. The wireless power receiver 100' is configured to transfer power from an wireless power outlet 200 to an electrical load 340' and to additionally provide a near field communication channel to a communication unit 345' of the host device 350'.

Accordingly, the wireless power receiver 100' may include a secondary inductor 120', a reception circuit 150' such as described herinabove, as well as an NFC antenna 140' and an NFC circuit 160'. The NFC circuit 160' may comprise a data reception circuit and may further comprise a data transmission circuit. It is noted that the wireless power receiver 100' may further include two sets of electrical contacts with the host device 350': (1) power contacts 132' configured to couple with corresponding power contacts 332' at the wireless power port 300' of the host device 350', for providing a power channel to the electrical load 340'; and (2) data contacts 134' configured to couple with corresponding data contacts 334' at the wireless power port 300' for providing a communication channel to the communication unit 345'.

Figure 2C:
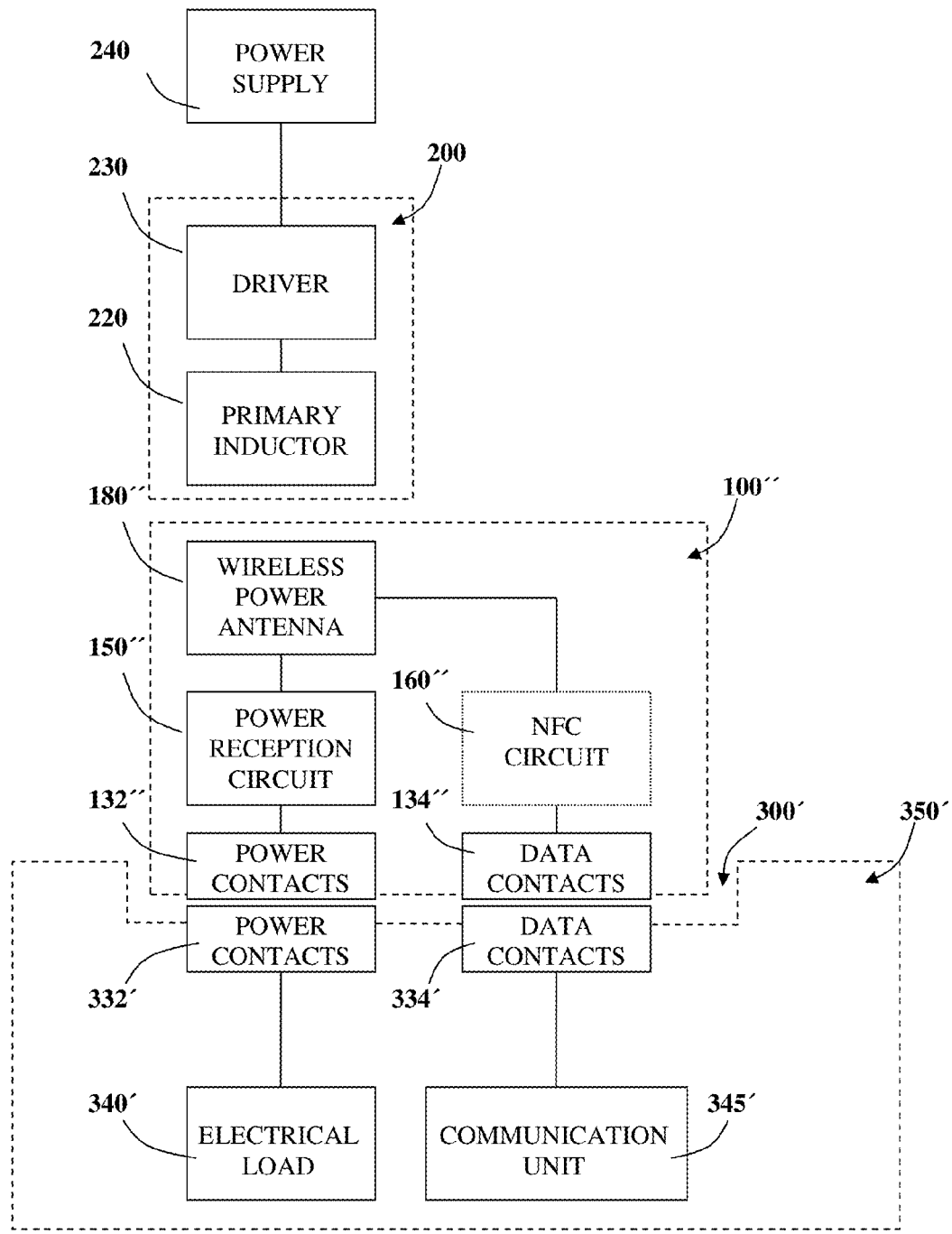
FIG. 2C is a block diagram representing selected components of another embodiment of a wireless power receiver configured to transfer power from an inductive power outlet to an electrical load and to provide a near field communication channel, where one antenna serves as both the secondary inductor and the NFC antenna.

Referring now to the block diagram of FIG. 2C, selected components are shown of another embodiment of a wireless power receiver 100". The wireless power receiver 100" is configured to transfer power from a wirelesspower outlet 200 to an electrical load 340' and to additionally provide a near field communication channel to a communication unit 345' of the host device 350'. It is noted that the wireless power receiver 100" may include a wireless power antenna 180" that serves both as a secondary inductor and an NFC antenna, and is connected to a reception circuit 150" as well as an NFC circuit 160". The NFC circuit 160" may comprise a data reception circuit and may further comprise a data transmission circuit. The wireless power receiver 100" may include two sets of electrical contacts with the host device 350': (1) power contacts 132" configured to couple with corresponding power contacts 332' of the wireless power port 300' for providing a power channel to the electrical load 340'; and (2) data contacts 134" configured to couple with corresponding data contacts 334' of the wireless power port 300' for providing a communication channel to the communication unit 345'.

Figure 2D:
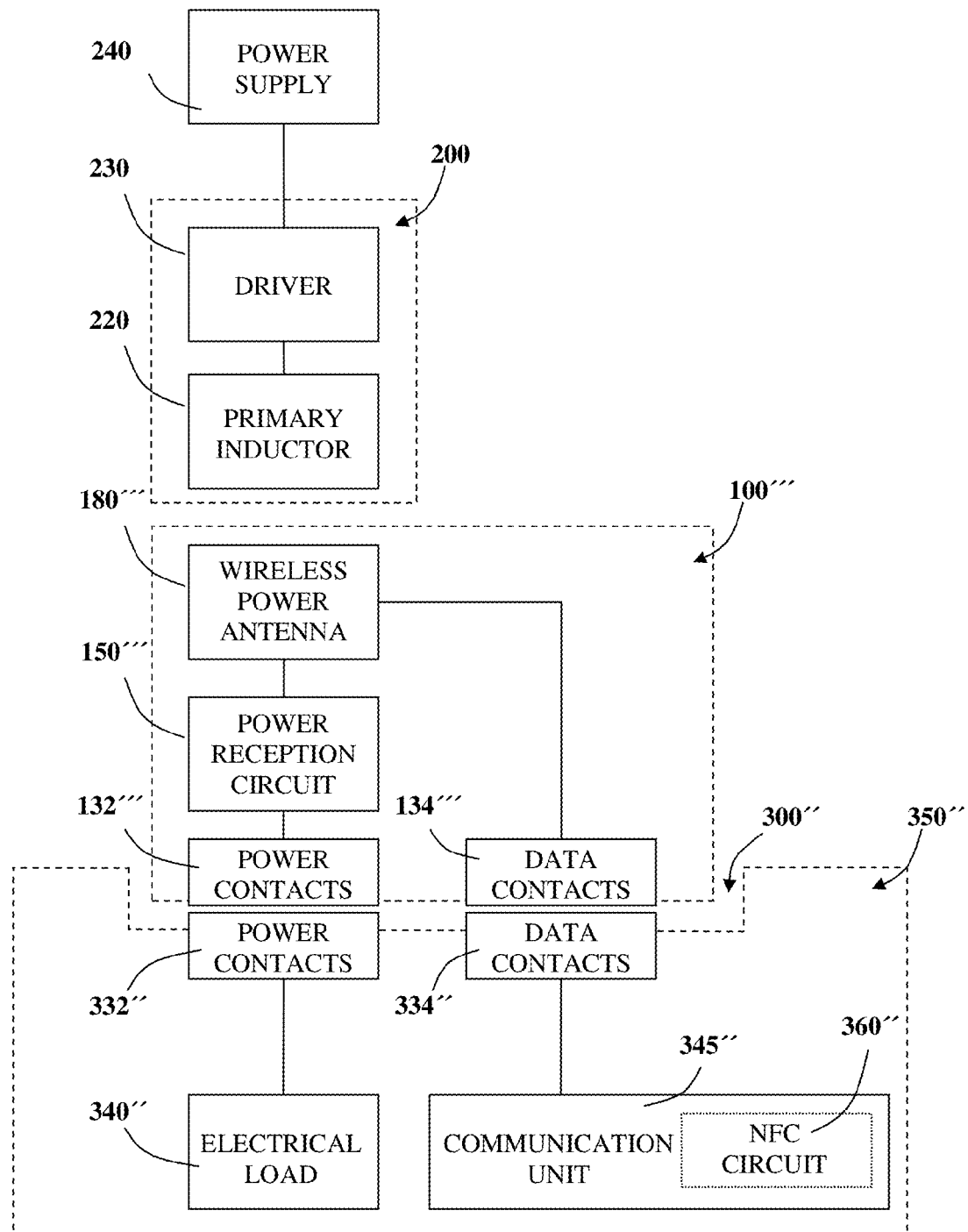
FIG. 2D is a block diagram representing selected components of another embodiment of a wireless power receiver configured to transfer power from an inductive power outlet to an electrical load and to provide a near field communication channel, where one antenna serves as both the secondary inductor and the NFC antenna and the NFC circuit is located in the host device.

Referring now to the block diagram of FIG. 2D, selected components are provided for another embodiment of a wireless power receiver 100'''. The wireless power receiver 100''' is configured to transfer power from a wireless power outlet 200 to an electrical load 340" and to additionally provide a near field communication channel to a communication unit 345" of the host device 350". It is noted that the wireless power receiver 100''' may include a wireless power antenna 180''' that serves both as a secondary inductor and an NFC antenna, and is connected to a reception circuit 150'''. The wireless power receiver 100''' may include two sets of electrical contacts with the host device 350": (1) power contacts 132''' configured to couple with corresponding power contacts 332" at the wireless power port 300" for providing a power channel from the power reception circuit 150''' to the electrical load 340"; and (2) data contacts 134''' configured to couple with corresponding data contacts 334" at the wireless power port 300" for providing a communication channel from the wireless power antenna 180''' to the communication unit 345", which may comprise a NFC circuit 360". The NFC circuit 360" may comprise a data reception circuit and may further comprise a data transmission circuit.

As noted above, a reception circuit connected to the secondary inductor, e.g., the reception circuit 150 of FIG. 2A (or the reception circuit 150' of FIG. 2B, the reception circuit 150" of FIG. 2C, or the reception circuit 150''' of FIG. 2D) may comprise a rectifier to convert an AC input into a DC output. The rectifier may be a bridge rectifier, in which four diodes are arranged in a Graetz circuit. Alternatively, the rectifier may be a bridge synchronous rectifier (also referred to as a synchro-rectifier) such as that described in co-pending U.S. patent application Ser. No. 12/423,530, which is incorporated herein by reference. In the synchro-rectifier, at least one of the four diodes of a typical Graetz circuit is replaced by a current-triggered electronic switch. For example a Power MOSFET may be configured to receive a gate signal from a current monitor wired to its own drain terminal. The current monitor may be configured to send a gate signal to the MOSFET when the drain-current exceeds a predetermined threshold.

Because the MOSFETs of the synchorectifier described above produce less heat than diodes, heat dissipation becomes easier even for high power or high frequency power transmission. Consequently, a rectifier with a smaller footprint may be included in the interface circuit allowing it to be more easily contained within the casing of the power pack.

Figure 3:
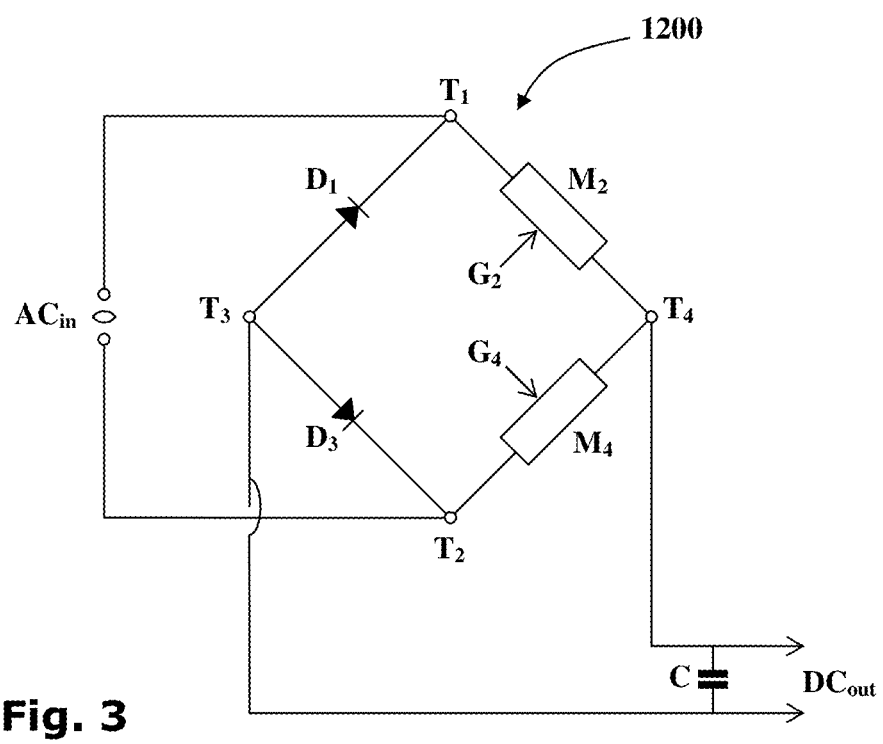
FIG. 3 is a block diagram of a first synchronous full-wave rectifier comprising two electronic switches.

FIG. 3 is a block diagram of a synchronous full-wave rectifier 1200. The rectifier has two input terminals T1 and T2 and two output terminals T3 and T4. When an alternating current source $AC_{in}$ is wired to the two input terminals T1 and T2, a direct current output $DC_{out}$ may be drawn from the two output terminals T3 and T4 of the rectifier 1200.

Two diodes D1 and D3 and two electronic switches M2 and M4 are arranged to form a Graetz-like circuit. The electronic switches M2 and M4 comprise a Power MOSFET.

The anodes of two upstream diodes D1 and D3 are wired to the first output terminal T3 and the cathodes of the two downstream electronic switches M2 and M4 are wired to the second output terminal T4. The cathode of the first upstream diode D1 and the anode of first downstream electronic switch M2 are wired to the first input terminal T1 and the cathode of the second upstream diode D3 and the anode of second downstream electronic switch M4 are wired to the second input terminal T2.

The electronic switches M2 and M4 are controlled by switching signals G2 and G4 which switch them between the ON and OFF states. The switching signal G2 controlling the electronic switch M2 must be synchronized to switch to the ON state whenever the polarity of the first input terminal T1 is positive relative to the second input terminal T2. The switching signal G4 controlling the electronic switch M4 must be synchronized to switch to the ON state whenever polarity of the first input terminal T1 is negative relative to the second input terminal T2.

Typically, this synchronization is achieved by drawing the first switching signal G2 from the voltage of the second input terminal T2 and drawing the second switching signal G4 from the voltage of the first input terminal T1.

The above described synchronous full-wave rectifier 1200 with electronic switches M2 and M4 may reduce power loss from the rectifier by up to 50% as compared to a Graetz circuit comprising four diodes. Where further reduction in power loss is required it would be desirable to replace the remaining two diodes D1 and D3 with electronic switches. However, it is much more difficult to synchronize four electronic switches without inadvertently causing short circuits between either the input or output terminals.

Figure 4A:
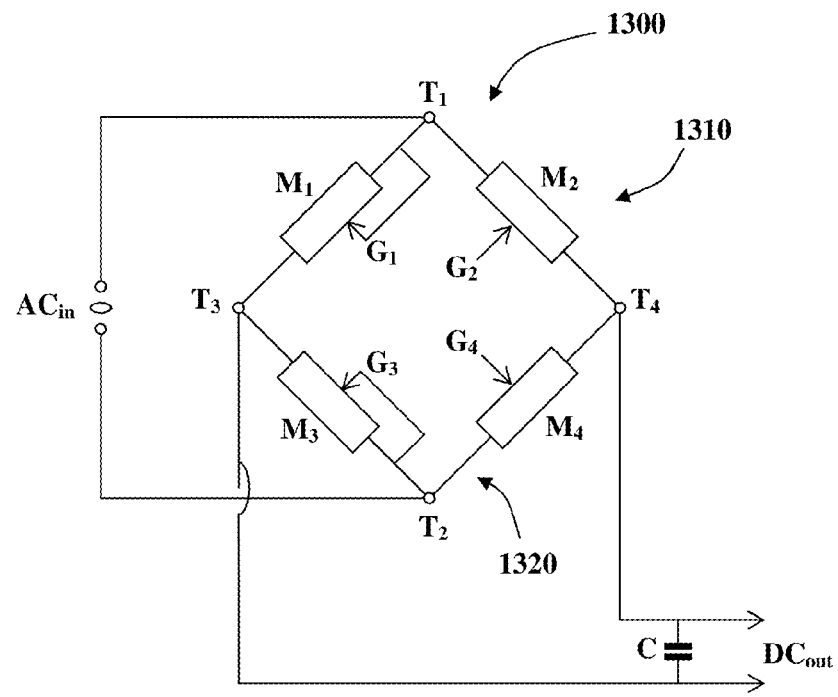
FIG. 4A is a block diagram of a second synchronous full-wave rectifier according to an exemplary embodiment of the comprising four electronic switches.

FIG. 4A is a block diagram of a second synchronous full-wave rectifier 1300, which comprises no diodes and only electronic switches M1-4. In order to provide an output DCout of constant polarity, the switching signals G1-4 need to be carefully controlled.

When the polarity of the first input terminal T1 is positive relative to the polarity of the second input T2, the first upstream and second downstream electronic switches M1 and M4 must be switched to the OFF state and the first downstream and second upstream electronic switches M2 and M3 must be switched to the ON state. When the polarity of the first input terminal T1 is negative relative to the polarity of the second input terminal T2, the first upstream and second downstream electronic switches M1 and M4¬ must be switched to the ON state and the electronic switches first downstream and second upstream electronic M2 and M3 must be switched to the OFF state.

Synchronization of the switching signals G1-4 is complicated by an additional constraint. In order to prevent shorting across the output terminals, the upstream and downstream electronic switches along a common branch 1310, 320 1 must never be in the ON state at the same time. In practice, when both of the switching signals G1 and G2 controlling the two electronic switches M1 and M2 along the first branch 1310 are each drawn from one of the input terminals T1 and T2, the two switches M1 and M2 are periodically both in their ON states. Because the switches M1 and M2 are adjacent along the first branch 1310 of the circuit, a short circuit is formed between the output terminals T3 and T4. Similar shorting may occur along the second branch 1320 when the switching signals G3 and G4 which control the other two electronic switches M3 and M4 are each drawn from one of the input terminals T1 and T2.

According to preferred embodiments of the invention, only the switching signals G2 and G4 for the downstream electronic switches M2 and M4 are drawn directly from the voltage at the input terminals T1 and T2 whilst the switching signals G1 and G3 for the upstream switches M1 and M3 are controlled independently. Preferably, the switching signals G1 and G3 are responsive to changes in the cathode current of switches M1 and M3 respectively.

Figure 4B:
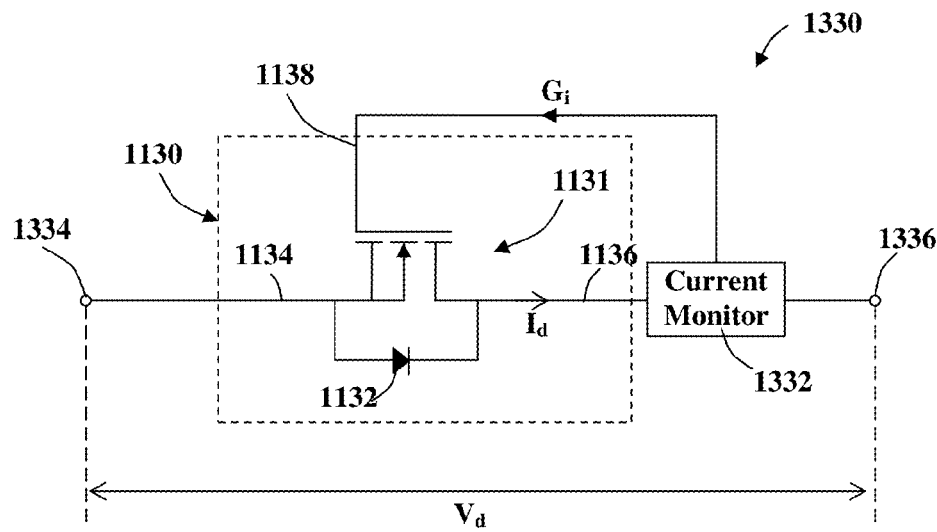
FIG. 4B is a schematic diagram showing a current-triggered Power MOSFET which draws a gate signal from the current flowing through its drain terminal.

FIG. 4B shows a current-triggered synchro-rectifier 1330 according to an exemplary embodiment of the invention, which may serve as an electronic switch M incorporated into a bridge synchro-rectifier 1300. The current-triggered synchro-rectifier 1330 includes a Power MOSFET 1130 and a current monitor 1332. The current monitor 1332 is wired to the drain terminal 1136 of the Power MOSFET 1130 and is configured to send a current-based gate signal Gi to the gate terminal 1138 of the Power MOSFET when the drain-current $I_d$ exceeds a predetermined threshold $I_{th}$. Although in the above example the current-triggered synchro-rectifier 1330 includes an n-channel MOSFET 1130, it will be appreciated that in other embodiments current-triggered synchro-rectifiers may incorporate p-channel MOSFETs.

Figure 4C:
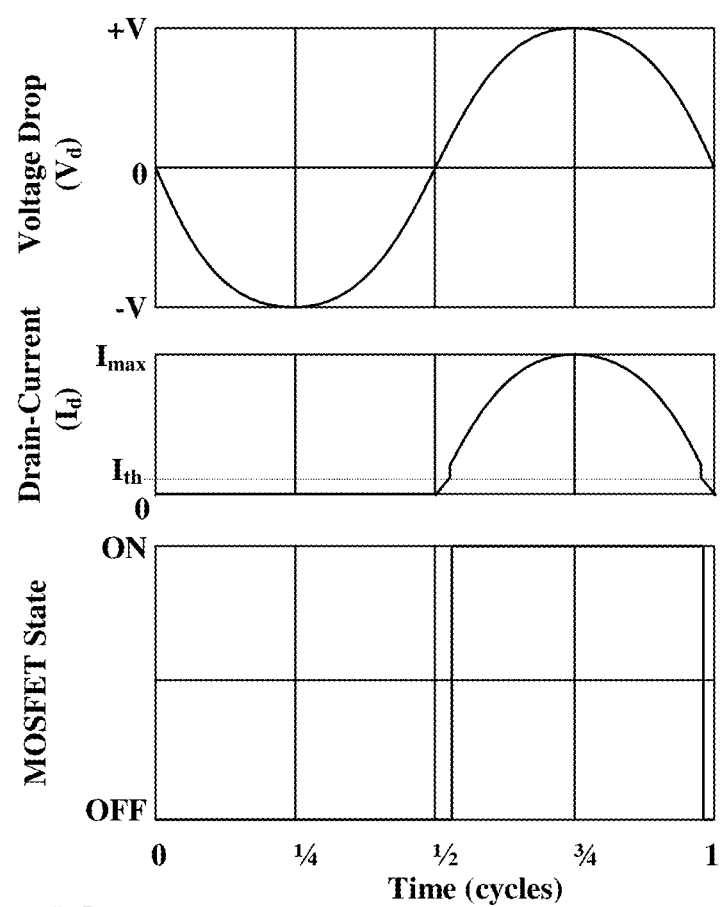
FIG. 4C is a graphical representation of the variations in drain-current and state of the MOSFET of FIG. 3b, over a single cycle of a sinusoidal input voltage.

In order to understand the functioning of the current-triggered synchro-rectifier 1330 consider the case where a sinusoidal alternating voltage is connected across the cathode 1334 and the anode 1336 terminals of the current-triggered synchro-rectifier 1330. FIG. 4C shows three graphs showing variations in 1) the voltage drop $V_d$ from the cathode 1334 to the anode 1336, 2) the drain-current $I_d$, and 3) the MOSFET state during one voltage cycle.

For the first half of the sinusoidal cycle the voltage drop $V_d$ between the cathode 1334 and the anode 1336 is negative, thus the polarity of the cathode 1334 is negative relative to the anode 1336. Consequently, no current flows through the drain-terminal 1136 and the MOSFET remains in the OFF state.

At the beginning of the second half of the sinusoidal cycle, the voltage drop $V_d$ between the cathode 1334 and the anode 1336 increases above zero. The polarity of the cathode 1334 becomes positive relative to the anode 1336 so a small drain-current $I_d$ begins to flow through the diode 1132. This current is measured by the current monitor 1332.

During the third quarter of the cycle, the voltage drop $V_d$ between the cathode 1334 and the anode 1336 continues to rise. The current monitor 1332 measures an increasing drain-current $I_d$.

When the drain-current Id exceeds the predetermined threshold $I_{th}$, the current-based gate signal G, triggers the MOSFET 1130 to switch to the ON state.

As long as the MOSFET 1130 is in the ON state, current flows through the ohmic conductive path of the electronic switch 1131. Consequently, the drain-current $I_d$ varies in proportion to the voltage drop $V_d$.

During the last quarter of the cycle, the voltage drop $V_d$ between the cathode 1334 and the anode 1336 decreases. The current monitor 1332 measures a decreasing drain-current $I_d$.

When the drain-current falls below the predetermined threshold $I_{th}$, the current-based gate signal G, triggers the MOSFET 1130 to switch to the OFF state.

Figure 5:
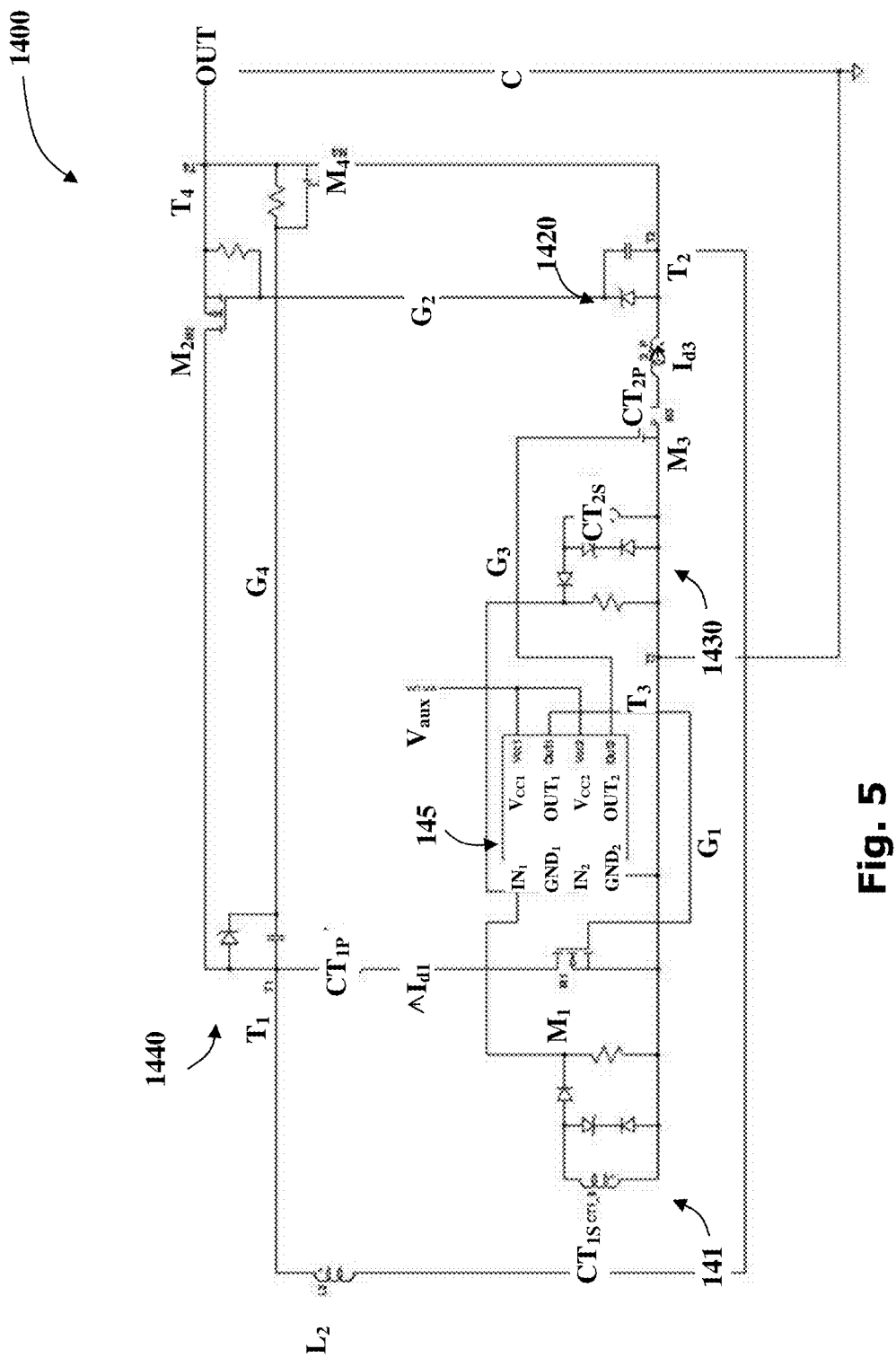
FIG. 5 is a circuit diagram representing a synchronous full-wave MOSFET bridge rectifier according to another embodiment of the invention.

FIG. 5 is a circuit diagram representing a synchronous full-wave bridge rectifier 400 according to an exemplary embodiment of the invention.

The electronic switches M1-4 of the exemplary embodiment are all MOSFET transformers having three terminals: a source terminal, a drain terminal and a gate terminal. The upstream MOSFETs M1 and M3 are both n-channel MOSFETs and their source terminals are both wired to the first output terminal T3 of the rectifier. The downstream MOSFETs M2 and M4 are both p-channel MOSFETs and their source terminals are both wired to the second output terminal T4 of the rectifier. The drain terminals of the first upstream MOSFET M1 and the first downstream MOSFET M2 are both wired to the first input terminal T1 of the rectifier and the drain terminals of the second upstream MOSFET M3 and the second downstream MOSFET M4 are both wired to the second input terminal T3 of the rectifier.

The input terminals T1 and T2 are wired to a secondary coil L2 of a power transformer which is inductively coupled to a primary coil (not shown). The secondary coil L2 provides an alternating current input to the two input terminals T1 and T2.

The gate terminals of the downstream MOSFETs M2 and M4 are wired to the input terminals T2 and T1 via smoothing circuits 1420, 1440 respectively. The switching signals G2 and G4, are therefore out of phase with each other.

The gate terminals of the upstream MOSFETs M1 and M3 receive switching signals G1 and G3 driven by their own drain-currents $I_{d1}$ and $I_{d3}$. The drain current Id1 of the first upstream MOSFET M1 is monitored by a first current transformer 1410, in which a primary current monitor coil CT1P transfers the current signal to a secondary current monitor CT2S the output of which is rectified and relayed to a first input IN1 of a driver 1450 which amplifies the signal before outputing a signal from a first output OUT1. This first output signal from the driver is then fed back to the first upstream MOSFET M1 such that when the drain current $I_{d1}$ exceeds a threshold value the MOSFET M1 switches itself to the ON state. This produces a switching signal G1 at the same frequency as the alternating current input ACin.

Similarly the drain current $I_{d3}$ of the second upstream MOSFET M2 is monitored by a second current transformer 1430, in which a primary current monitor coil CT2P transfers the current signal to a secondary current monitor CT2S the output of which is rectified and relayed to a second input IN2 of the driver 1450 which amplifies the signal before outputing a signal from a second output OUT2. The second output signal from the driver is then fed back to the second upstream MOSFET M3 such that when the drain current $I_{d2}$ exceeds a threshold value the MOSFET M3 switches itself to the ON state. This produces a switching signal G3 at the same frequency as the alternating current input ACin.

Although in the example hereabove, current transformers 1410, 1430 are used to monitor the drain-currents $I_{d1}$, $I_{d2}$, in alternative embodiments other current monitors such as ammeters, galvanometers, Hall effect sensors or the like may be preferred.

Wireless Power Receiver Card in the Host Device

Where applicable, wireless power receiver cards may be provided having different characteristics and functionality to suit different requirements. For example a variety of card classes may be provided, say a first class may be provided for wireless power reception and operable to transfer power at a rate, up to 5 watts, say, suitable for chargeable consumer electronic devices such as mobile handsets, media players and the like. A second class of card may be provided which is operable to transfer power at a higher rate, up to 10 watts, say, suitable for larger electronic devices, such as handheld computing devices for example, ultrabooks, tablets and the like. A third class of card may be provided which is operable to transfer power at a higher rate, up to 20 watts, say, suitable for still larger electronic devices, such as netbooks, laptops and the like. Still other classes of card may provide additional functionality in combination or separately from wireless power reception. For example cards may be provide transmitter functionality, NFC or the like.

It is noted that the different card classes may be differentiated by dimensions, for example having different sizes, form factors or the like. For example, the first class card may have dimensions of about 38 mm by about 55.5 mm by about 1.2 mm. The second class card may have larger dimensions than the first class card, and the third class card may have larger dimensions than the second class card. Alternatively or in addition, the different cards may be distinguishable by marking printed, adhered, etched or otherwise indicated thereupon.

Host devices may incorporate one or more wireless power ports, which are configured to accommodate wireless power receiver cards of particular card classes. For example a host device may be indicated to accept cards only up to a specific class. Accordingly, it may be useful to select dimensions of the wireless power port such that only the form factors of acceptable card classes may be accommodated thereby. Alternatively, warnings or other indications may be provided on the device itself.

Thus, wireless power ports may have a plurality of form factors, a first class of wireless power port may have a form factor suitable only for the first class of card. A second class of wireless power port may have a form factor suitable for both the first class of card and the second class of card. A third class of wireless power port may have a form factor suitable for all of the first class of card, the second class of card and the third class of card. Optionally the connector may be the same for all three form factors is the same with its details determined by the class of card supported.

It is further noted that the wireless power port may be integrated with existing ports of the host device, such as memory ports and the like. Accordingly, a plurality of host connectors may be provided in the port. Different connectors may be provided at different locations and configured to mate with pins at corresponding positions on the cards depending upon required functionality.

The wireless power port may be situated in a location in the host device such that the wireless power receiver card is placed near surface of the host device, with the secondary inductor in the wireless power receiver card being in a parallel orientation with said surface. The wireless power port may further be situated in the host device such that the area of the secondary inductor, as well a buffer area around the secondary inductor of, e.g., 2.5 mm around it, does not include metal components. As such, an exemplary location of the wireless power port may be the back cover (of non-metal construction) of the host device. In such a configuration, the wireless power port may be attached to the back cover or integrated into the back cover. The gap between the wireless power receiver card placed in the wireless power receiver and the exterior face of the back cover may be 1.5 mm or less. Further, the outer surface of the back cover may be flat.

It is further noted that an authorization algorithm may be initiated upon the introduction of the card into the wireless power port. Such an authorization algorithm may prevent incompatible cards being introduced to a host device, which may cause damage or generate unwanted results.

Figure 6A:
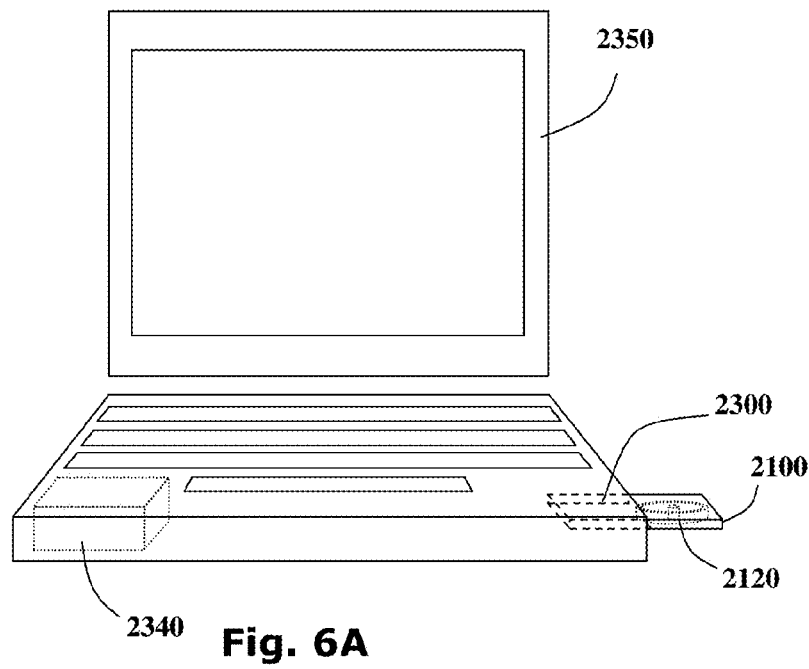
FIGS. 6A and 6B show an example of a wireless power receiver card provided to enable a host computer to receive power inductively.
Figure 6B:
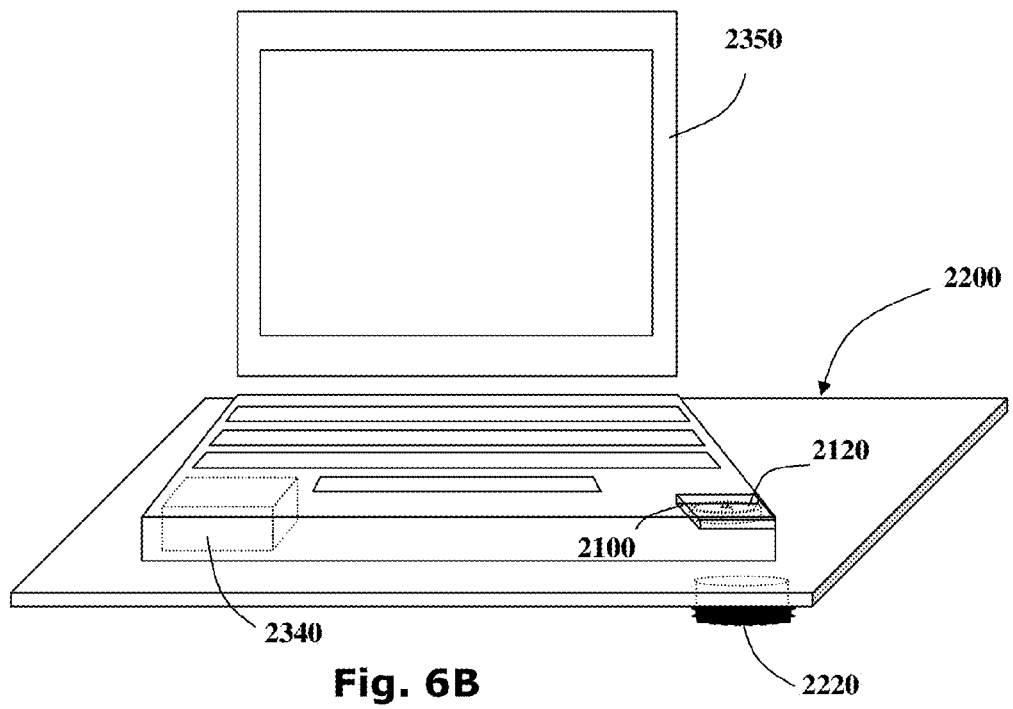

Referring now to FIGS. 6A and 6B, a retrofittable wireless power receiver card 2100 is shown enabling a host computer 2350 to receive power inductively. The host computer 2350 includes a wireless power port 2300 into which the card 2100 may be introduced The card 2100 includes a secondary inductor 2120 operable to inductively couple with a primary inductor 2220 of a wireless power outlet 2200. Accordingly, the power pack 2340 of the computer may receive power wirelessly.

As noted herein, the retrofittable wireless power receiver card 2100 may be standardized to be compatible with a variety of host devices.

Figure 7:
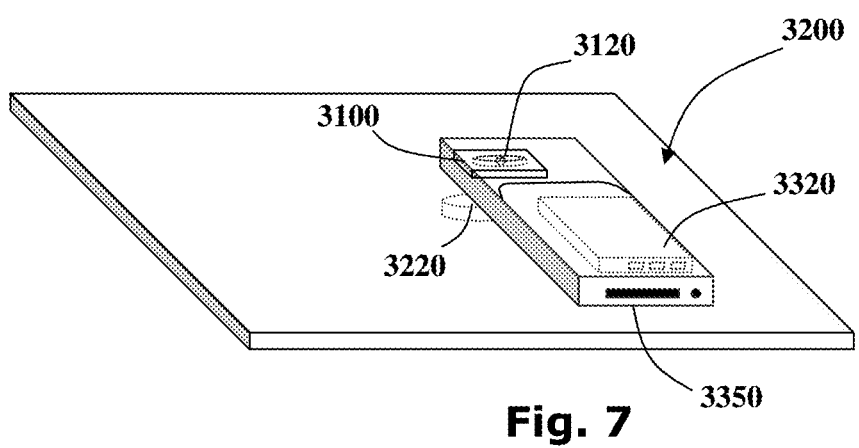
FIG. 7 shows a wireless power receiver card provided to enable a mobile telephone to receive power inductively.

Referring to FIG. 7, for example, a wireless power receiver card 3100 may be introduced into a wireless power port of a mobile phone 3350, for example, such that it is connected to power pack 3320. Accordingly the power pack 3320 may draw power from a wireless power outlet 3200 via an inductive power couple formed between a primary inductor 3220 and a secondary inductor 3120.

Figure 8A:
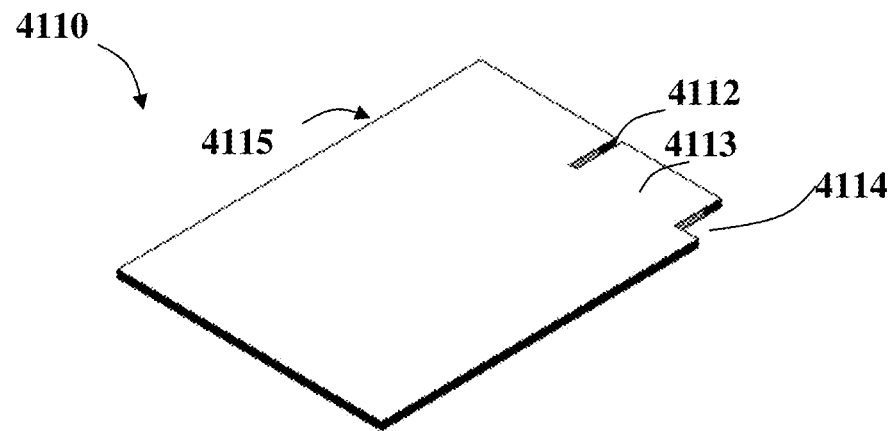
FIGS. 8A-C show various views schematically representing another embodiment of a wireless power receiver card.
Figure 8B:
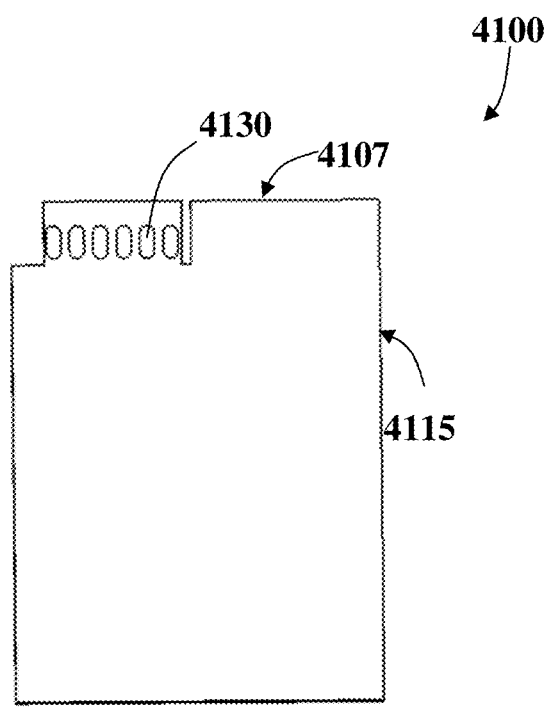
Figure 8C:
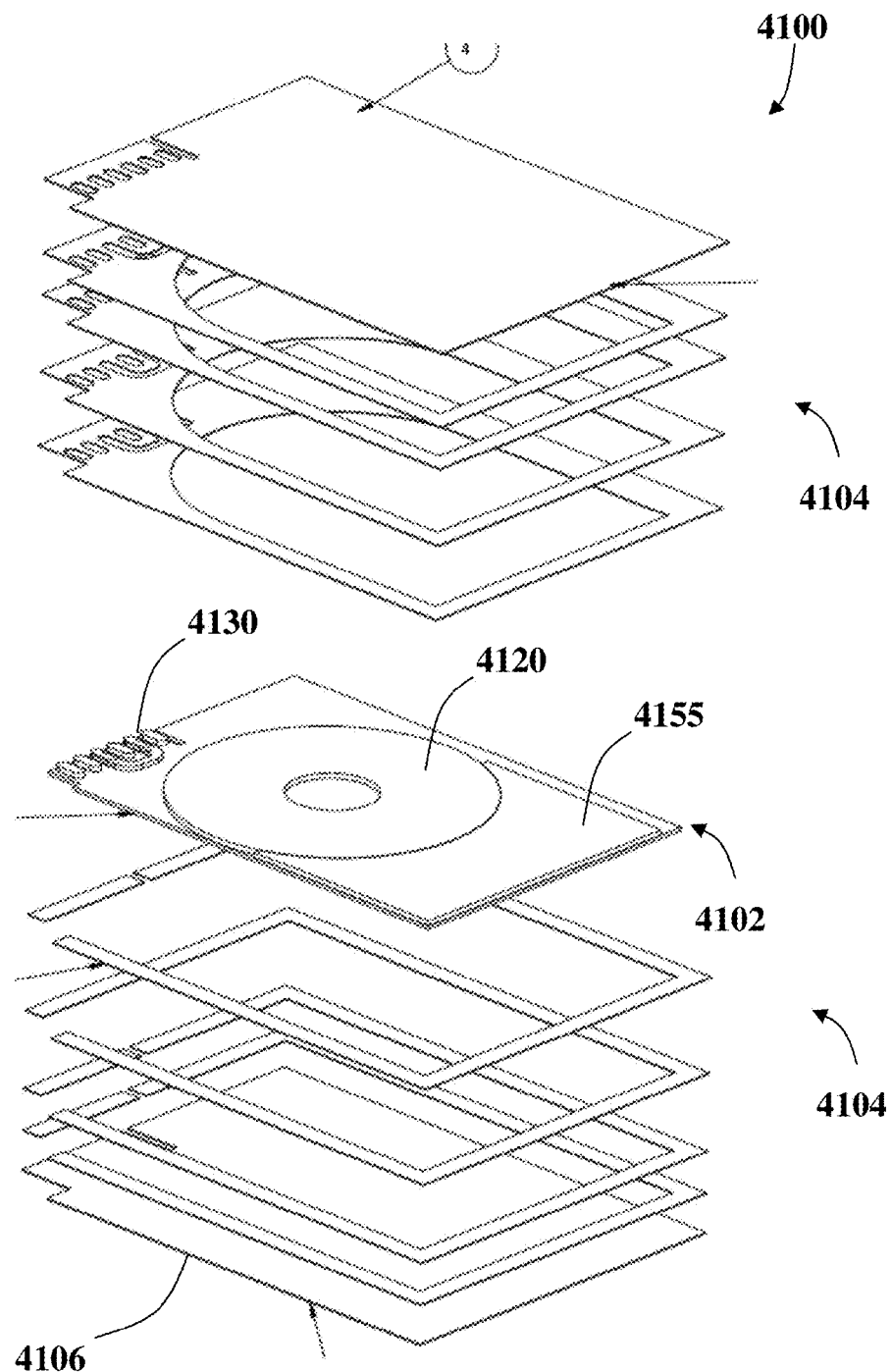

Referring now to FIGS. 8A-C an alternative embodiment of a wireless power receiver card 4100 is presented. FIG. 8A shows an isometric view, FIG. 8B shows a bottom view schematically and FIG. 8C shows an exploded view.

As noted above the wireless power receiver unit 4100 may be fashioned having a width and a length of substantially standard dimensions. With reference to FIGS. 8A and 8B, according to one system, the wireless power receiver unit 4100 may have a form of generally rectangular dimensions, for example having one lead edge 4107 including two extended portions 4111, 4113 and separated by a gap 4112 and forming a notch 4114. The first extended portion 4111 may be contiguous with the side edge 4115 adjacent thereto.

The second extended of portion 4113 may be provided with electrical contacts 4130 for coupling with the wireless power port of the host device. The gap 4112 formed between the two extended sections 4111, 4113 may provide a positioning element to assist alignment the electrical contacts 4130 with the corresponding contacts in the wireless power port. The notch 4114 may serve as an indication to the user of the correct orientation for insertion of the wireless power receiver unit 4100 into a universal port.

With reference to FIG. 8C, the wireless power receiver 4100 may further include a printed circuit board 4102, including a secondary inductor 4120 and reception circuit 4155, a ferromagnetic flux guide, such as a ferrite or the like, as well as various additional layers 4104 of spacers and adhesives, as well as a base layer 4016, as required.

Figure 9A:
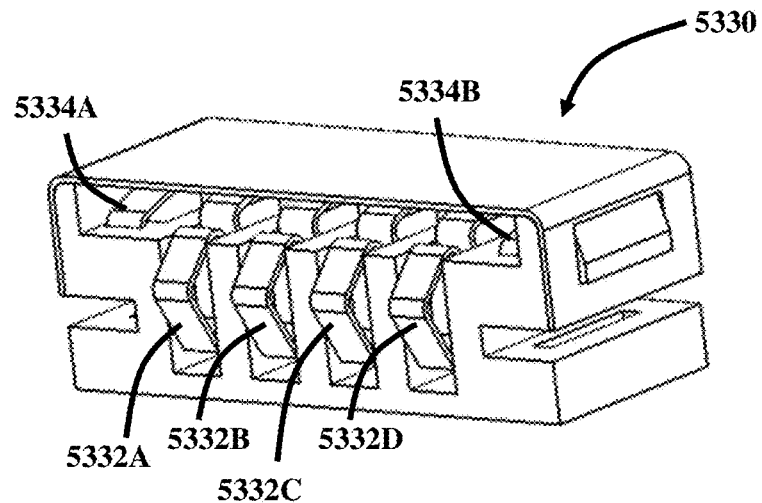
FIGS. 9A and 9B schematically represent an oblique view and an exploded view of one embodiment of an electrical contact apparatus for connecting embodiments of a wireless power receiver to a host device.
Figure 9B:
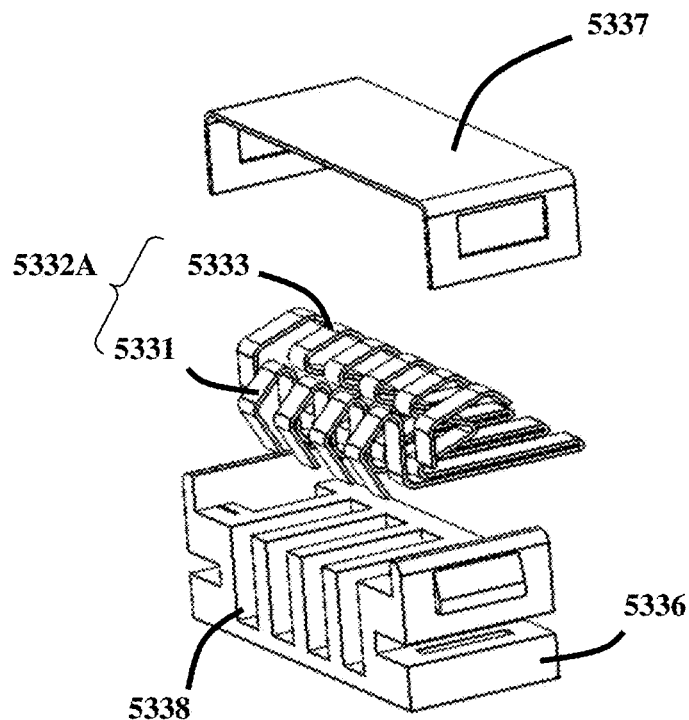

Referring now to FIGS. 9A and 9B, schematically representing an oblique view and an exploded view of one embodiment of an electrical contact apparatus 5330 for connecting embodiments of a wireless power receiver such as described herein to an electrical device ("host device"). The electrical contact apparatus 5330 may be incorporated into a wireless power port (for example, 300 of FIG. 2A, 300' of FIGS. 2B and 2C, and 300" of FIG. 2D) of a host device so as to provide a wireless power port therefor. Accordingly a conductive path between may be formed between the wireless power receiver and the host device (for example, between wireless power receiver 100 and host device 350 of FIG. 2A, between wireless power receiver 100 and host device 350' of FIGS. 2B and 2C, and wireless power receiver 100 and host device 350" of FIG. 2D).

The electrical contact apparatus 5330 may include a base 5336, a cover 5337 and an array of contact pins 5332A-D, 5334A-B. The contact pins 5332 are accommodated by recesses 5338 within the base 5336. Optionally a selection of pins may comprise power connectors 5332A-D and another selection of pins may comprise data connectors 5334A-B. It is noted that the cover 5336 and base 5337, form a port into which the wireless power receiver may be inserted to couple with at least some of the contact pins 5332A-D, 5334A-B.

It is a feature of the embodiments of the electrical contact apparatus 5330 that the power pins 5332A-D may serve as connectors for the power pack of a host device as well as for a wireless power port. Accordingly, it is particularly noted that the power pins 5332A-D may comprise a first connector section 5331 and a second connector section 5333. The first connector section 5331 may be configured to connect to a connector of a power pack of the second connector section 5333 may be configured to connect to the wireless power receiver.

Figure 10:
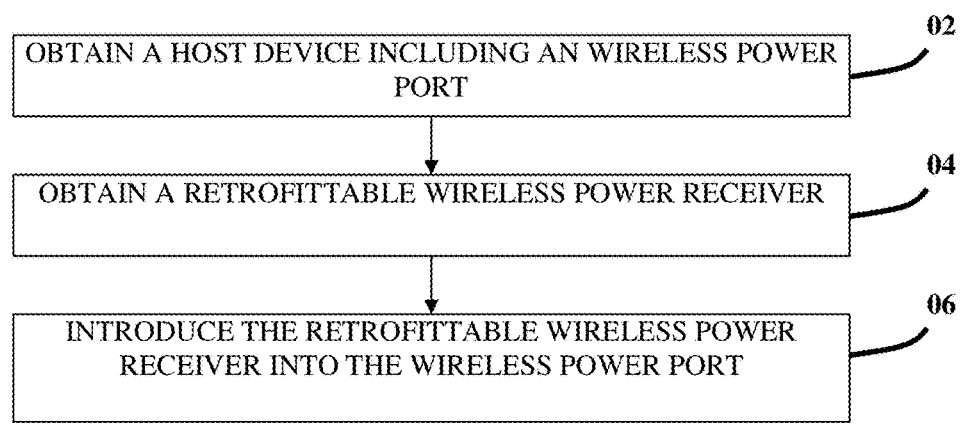
FIG. 10 is a flowchart showing selected actions of a method for providing wireless power reception functionality to a host device.

Optionally, the inductive charging pin-out connector may be further used to extend functionality from other recipients of Radio Frequency (RF) or digital signals on the host device, for example providing RFID enabled functionality. The shape of the wireless power receiver card and the layout of the first external connecting terminals may be based on a standard of plug-in universal wireless power port (UVVPP) standard. Referring to the flowchart of FIG. 10, selected actions are presented of a method for providing wireless power reception functionality to a host device. The method includes: obtaining a host device comprising a wireless power port configured to accommodate a wireless power receiver such as described herein 02; obtaining the wireless power receiver 04; and introducing the wireless power receiver unit into the wireless power port of the host device 06, such that at least one electrical contact conductively connects with at least one corresponding electrical contact in the wireless power port.

The second external connecting terminals may be disposed outside the minimum range of the terminal layout based on the standard for the first external connecting terminals. The first and second external connecting terminals include signal terminals electrically separated from one another.

An adapter may be based on Pogo pins for an IC wireless power receiver which performs a change of size so that a wireless power card smaller in planar size but almost equal in thickness can be used as a multi-wireless card with degraded functionality.

Embodiments relate to a connector member, in particular, a connector member for connection to a counterpart conductive pad as an I/O (input/output) connector comprising an IC wireless power receiver. The IC wireless power may be an inductive, a resonance or non-resonance reception device and so on for use in reception of energy.

It may be desirable that user feedback be provided during connection. For example tactile or audible feedback may be provided, for example by a connecting 'click' which may be felt or heard by the user when connection to the counterpart is established. Other feedback mechanisms will occur to those skilled in the art. The connector may connect a first connector element to a second connector element. The connector may be covered with a cover having a pair of side surfaces. A resilient locking portion is attached to each of the side surfaces.

With reference now to FIGS. 11A-E, further alternative embodiments of the wireless receiver card and associated wireless power port are provided. It is noted that the examples represented are provided for illustrative purposes only and the exact shape and dimensions of wireless power receiver card 6100 and the host device 6350, as well as the exact number of connecting pins or contacts therebetween may vary according to requirements. As shown in the schematic cross-sectional view of FIG. 11A, there is provided a wireless power receiver card 6100 capable of attaching to and electrically connecting to a host device (not shown). The wireless power receiver card 6100 may include a printed circuit board (PCB) 6110 that may have printed on it circuitry that includes a secondary inductor. The PCB 6110 may be connected to various components such as a reception circuit, NFC circuit and others that may be housed in a components unit 8120. The components unit 6120 may be about 500 microns in thickness. The wireless power receiver card 6100 may further include a ferromagnetic flux guide 6130 and an outer cover 6140. The ferromagnetic flux guide 6130 may comprise ferrite and may be about 250 microns in thickness. The outer cover 6140 may comprise, for example, a sticker or heat-curing foil and may be about 100 microns in thickness. It is noted that the wireless power receiver card 6100 may have an extended portion 6113, with the electrical contacts 6150 being situated therein. The electrical contacts 6150 may be configured to be electrically connected to corresponding contact of a host device 6350. It is noted that the extended portion 6113 may be thicker than the rest of the wireless power receiver card 6100, such that the card 6100 forms an L-like shape.

Figure 11A:
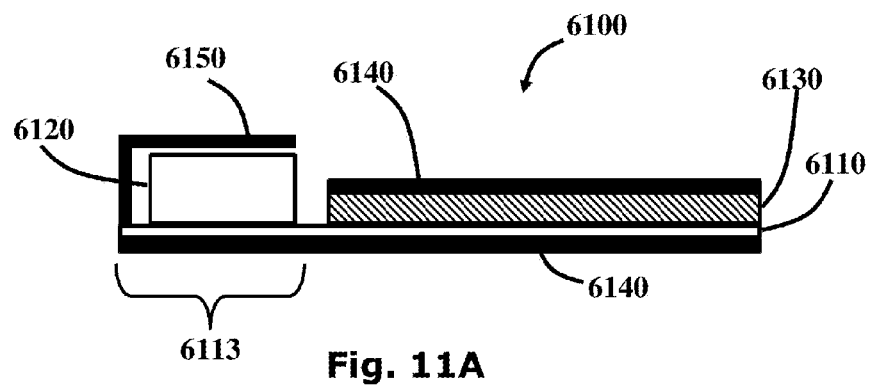
FIGS. 11A-G shows possible form factors for another embodiment of the wireless power receiver.
Figure 11B:
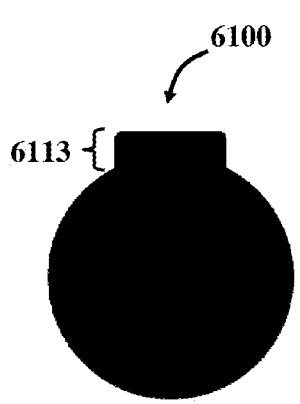

FIG. 11B shows the top view (facing away from the host device 6350) of a possible embodiment of the wireless power receiver card 6100. The wireless power receiver 6100 may be generally round in shape, as shown in FIG. 11B, or generally rectangular in shape, with standard dimensions.

Figure 11C:
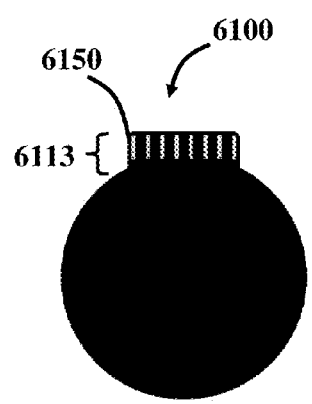

FIG. 11C shows the bottom view (facing towards the host device 6350) of said embodiment of the wireless power receiver 6100, showing the electrical contacts 6150.

Figure 11D:
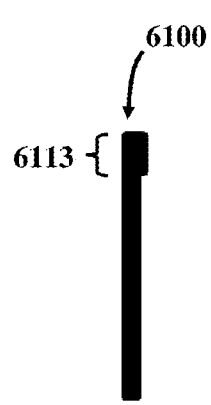

FIG. 11D shows the side view of said possible embodiment of the wireless power receiver 8100. It is noted that the extended portion 6113 may be thicker than the rest of the wireless power receiver card 6100, such that the card 6100 forms an L-like shape.

Figure 11E:
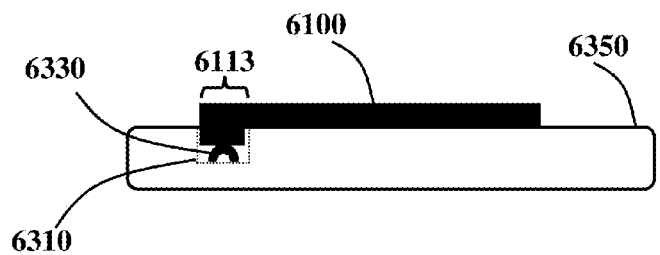

As shown in FIG. 11E, the host device 6350 may include an indentation 6310 containing therein electrical contacts 6330. The L-shaped wireless power receiver card 6100 may be configured to be attached to the host device 6350, thereby having the card electrical contacts 6150 be connected to the device electrical contacts 6330 located within an indentation 6310 of the host device 6350.

Figure 11F:
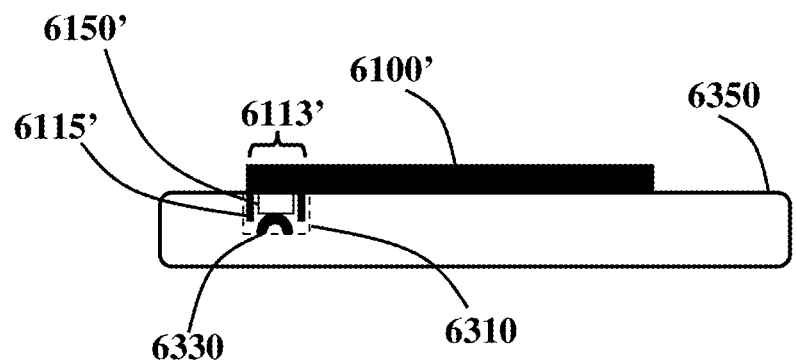
Figure 11G:
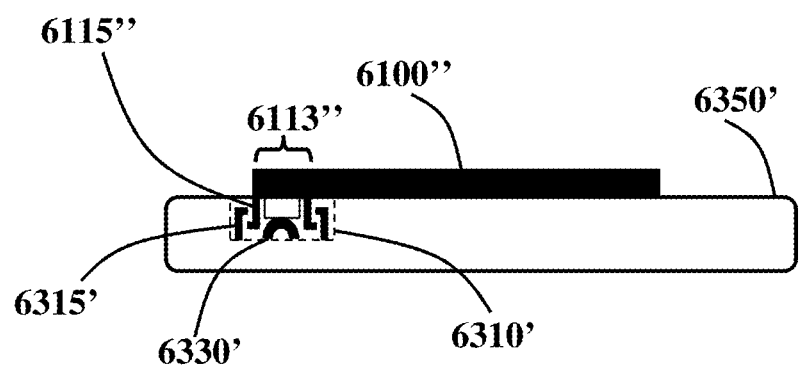

Referring now to FIGS. 11F-G, it is noted that for a wireless power receiver card 6100 to secure a connection with contacts within an indentation 6310 of the host device 6350, it is not necessary for the entire portion where the electrical contacts are situated to be thicker than the rest of the wireless power receiving card 6100. For example, as shown in FIG. 11F, the extended portion 6113' of the wireless power receiver card 6100' may have one or more linkers 6115' that create a snug fit into the indentation 6310, such that the connection between the card electrical contacts 6150' are connected to the device electrical contacts 6330'. The linkers 6150' may be, for example, a frame or an array of pins along one or more edges of the extended portion 6113'. Alternatively or in addition, as shown in FIG. 11G, the linkers 6115" of the wireless power receiver card 6100" may be shaped to include a snap, lip, or the like that serves to prevent the wireless power receiver card 6100" from dislodging from the host device 6350'. In addition, the indentation 6330' may include matching linkers 6315' that are configured to interlock or otherwise engage with the linkers 6115", thereby further securing the wireless power receiver card 6100" to the host device 6350'. The linkers 6150" may be, for example, a frame or an array of pins along one or more edges of the extended portion 6113". The linkers 6315' may be, for example, a frame or an array of pins along one or more edges of the indentation 6310'.

With reference now to FIGS. 12A-E, alternative embodiments of the wireless power receiver card and associated wireless power port that may be provided as part of a wireless power reception system 7000. It is noted that the examples represented are provided for illustrative purposes only and the exact shape and dimensions of the components of the system (e.g., the inductive power receiver card and the socket) as well as the exact number of connecting pins or contacts between the wireless power receiver card and the wireless power port may vary according to requirements.

Figure 12A:
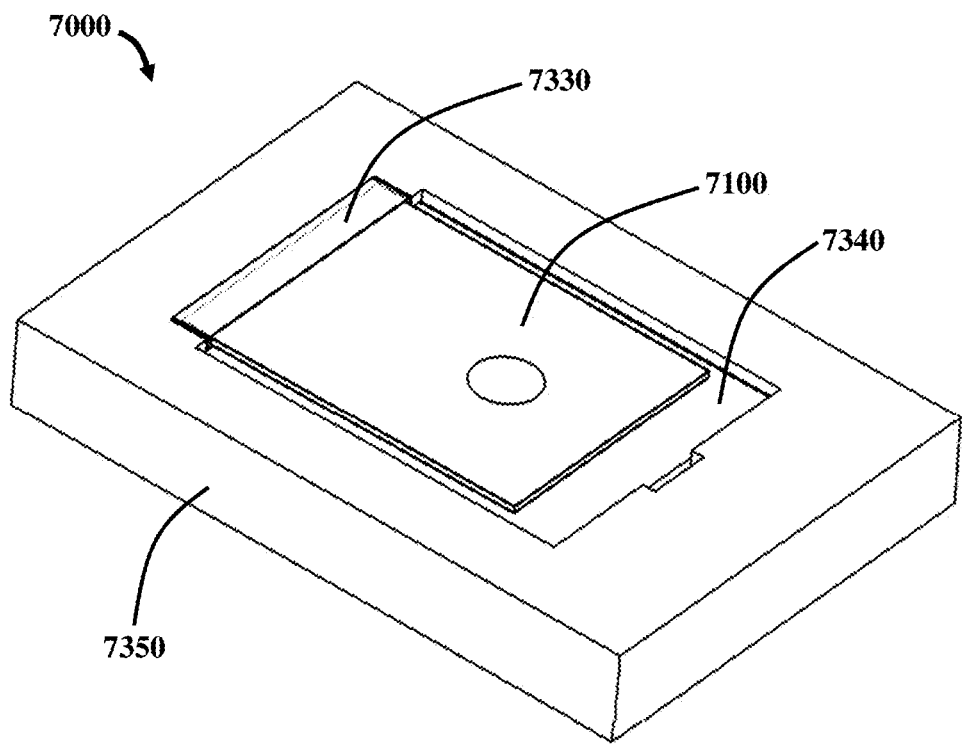
FIGS. 12A-E schematically represents how a wireless power receiver may be accommodated by a wireless power port incorporated into a host device.
Figure 12B:
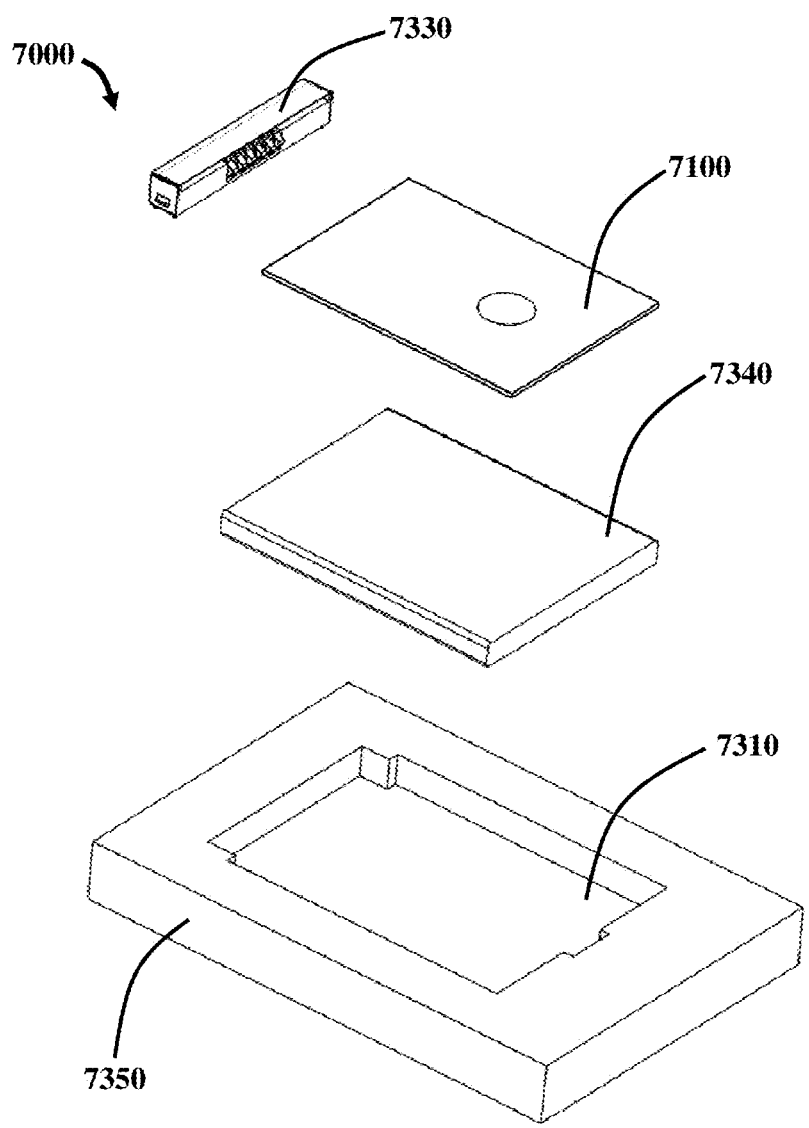

FIG. 12A shows an isometric view, the wireless power reception system 7000 may including a wireless power receiver card 7100 that may be connected to an electrical contact apparatus 7330, both being fitted inside a host device 7350, together with a power pack 7340. The power pack 7340 may be connected to the electrical contact apparatus, such that it is capable of receiving charge from the wireless power receiver card 7100. Further, the power pack 7340 may be connected to the host device 7350 such the power pack 7340 is capable of providing power to the host device 7350. FIG. 12B shows an exploded view of same, showing a common bay 7310 within the host device 7350 that accommodates the power pack 7340, the electrical contact apparatus 7330 and the wireless power receiver card 7100.

Figure 12C:
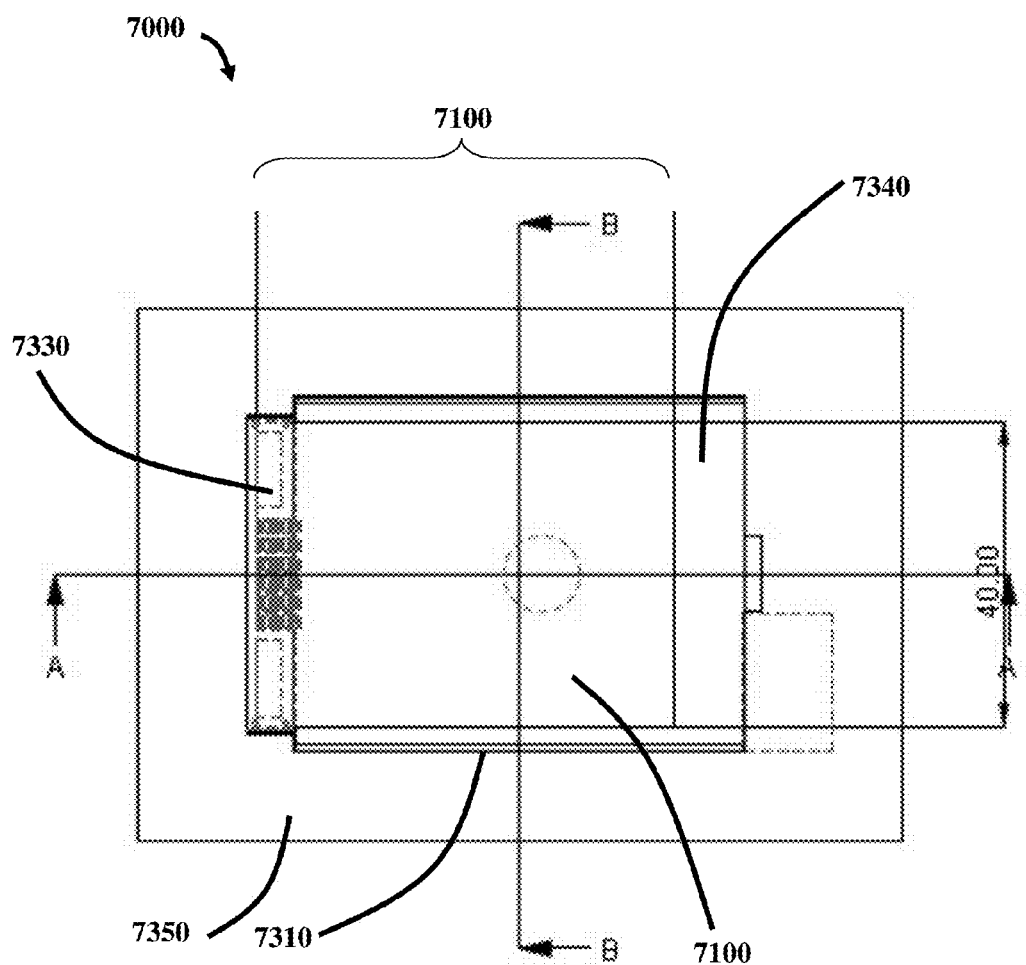
Figure 12D:
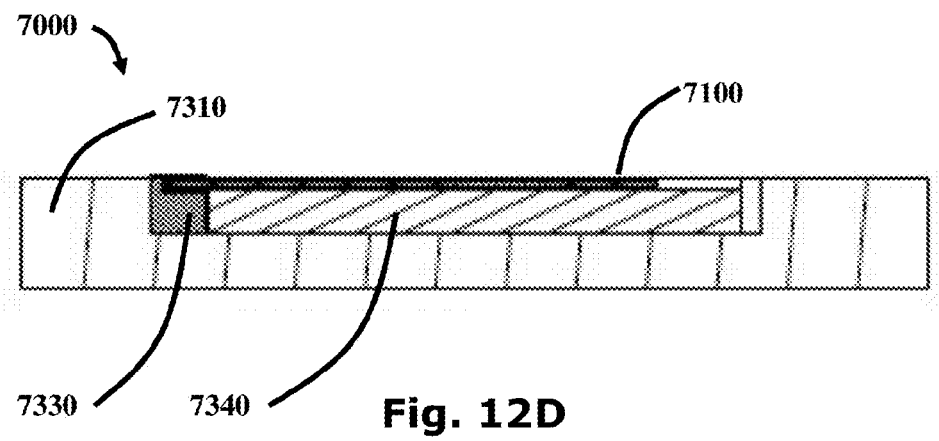
Figure 12E:
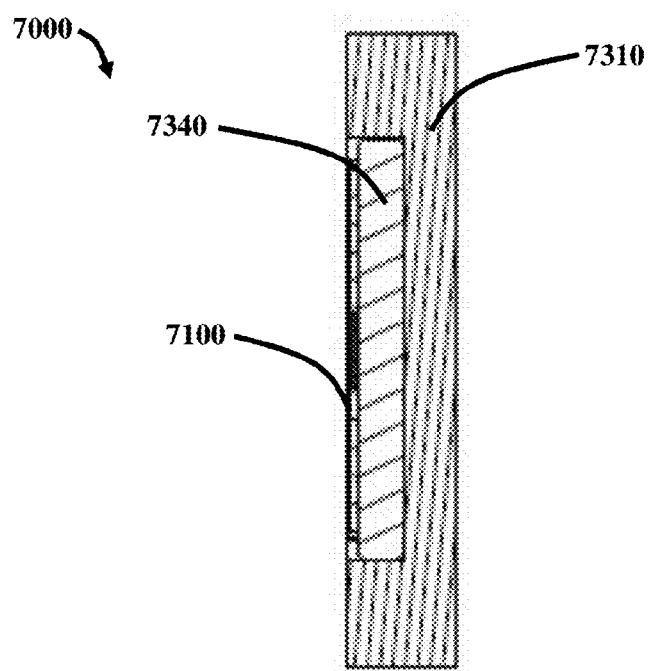

FIG. 12C is a schematic diagram of the wireless power reception system 7000 showing the wireless power receiver card 7100 connected to the electrical contact apparatus 7330 inside the common bay 7310 within the host device 7350. FIG. 12D shows the cross section along line A of FIG. 12C, and FIG. 12E shows the cross section along line B of FIG. 12C.

Figure 13:
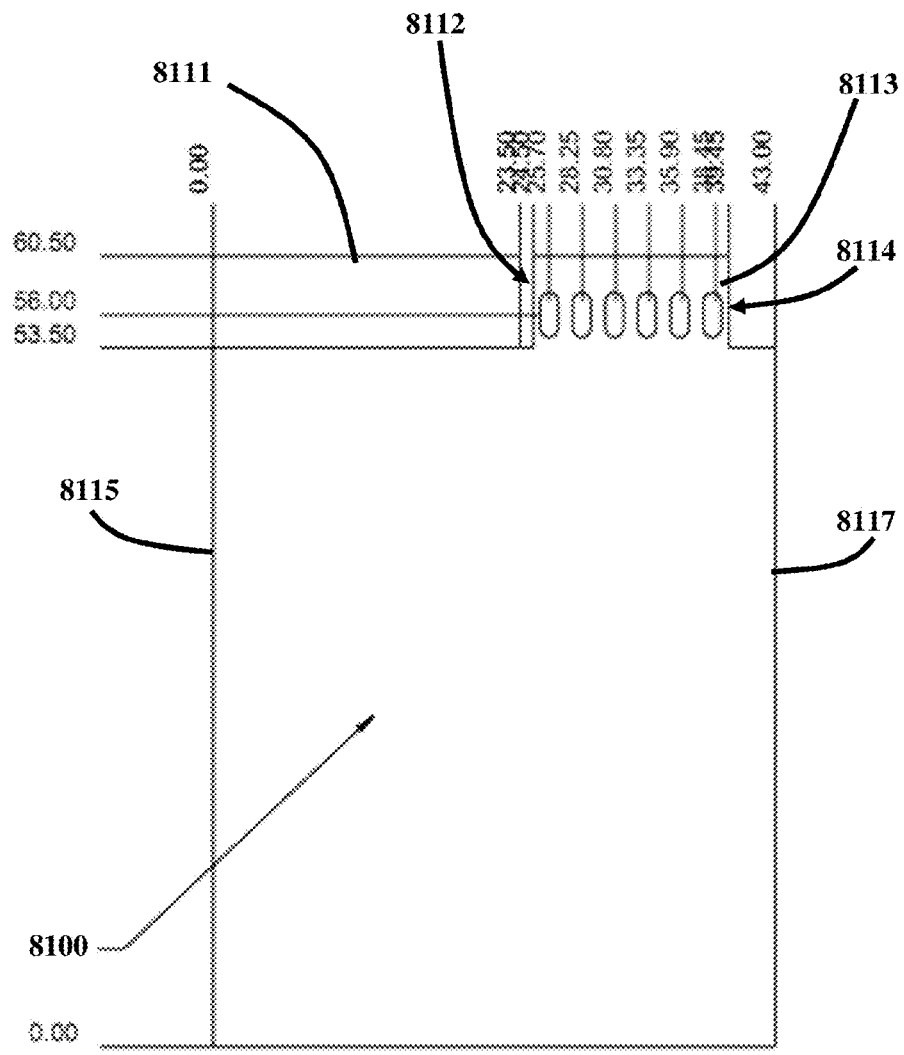
FIG. 13 shows another possible form factor for another embodiment of the wireless power receiver.

FIG. 13 is a diagram showing, for illustrative purposes only, a possible form factor for an embodiment of one class of the wireless power receiver card 8100. The wireless power receiver card may include a lead edge 8107 including two extended portions 8111, 8113 protruding therefrom, say, 7.00 millimeters or so, and separated by a 1.00 millimeter gap 8112. The first extended portion 8111 may be contiguous with the first side edge 8115 adjacent thereto. The second extended portion 8113 may form a notch 8114, say 3.55 millimeters from the second side edge 8117.

Where suitable, the gap between the two extended portions 8111, 8113 may be situated at a distance of, say, 23.50 millimeters from the contiguous first side edge 8115, with the second extended portion 8111 at a distance of 24.50 millimeters therefrom. Six contacts, say may be situated upon the second extended portion 8111 and may be arranged at distances of 25.70 millimeters, 28.25 millimeters, 30.80 millimeters, 33.35 millimeters, 35.90 millimeters and 38.45 millimeters from the first side edge 8115 and 4.50 millimeters from the leading edge. It will be appreciated that other form factors may be selected for different embodiments as required. Furthermore as noted above, different classes of card may each have its own characteristic form factor.

Optionally the host device may include a cavity provided for the accommodation of the wireless power receiver card therein. For example the cavity may be installed above a mobile handset battery pack and within the back cover possibly with a connector situated at the upper right corner thereof and aligned with the battery connector. A combined connector for battery and the universal power port may be implemented such as described herein, for example.

Figure 14A:
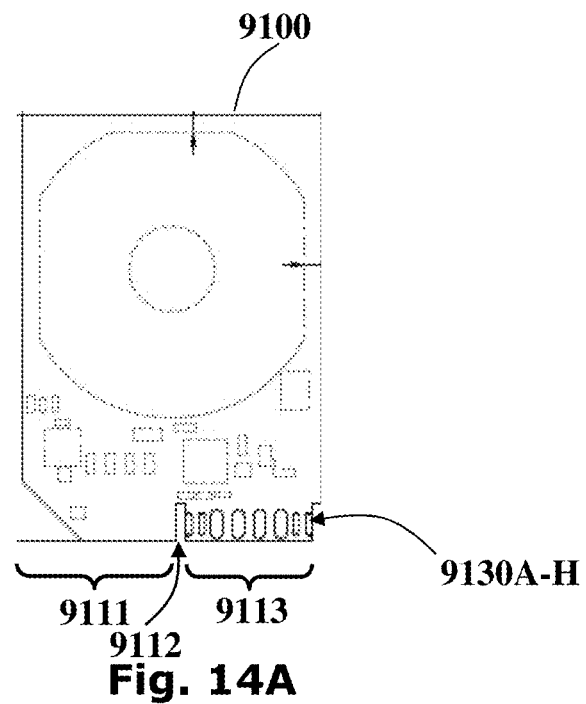
FIGS. 14A-E show a further possible form factor for still another embodiment of the wireless power receiver and the electrical contact apparatus.
Figure 14B:
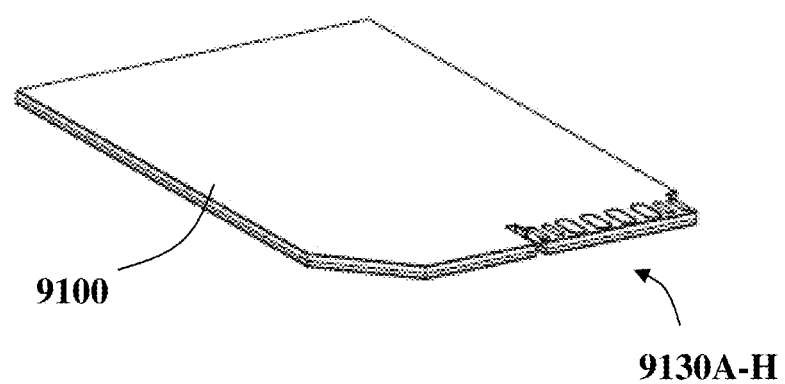
Figure 14C:
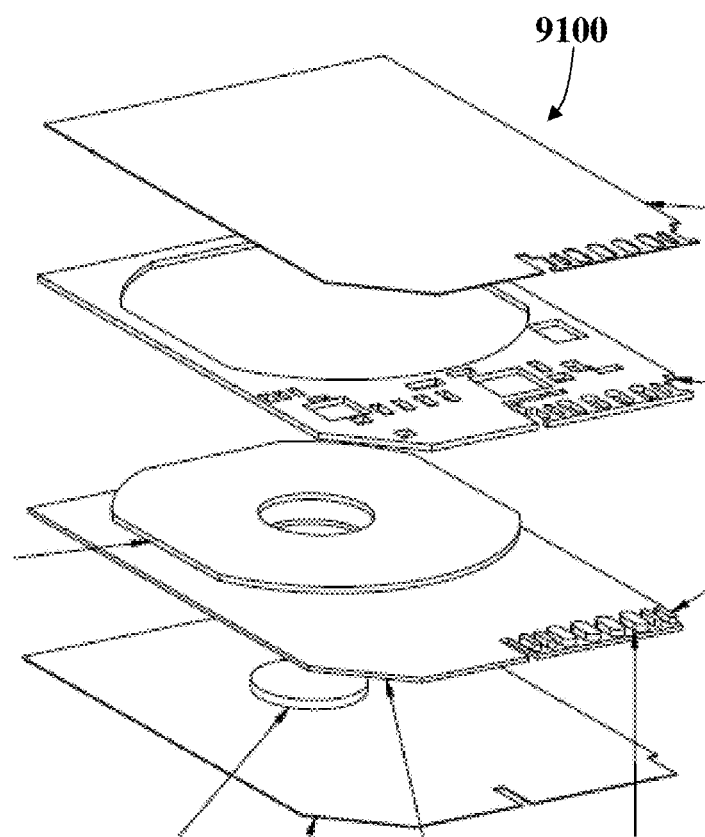
Figure 14D:
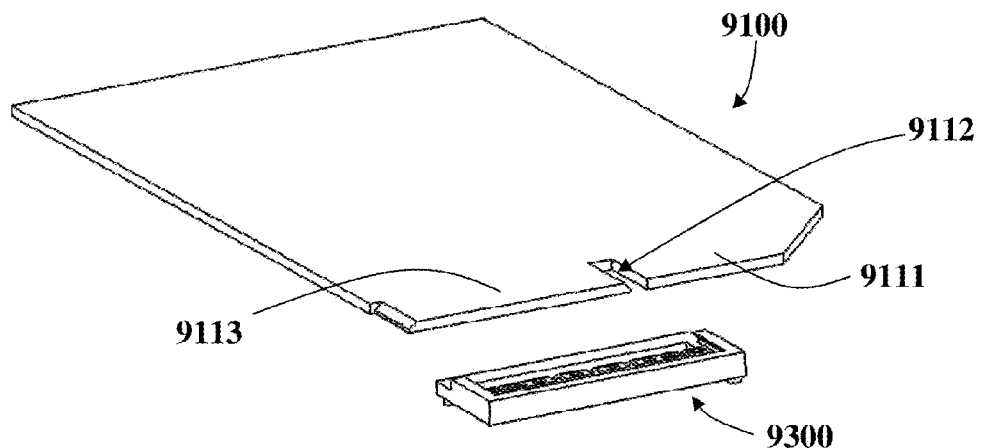
Figure 14E:
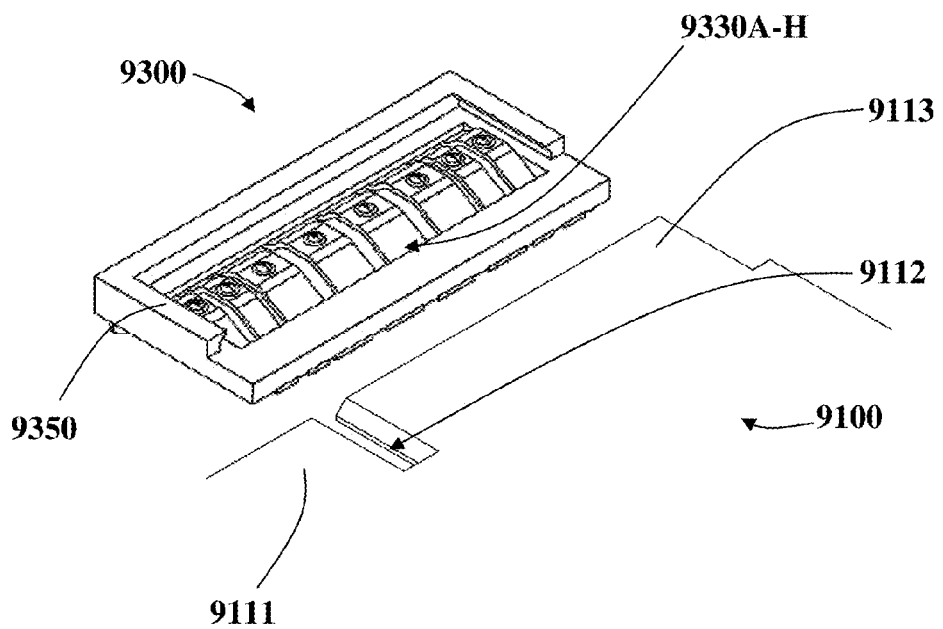

Referring now to FIGS. 14A-G another embodiment of the wireless power receiving card 9100 and the electrical contact apparatus 9300 is presented. It is noted that the examples represented are provided for illustrative purposes only and the exact shape and dimensions wireless power receiver card 9100 and the electrical contact apparatus 9300, as well as the exact number of connecting pins or contacts between the wireless power receiver card 9100 and the electrical contact apparatus 9300 may vary according to requirements. FIG. 14A shows a bottom view of the wireless power receiving card 9100, having two extended portions 9111, 9113 protruding therefrom, the extended portions being separated by a gap 9112. One of the extended portions, say, extended portion 9113, may have electrical contacts 9130. FIG. 14B shows an isometric view of the wireless power receiving card 9100, with the bottom surface facing up. FIG. 14C shows an exploded view of the wireless power receiving card 9100. FIG. 14D shows an isometric view of the wireless power receiving card 9100, with its bottom surface facing down, in relation to an electrical contact apparatus 9300. The electrical contact apparatus 9300 istypically connected physically and electrically to a host device (not shown). The wireless power receiving card 9100 may include eight contacts 9130A-H, and the electrical contact apparatus 9300 may include eight contacts 9330A-H. Such contacts (9130, 9330) may comprise gold plated fingers, for example, on the bottom of the printed circuit board. Such contacts may be 1.5 millimeters in width and 4 millimeters long with an intercontact spacing of about 2.55 millimeters, for example. The contacts 9310A-H of the wireless power receiving card 9100 are configured to be electrically connected with the contacts 9330A-H, respectively, of the electrical contact apparatus when the extended portion 9113, where the contacts 9130A-H are located, are properly inserted into the electrical contact apparatus 9300. The eight contacts 9130A-H may correspond, in no particular order, to the power and data constructs as described below in the section "Power contacts and data contacts between a wireless power receiver and a host device", e.g., to the contacts GND, Vsupply, SMB_CLK, MB-DAT, Spare/SWP, Vcc, Ant1 and Ant2 or to the contacts ANT1, ANT2, Vcc, SCL, SDA, DISABLE, VOUT, and GND. In certain embodiments, only a subset of the contacts present may be in operation. For example, a particular embodiment of the wireless power receiver card 9100 may contain eight contacts 9130A-H, with three of them being operational, serving as DISABLE, VOUT and GND.

The extended portion 9113 of the wireless power receiving card 9100 and the insertion guide 9350 of the electrical contact apparatus 9300 may have corresponding chamfered edges that improve guidance of the insertion of the extended portion 9113 into the electrical contact apparatus 9300 as well as secure the electrical connection between the contacts 9330A-H and 9130A-H once the insertion is complete. In addition, the gap 9112 may also serve as a guiding means, such that the gap 9112 is configured to closely fit a portion the insertion guide 9350, thus securing the wireless power receiving card 9100 from unwanted lateral movement.

Figure 15A:
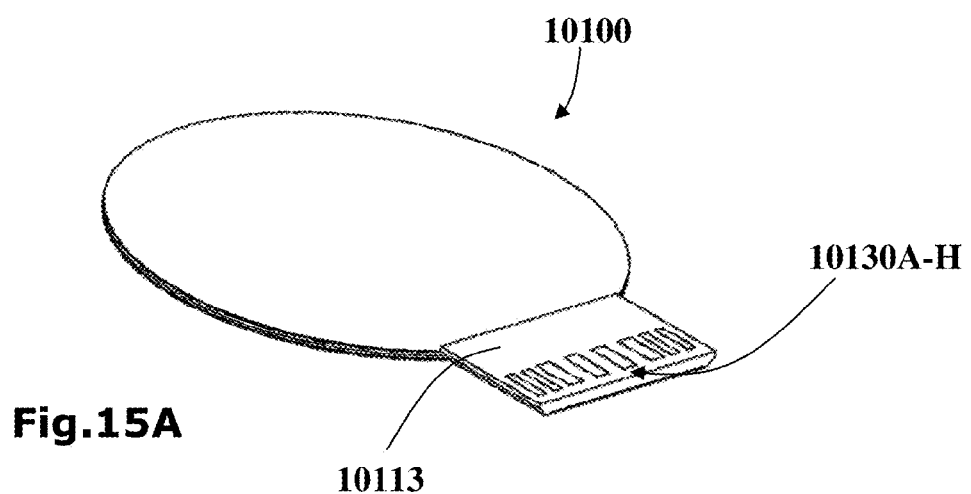
FIGS. 15A-C show a further possible form factor for still another embodiment of the wireless power receiver and the electrical contact apparatus.
Figure 15B:
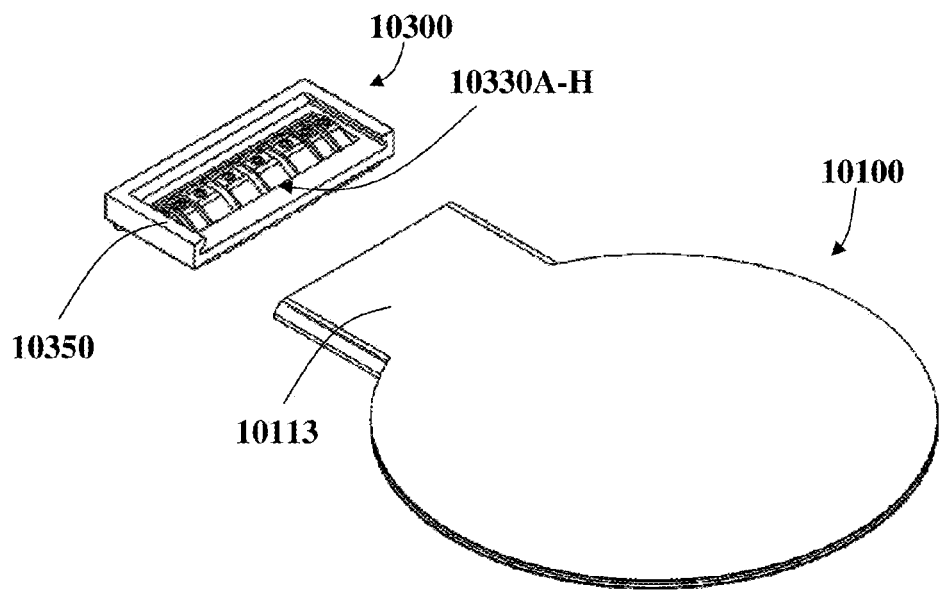
Figure 15C:
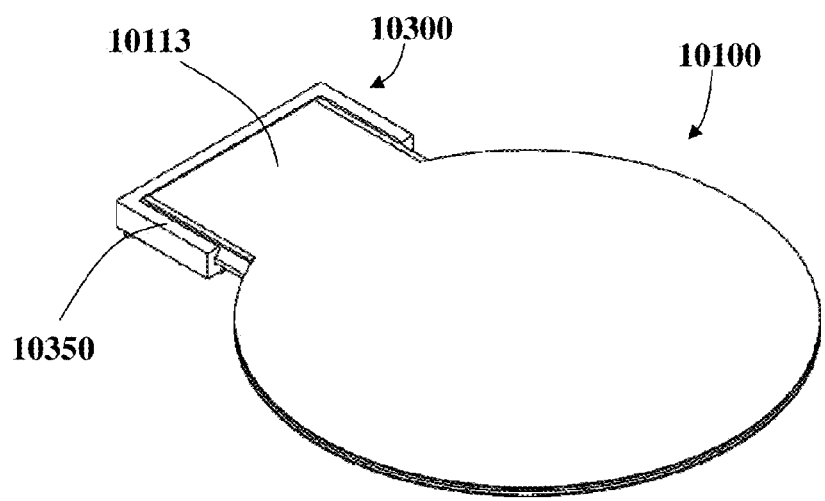

Referring now to FIGS. 15A-C, yet another embodiment of the wireless power receiving card 10100 and the electrical contact apparatus 10300 is presented. It is noted that the examples represented are provided for illustrative purposes only and the exact shape and dimensions of the wireless power receiver card 10100 and the electrical contact apparatus 10300, as well as the exact number of connecting pins or contacts between the wireless power receiver card 10100 and the electrical contact apparatus 10300 may vary according to requirements. FIG. 15A shows an isometric view of the wireless power receiving card 10100, with its bottom side facing up, It is noted that the wireless power receiving card 10100 may have an extended portion 10113, where the contacts 10130A-H are located. FIG. 15B shows the reverse side of the wireless power receiving card 10100 (top side facing up), in relation to an electrical contact apparatus 10300, which may include contacts 10330A-H. The contacts (10130, 10330) may comprise gold plated fingers, for example, on the bottom of the printed circuit board. Such contacts may be 1.5 millimeters in width and 4 millimeters long with an intercontact spacing of about 2.55 millimeters, for example. With reference to FIG. 15C, the contacts 10130A-H of the wireless power receiving card 10100 are configured to be electrically connected with the contacts 10330A-H, respectively, of the electrical contact apparatus 10300 when the extended portion 10113 is properly inserted into the electrical contact apparatus 10300. The eight contacts 10130A-H may correspond, in no particular order, to the power and data constructs as described below in the section "Power contacts and data contacts between a wireless power receiver and a host device", e.g., to the contacts GND, Vsupply, SMB_CLK, MB-DAT, Spare/SWP, Vcc, Ant1 and Ant2 or to the contacts ANT1, ANT2, Vcc, SCL, SDA, DISABLE, VOUT, and GND. In certain embodiments, only a subset of the contacts present may be in operation. For example, a particular embodiment of the wireless power receiver card 10100 may contain eight contacts 10130A-H, with three of them being operational, serving as DISABLE, VOUT and GND.

The extended portion 10113 of the wireless power receiving card 11100 may have chamfered edges that improve guidance of the wireless power receiving card 11100 into a wireless power port, as well as secure the electrical connection between the contacts 10130A-H of the wireless power receiving card 11100 and the contacts of the wireless power port once the insertion is complete.

Referring now to FIGS. 16A-C, yet another embodiment of the wireless power receiving card 11100 is presented. It is noted that the examples represented are provided for illustrative purposes only and the exact shape and dimensions wireless power receiver card 11100, as well as the exact number of connecting pins or contacts between the wireless power receiver card 11100 may vary according to requirements.

FIG. 16A shows the bottom view of the wireless power receiver card 11100, showing the chamfered edges that guides its insertion into a wireless power port. The chamfered edges may be set at an angle, e.g., of about 63.4 degrees.

FIG. 16B shows the cross section of the wireless power receiver card 11100 along line A as shown in FIG. 16C.

FIG. 16C shows the front view of the wireless power receiver card 11100. The wireless power receiver card 11100 may include a lead edge 11107, a bottom edge 11108 and an extended portion 11111. The wireless power receiver card 11100 may have a length along the extended portion 11111 of about 55 millimeters, a width along the lead edge 11108 and bottom edge 11108 of about 35 millimeters and a thickness of about 1.05 mm. The wireless power receiver card 11100 may include a trimmed corner at one of the corners along the lead edge. The trimmed corner may provide a fifth edge of the card 11100 of about 3 millimeters in legth, oriented at a 45 degree angle from its adjacent edges.

A plurality of electrical contacts 11130A-H, including power contacts and data contacts, may be situated on near the lead edge 11107. The eight contacts shown in FIG. 16C may correspond, in no particular order, to the power and data constructs as described below in the section "Power contacts and data contacts between a wireless power receiver and a host device", e.g., to the contacts GND, Vsupply, SMB_CLK, MB-DAT, Spare/SWP, Vcc, Ant1 and Ant2 or to the contacts ANT1, ANT2, Vcc, SCL, SDA, DISABLE, VOUT, and GND. In certain embodiments, only a subset of the contacts present may be in operation. For example, a particular embodiment of the wireless power receiver card 11100 may contain eight contacts, with three of them being operational, serving as DISABLE, VOUT and GND.

The extended portion 10113 of the wireless power receiving card 10100 and the insertion guide 10350 of the electrical contact apparatus 10300 may have corresponding chamfered edges that improve guidance of the insertion of the extended portion 10113 into the electrical contact apparatus 10300 as well as secure the electrical connection between the contacts 10330A-H and 10130A-H once the insertion is complete.

Small Size—Heat Dissipation Mechanisms

In addition, various features of the system may be directed towards allowing the control components to have smaller size. A known limitation upon the size of electrical components is the rate at which they can dissipate heat. Smaller components do not dissipate heat as well as larger components. Selected embodiments of the system reduce the heat generated by the control components so that they may be of smaller dimensions.

A first heat reduction feature enabling small control components is described in copending U.S. patent application Ser. No. 12/497,088, which is incorporated herein by reference. The frequency of the oscillating driving voltage of the primary inductor may be significantly different from the resonant frequency of the inductive coupling system. Non-resonant transmission uses lower transmission voltages than resonant transmission, consequently less heat may be generated by control components and they may therefore have smaller dimensions. It is further noted that, when using non-resonant inductive power transmission, a feedback signal for regulating power transfer may be passed from the inductive receiver to the inductive transmitter via an inductive communication channel.

An inductive communication channel may include a transmission circuit associated with the inductive power receiver and a receiving circuit associated with an inductive power transmitter. The transmission circuit is wired to the secondary coil and the receiving circuit is wired to the primary coil.

The signal transmission circuit includes at least one electrical element, selected such that when it is connected to the secondary coil, the resonant frequency of the system increases. The transmission circuit is typically configured to selectively connect the electrical element to the secondary coil. Any decrease in either the inductance or the capacitance increases the resonant frequency of the system, which may be detected by the signal receiving circuit.

Typically, the signal receiving circuit includes a voltage peak detector configured to detect large increases in the transmission voltage. In systems where the voltage transmission frequency is higher than the resonant frequency of the system, such large increases in transmission voltage may be caused by an increase in the resonant frequency thereby indicating that the electrical element has been connected to the secondary coil. Thus the transmission circuit may be used to send a signal pulse to the receiving circuit and a coded signal may be constructed from such pulses. The transmission circuit may also include a modulator for modulating a bit-rate signal with the input signal. The electrical element may then be connected to the secondary inductive coil according to the modulated signal. The receiving circuit may include a demodulator for demodulating the modulated signal. For example the voltage peak detector may be connected to a correlator for cross-correlating the amplitude of the primary voltage with the bit-rate signal thereby producing the output signal.

It is noted that the use of such an inductive communication channel avoids the necessity for large transceivers such as are necessary with other wireless signal transfer such as using known radio wave based protocols.

A second heat reduction feature enabling small control components, which is used in other embodiments of the power pack, is that a low heat loss rectifier is used to convert AC power from the secondary inductor to DC power to charge an electrochemical cell.

Physical Parameters and Components

Various physical parameters and protocols may be used with the universal wireless power port and the wireless power receiver card. For illustrative purposes only, an example of a selection of parameter is provided indicating possible mechanical, electrical and software application program interface (API) requirements for interfacing with such a card. In addition a possible user interface (UI) is proposed to support wireless charging card configuration.

According to certain embodiments an wireless power receiver card may be provided having dimensions such as a thickness of about 0.7 millimeters and a form factor of, say 35 millimeters by 50 millimeters. Universal wireless power ports may then by provided in electric devices having dimensions corresponding to those of the wireless power receiver card such that the card may be accommodated thereby.

Accordingly the secondary inductor of such a wireless power receiver card may have a diameter of between, say, 13 millimeters and 40 millimeters with an inductance of around 4.6 to 4.8 microhenries at a frequency of 100 hertz, for example, with a coil resistance of about 143 milliohms.

A magnet may be provided for the wireless power receiver card, which may serve the purpose of guiding correct placement of the wireless power receiver card within a wireless power port within the host device. The magnet may have dimensions of, say, a 10 millimeter diameter and a 0.6 millimeter thickness. For example, a NdFeB, Grade N52 material may be used having a nickel-copper-nickel (Ni—Cu—Ni) coating and orientated with its poles along the flat sides. Suitable ratings for the magnet may be a Brmax rating (of magnetic force) of say 800 to 1200 Gauss or 14,800 Gauss and a BHmax rating of say 52 MGOe.

A flux guide may be provided to direct the alternating current (AC) magnetic field induced by a wireless power transmitter possibly with an efficiency of 70% or more. Where appropriate, a ferrite may be used having the following parameters: a saturation flux density of 0.49 teslas with a permeability of around 2400 u for an operating frequency between 100 kilohertz to 500 kilohertz.

The contacts of the wireless power receiving card and the universal wireless power port may be selected as required. According to various embodiments, the number of electric contacts may be four, six, eight or other number. For example two contacts may be provided for transferring a first power level of say 5 volts at 0.5 amps direct current, with two further contacts for a second power level of say 30 volts at 50 milliamps and say a frequency of 13.56 megahertz. Further contacts may be provided for data communication channels, such as $I^2C$ or SMB for example. Where appropriate, four data contacts may be provided for such a purpose.

Generally the wireless power receiving card should be rigorous enough to withstand somewhat rough treatment including multiple insertions into a universal power port, operating temperatures of between 0 Celsius to 85 Celsius. Where possible, package materials should be selected which do not include conductive particles and finished such that the surface may be printed upon or an adhesive layer adhered thereto. Moreover, materials and parameters may be selected which may be suitable for mass production at relatively low cost and with a fast production time.

Near Field Communication (NFC)

Near Field Communication (NFC) is another technology gaining popularity, particularly in mobile communication devices. NFC antennas and inductive charging secondary inductor receivers may share similar design yet when combined they may compete for the same limited real estate of their host device. A solution allowing facilitating both technologies in a single antenna may be implemented such as described in the applicants copending patent application U.S. patent application Ser. No. 13/053,857, for example, which is incorporated herein by reference. Accordingly, a wireless power antenna, or secondary inductor of a wireless power receiver card may be shared by an NFC circuit, which may be situated in the host device or integrated onto the card itself.

It is noted that the transmission frequencies used by Near Field Communication signals and inductive power signals are sufficiently close that concurrent NFC and inductive power transfer may interfere with each other. Accordingly, where appropriate, a combined NFC and inductive power transfer module may be operable in time-division-mode (TDM).

In time-division-mode the combined NFC and inductive power transfer module may be operable to prevent concurrent communication of both signals, such that reception of signals of one type are interrupted while reception of the other signals are received.

It will be appreciated that NFC signals are generally of shorter duration and are more time critical than inductive power transfer signals. Accordingly, the NFC reader may be configured to serve as a master and operable to override the inductive power receiver ceasing inductive power transfer when appropriate. Alternatively, if the NFC were less time critical say, the inductive power receiver may be configured to serve as the master.

Optionally, a mutual logic control unit may be provided between the NFC reader and the inductive power receiver. The mutual logic control may be operable to instruct the inductive power receiver to interrupt power transmission, when an NFC signal is received.

In some cases the incoming NFC communication may include a request signal, detectable by the combined NFC and inductive power transfer module. Receipt of the request signal may trigger the control unit to interrupt inductive power reception for the duration of the NFC communication. Optionally an end-of-communication (EOC) signal may be sent at the end of the NFC communication. The EOC signal may be used to trigger the control unit to resume inductive power reception.

Alternatively, where the NFC communication does not include a request signal, the NFC signal may be initially received concurrently with the inductive power transfer, for example as a superimposed signal. Detection of the NFC communication may trigger the control unit to interrupt inductive power reception. When the NFC communication is no longer detected, the system may revert to inductive power transfer mode.

Accordingly, an NFC reader chip may be configured to include a pin providing a signal when a communication is received. Such an output pin may be used to interrupt inductive power transmission, for example, where the output pin is connected to an override pin of a corresponding inductive receiver chip.

Where the combined NFC inductive power transfer module includes a common antenna switchable between the NFC reader and the inductive power reception circuit, the controller may further control switching between the antenna and the inductive power receiver.

It is particularly noted that where a separate NFC antenna and secondary inductor are provided, interruption of the inductive transmission signal may be used to reduce interference during reception of the NFC signal.

Standardized Location of Wireless Power Port

Figure 17A:
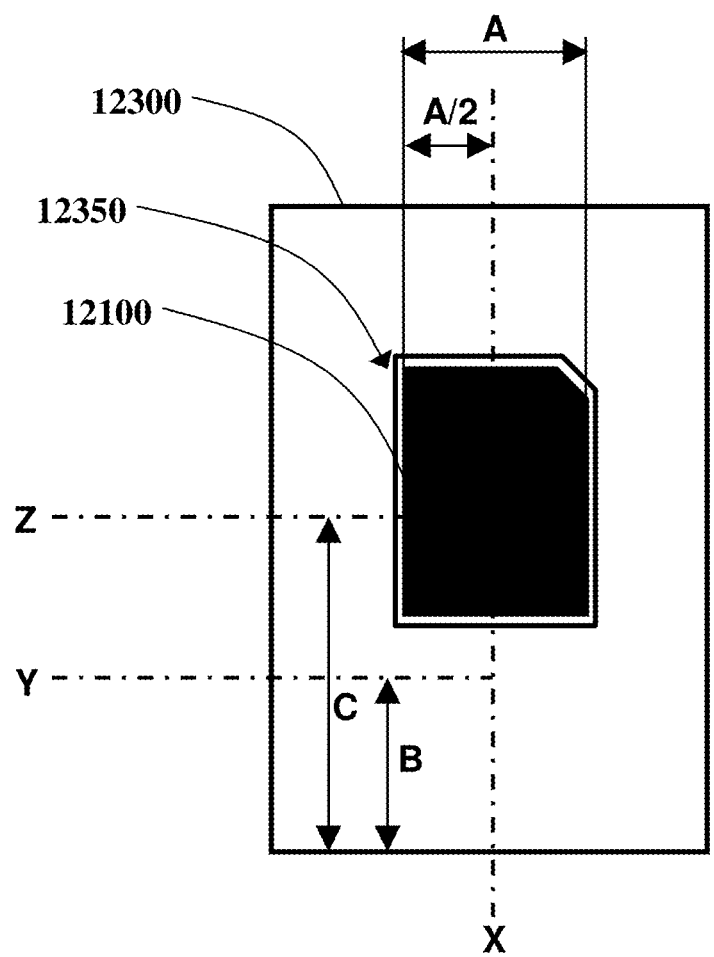
FIG. 17A schematically represents the positioning of a wireless power receiver inserted into a wireless power port of a host device.

The wireless power port may be situated in the host device in a standardized format defining the position of the wireless power receivering card within the host device. In one embodiment of the stantardized format, referring to FIG. 17A, the wireless power port 12350 may be configured such that the wireless power receiver card 12100, as well as the secondary inductor within it, is centered along the width of the host device 12300. As such, for a wireless power receiving card 12100 havin a width A, the distance of its side edge from the center of the host device 12300, as defined by the line X, is half of A (i.e., A/2). Further, the the bottom edge of the wireless power receiving card may be situated at a location between 2 predefined distances from the bottom of the host device 12300, depicted in FIG. 17 by the lines Y and Z. In an exemplary embodiment, the distance between the bottom of the host device and line Y may be about 40.55 millimeters or, and the distance between the bottom of the host device and line Z may be 55.85 millimeters. In another exemplary embodiment, the distance between the bottom of the host device and line Y may be about 38.05 millimeters or, and the distance between the bottom of the host device and line Z may be 53.35 millimeters, where the secondary inductor of the wireless power receiver card has a width of about 40 millimeters. Further, the wireless power port 12350 may be configured to allow the insertion of a standard wireless power receiving card, for example the wireless power receiving card 11100 as shown in FIGS. 16A-C, having a width A of about 35 millimeters and a length of about 55 millimeters.

The wireless power port may include a space available for the insertion of a wireless power receiver card and at least one mechanism for securing the wireless power receiver card in place. The wireless power port may further include least one electrical contact unit for data and power transmission between the wireless power receiver card and the host device. Alternatively, the wireless power port may position the wireless power receiver card such that it can form an electrical connection (via one or more electrical contacts) with the electrical contact unit of the host device.

Figure 17B:
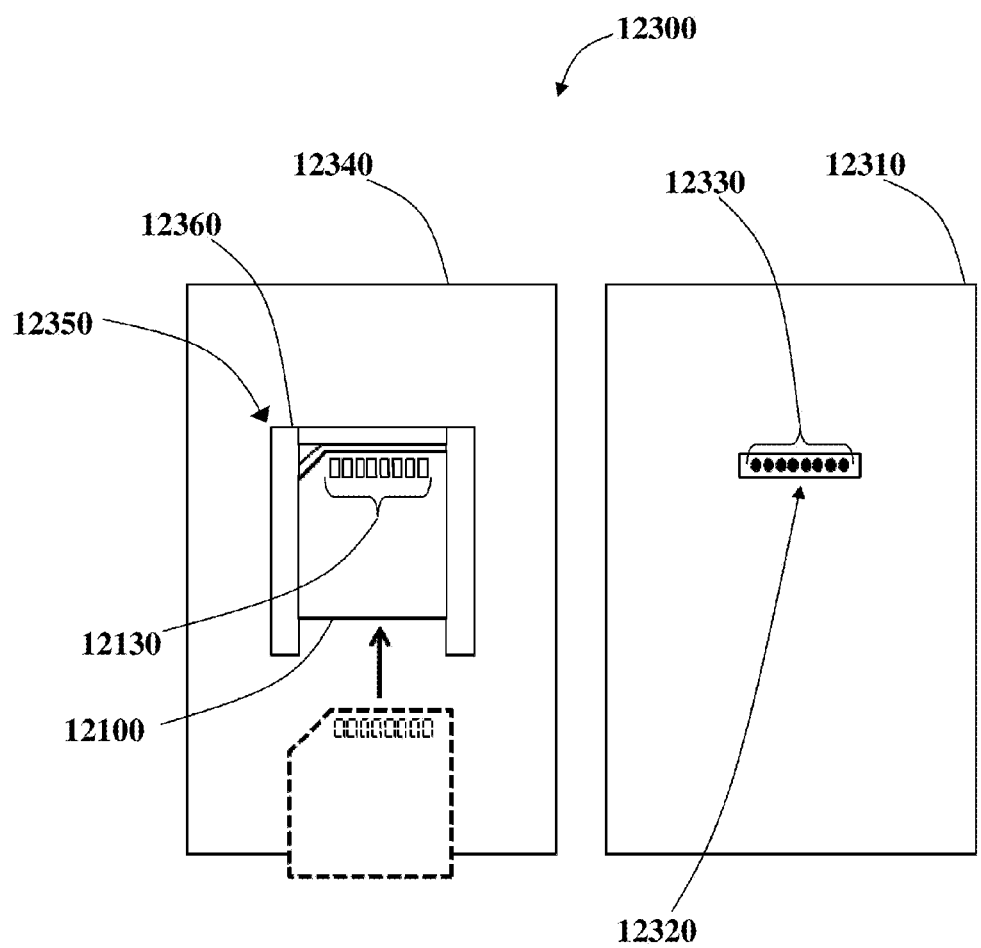
FIG. 17B shows a wireless power receiver inserted into a wireless power port of a host device.

Referring now to FIG. 17B, a wireless power port 12350 may be located in the interior surface of a removable back cover 12340 of a host device 12300, and may include a space available for the insertion of a wireless power receiver card 12100 and at least one securing mechanism 12360 for securing the wireless power receiver card 12100 in place. The securing mechanism 12360 may be sliding trails into which the sides of the wireless power receiver card 12100 are placed. Said sides may be chamfered to enable a secure fit. The back cover 12340 may be constructed of one or more non-metal materials. Further, the wireless power port 12350 may be configured to position the wireless power receiver card such that it can form an electrical connection (via one or more electrical contacts 12130) with the electrical contact unit 12320 of the host device 12300. The sliding trails 12360 and other securing mechanisms may position the wireless power receiver card 12100 such that, when the back cover 12350 is attached to the main body 12310 of the host device, the electrical contacts 12130 of the card 12100 is conductively connected to the electrical contacts 12330 of the electrical contact unit 12320.

Figure 18A:
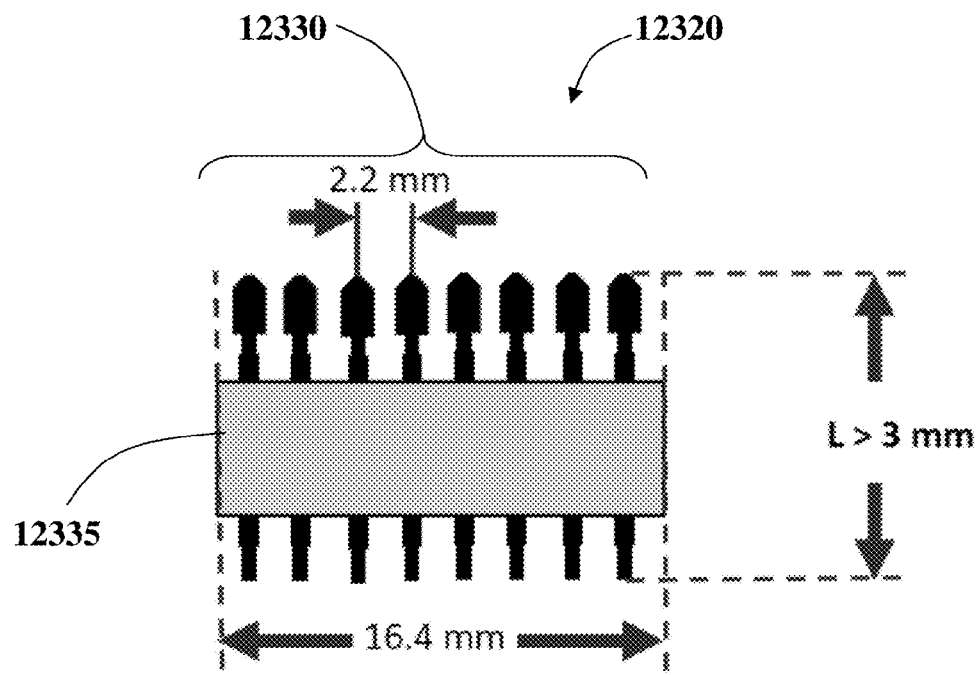
FIGS. 18A-B show a possible form factor of an electrical contact device.
Figure 18B:
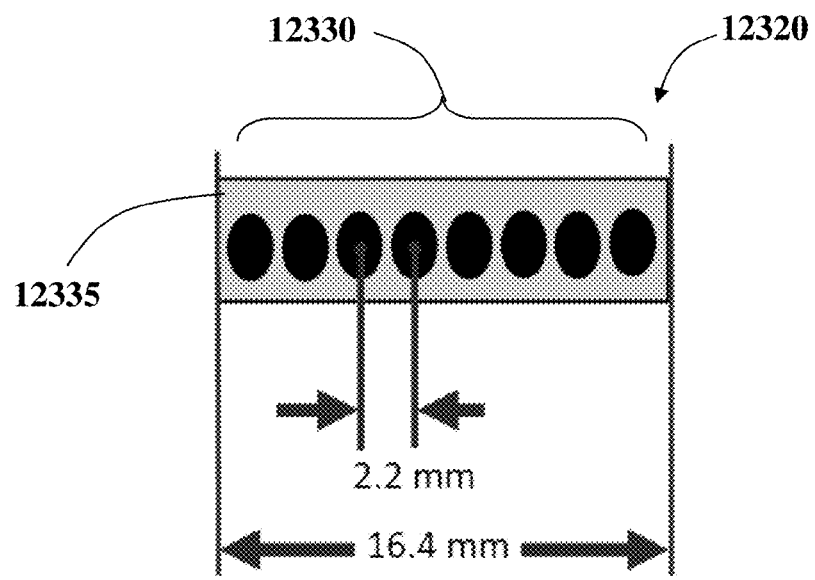

Referring now to FIGS. 18A-B (showing the top and side views, respectively), the electrical contact unit 12320 may include electrical contacts 12330 in a pogo-pin mechanism. That is, the electrical contacts 12330 may be spring loaded within a casing 12335. The dimensions of the components may be as shown in FIGS. 18A-B, or they may be in other dimensions, as needed.

Alternatively, the electrical contacts 12330 in the electrical contact unit 12320 of the host device 12300 may be leaf connectors. Typically, leaf connectors are used as the electrical contacts 12330 in the electrical contact unit 12320 where the attachment of the removable back cover 12340 to the main body 12310 of the host device 12300 requires a sliding action.

Figure 19:
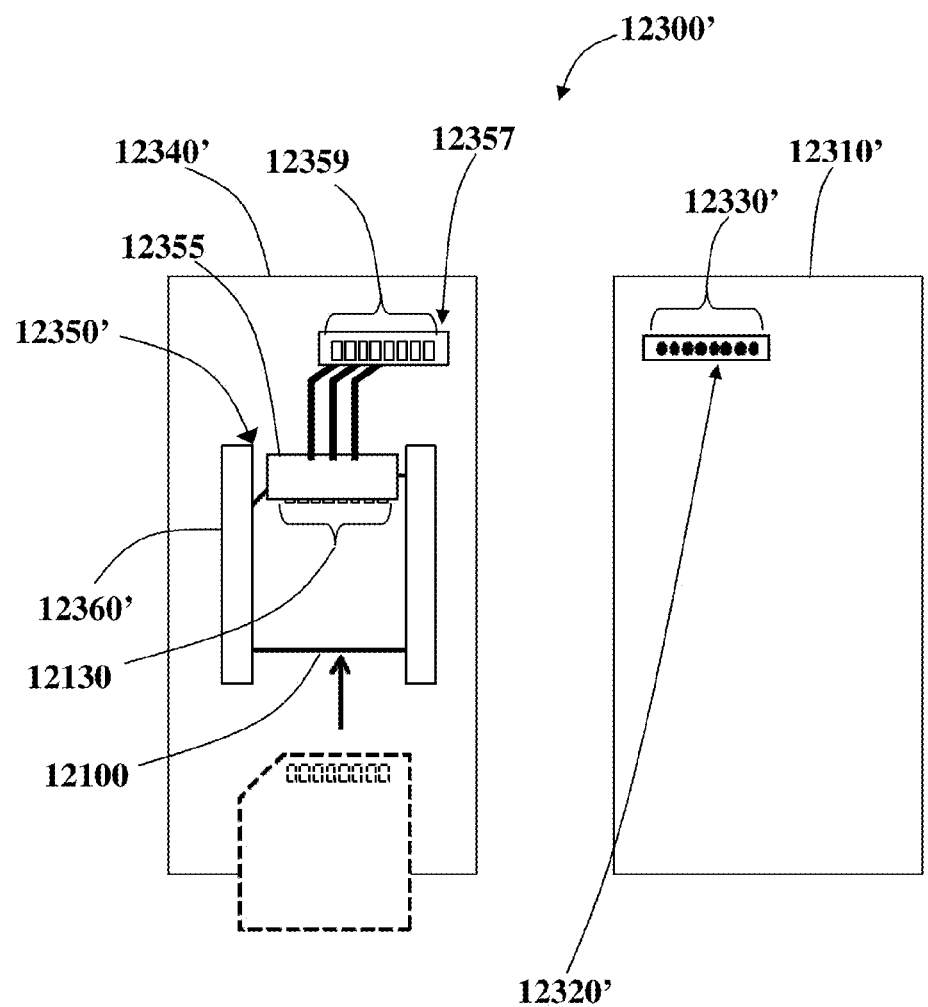
FIG. 19 shows a wireless power receiver inserted into a wireless power port of a host device.

In certain host devices, it may be impractical to position a wireless power receiver card on the back cover of the host device and an electrical contact unit on the main body of the host device such that their respective electrical contacts juxtapose to form a conductive connection. Referring now to FIG. 19, the back cover 12340' of the host device power port 12300' may include a power port 12350' including a bridge connector 12355 comprising electrical contacts (not shown) that form a conductive connection with the electrical contacts 12130' of the wireless power receiver card 12100 once inserted within the power port 12350', in addition to a space available for the insertion of a wireless power receiver card and at least one securing mechanism 12360' for securing the wireless power receiver card in place. The bridge connector 12355 may be wired to a pad array unit 12357 having electrical contacts 12359. The bridge connector 12355 and the pad array unit 12357 may be wired with a flexible printed circuit board (PCB). The pad array unit 12357 may be situated on the back cover 12340' such that such that it is capable of forming a conductive connection with the electrical contact unit 12320' on the main body 12310' of the host device 12300' (via the respective electrical contacts 12359 and 12330') when the back cover 12340' is attached to the main body 12310'. While FIG. 19 shows the pad array unit 12357 being located near the top right corner of the back cover 12340', it will be appreciated that the pad array nit 12357 may be situated anywhere on the interior surface of the back cover 12340', as needed, for matching the location of the electrical contact unit 12320'. The electrical contacts 12330' may be in any configuration to ensure a stable conductive connection with each other, for example in the form of pogo pins, leaf connectors or the like.

Figure 20A:
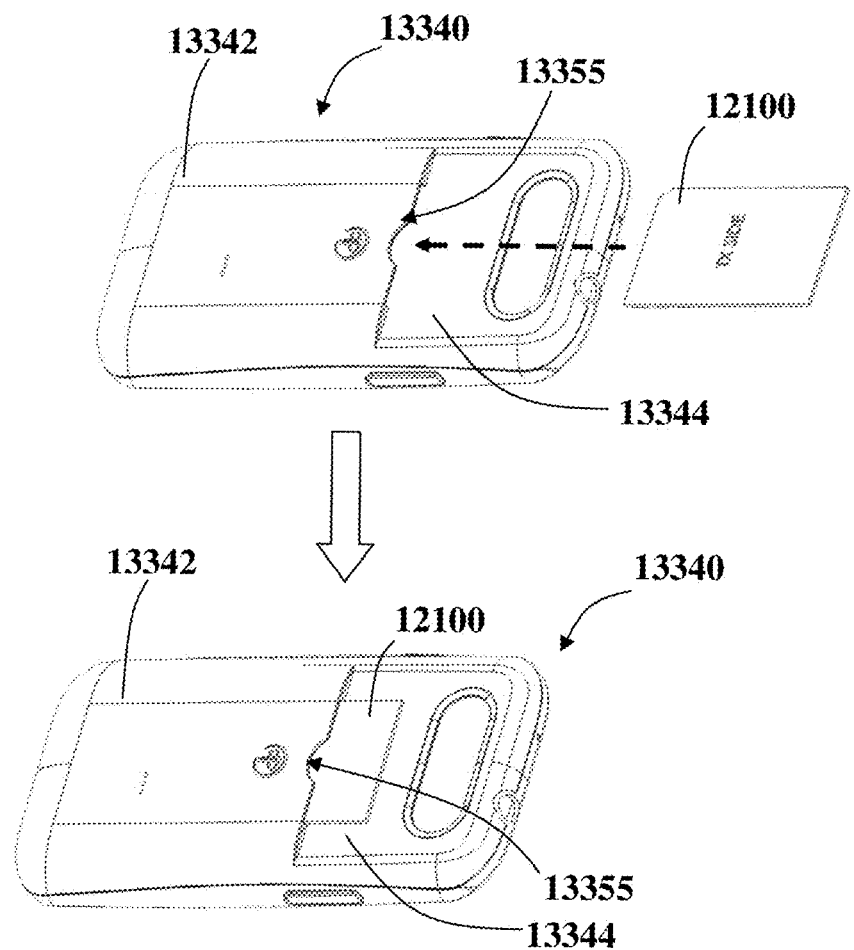
FIGS. 20A-C schematically represents the positioning of a wireless power receiver inserted into a wireless power port in the back cover of a host device.

Referring now to FIG. 20A, a host device may be configured such that the wireless power receiver 12100 may be insertable into and/or removable from a wireless power port 13350 through an exterior opening 13355 on the back cover 13340 of the host device, without disassembling the host device, e.g., by removing the back cover 13340 from the host device. The back cover 13340 may include an outer cover 13342 and an inner cover 13344, which are configured be combined and form the power port 13350 and the exterior opening 13355 therebetween. The outer back cover 13342 and the innver back cover 13344 may be constructed of one or more non-metal materials.

Figures 20B, 20C:
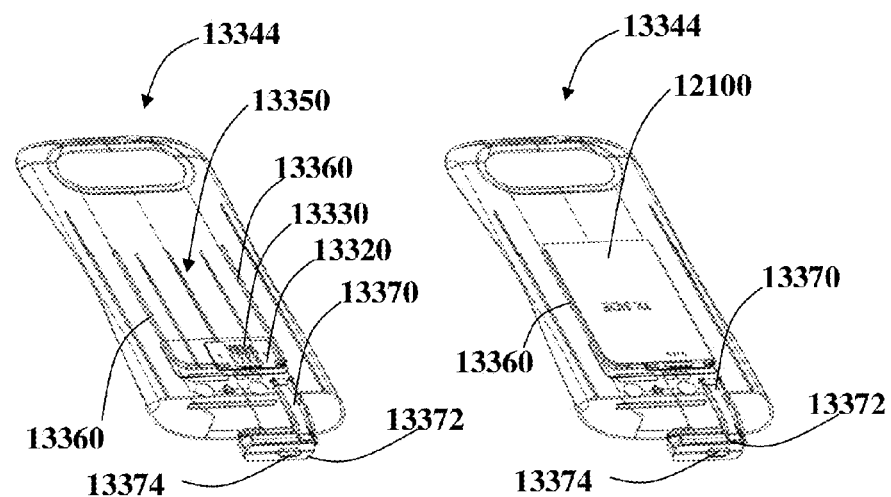

Referring now to FIGS. 20B-C, the inner back cover 13344 may include a space available for the insertion of a wireless power receiver card 12100 and at least one securing mechanism 13360 for securing the wireless power receiver card 12100 in place. The securing mechanism may be sliding trails into which the sides of the wireless power receiver card 12100 are placed. Said sides may be chamfered to enable a secure fit. Further, the wireless power port 13350, including but not limited to the securing mechanism 13360, may be configured to position the wireless power receiver 12100 such that, when the wireless power receiver 12100 is inserted into the wireless power port 13350, the electrical contacts of the card 12100 is conductively connected to the electrical contacts 13330 of the electrical contact unit 13320.

As shown in FIGS. 20B-C, the electrical contact unit 13320 may be conductively connected to the inner electronic components of the host device via an adapter connector 13370 and an adapter plug 13372. The adapter plug may include a socket 13374 configured to connect to a wired power source/data connection, e.g., a USB plug, a micro-USB plug, a nano-USB plug, or the like. With the adapter connector 13370 and adapter plug 13372, the host device is capable of receiving power and receiving/transmitting data through a wired connection via the socket 13374, as well as wirelessly through the wireless power receiver 12100.

Figures 20D, 20E:
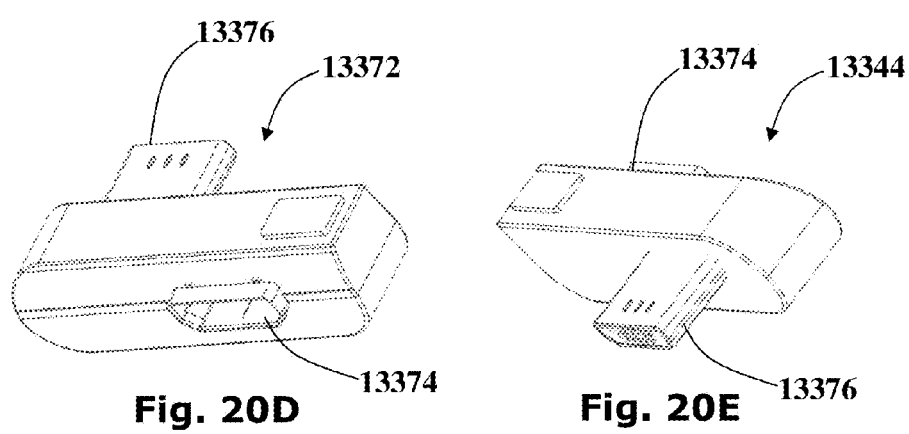
FIGS. 20D-E show a possible form factor of an adapter plug.
Figure 20F:
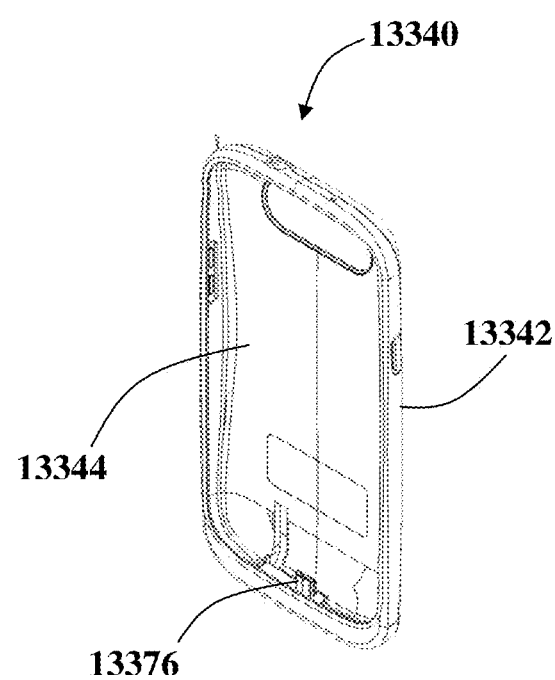
FIG. 20F shows a back cover of a host device having a wireless power port.

FIGS. 20D-E shows a detailed view of the adapter plug, with the socket 13374 and a host connector 13376, which is configured to make a conductive connection with the inner electronic components of the host device. FIG. 20F shows an assembled back cover 13340, showing the outer back cover 13342, the inner back cover 13344 and the host connector 13376.

Power Contacts and Data Contacts Between a Wireless Power Receiver and a Host Device The contacts between the wireless power receiving card (regardless of the particular form factor employed by a particular embodiment thereof) and the host device (e.g., via the electrical contact apparatus) may served by eight electrical contacts, some of which serve as power contacts and some of which serve as data contacts.

These contacts may include:
  a first contact GND, a power contact, having a current rating of, e.g., around 2 amp serving as a GND for the power supply;
  a second contact Vsupply (alternatively Vout), a power contact, having a current rating of, e.g., around 2 amp serving as a connection to the power supply input;
  a third contact SMB CLK (alternatively SCL), a data contact, having a current rating of, e.g., around 50 milliamps serving as a system management bus (SMB) clock signal connector;
  a fourth contact SMB DAT (alternatively SDA), a data contact, having a current rating of, e.g., around 50 milliamps serving as a system management bus (SMB) data signal connector;
  a fifth contact Spare/SWP, a data contact, having a current rating of, e.g., around 50 milliamps serving as a spare signal connector or a single wire protocol (SWP) connector, for example for NFC communication;
  a sixth contact Vcc, a power contact, having a current rating of, e.g., around 50 milliamps serving as a digital logic connector which may be driven by the device and/or the card;
  a seventh contact Ant1, a power contact, having a current rating of, e.g., around 2 amp serving as a first antenna lead for a possible NFC connection; and
  an eighth contact Ant2, a power contact, having a current rating of, e.g., around 2 amp serving as a second antenna lead for a possible NFC connection.

The wireless power receiver card may operate as a direct to battery power receiver where the wireless power receiver card may connect directly to the battery and provide controlled charger functionality. Alternatively, the wireless power receiver card may operate as a wall charger emulator, where the wireless power receiver card may emulate a power supply providing a fixed voltage of, e.g., about 5 volts, to an internal charger control unit.

Accordingly, the wireless power receiver card may behave differently according to the type of operation required. Selection between the operational modes may be determined by a SEL signal that may be latched at startup, possibly via the data contact SMB DAT. The Vsupply and GND pair may provide 1.5 A of current to and from the card.

The system management bus (SMB or SMBus) is a single-ended simple two-wire bus for the purpose of lightweight communication, derived from $I^2C$ (otherwise known as inter-integrate circuit or two-wire interface). In certain embodiments, the system may operate $I^2C$ instead of, or in addition to, SMB. Thus, with respect to the present disclosure, the phrase system management bus (SMB or SMBus) may refer to $I^2C$, in the alternate or in addition. The SMB signals may include the SMB CLK and SMB DAT signals. These may be compatible with the SMB definitions, and may be configured and operable to provide a communication channel from the card to the host device and optionally to the host device battery.

Bus termination resistors Rp may located on the device side. The value of the termination resistors may encode the NCS and SEL signals and may be latched at startup. The device may be operable to drive the bus termination resistors Rp resistors from the Vcc signal.

The SMB may be selected as it is often used for Laptops/Netbooks communication with their battery packs. It will be appreciated that other protocols may occur to those skilled in the art. Furthermore, other embodiments may allow the wireless power receiver card to communicate directly with the device battery. Still other embodiments may allow it to operate selectively as slave, for example for communication with the host device, or as master, for example for communication with the battery.

NCS signals may allow the device to communicate, for example, the number of cells its battery pack is using. The NCS signal may be encoded using a bus termination resistor Rp on the SMB CLK signal. The wireless power receiver card may be configured and operable to measure the resistor value at startup and latch the value for further operation. If the device is not driving the Vcc signal then the wireless power receiver card may optionally drive the Vcc signal to 3V to allow the resistor measurement.

For example an Rp value of 10 kilo-ohms may be used to encode a signal of 00; an Rp value of 15 kilo-ohms may be used to encode a signal of 01; an Rp value of 20 kilo-ohms may be used to encode a signal of 10; and an Rp value of 25 kilo-ohms may be used to encode a signal of 11. It will be appreciated that other codes may occur to those skilled in the art, as suit requirements.

The wireless power receiver card may be configured and operable to read the value of the NCS signal without the device being powered at all. This may be useful in protecting the device and the battery from a potential mismatched voltage supply from the wireless power receiver card.

The SEL signal may be used to select the type of supply operation in receive mode. The SEL signal may be coded using the Rp resistor on the SMB DAT signal. The wireless power receiver card may be configured and operable to measure the resistor value at startup and latch the value for further operation. If the device is not driving the Vcc signal then the wireless power receiver card may optionally drive it to 3V to allow the resistor measurement. Again, an Rp value of 10 kilo-ohms may be used to encode a signal of 00; an Rp value of 15 kilo-ohms may be used to encode a signal of 01; an Rp value of 20 kilo-ohms may be used to encode a signal of 10; and an Rp value of 25 kilo-ohms may be used to encode a signal of 11, with values of 10 and/or 11 indicating direct to battery operation while 00 and/or 01 indicating wall charger emulation. It will be appreciated that other codes may occur to those skilled in the art, as suit requirements.

The Vcc signal may be the power supply for the wireless power receiving unit's digital domain possibly, also serving to push the SMB via the Rp resistors. The Vcc signal may be connected via diodes to the device and/or the card drives. The wireless power receiving unit may drive the signal if it is connected to a transmitter. The device may drive the signal in other cases. To facilitate this setting the drive voltage from the card may be 3.3 volts while the drive from the device side may be set to 3 volts.

Where appropriate, the Ant1 & Ant2 signals may provide access to a card antenna. An NFC circuit (e.g. an NFC transceiver) may connect to these signals and use the wireless power receiving unit's antenna for NFC operation. The design of the WiCC circuitry may expose high impedance at the operational range of the NFC signals.

Alternatively, the contacts between the wireless power receiving card and the electrical contact apparatus may include the data and power contacts according to Table 1:

TABLE I

Data and Power Contacts

| Signal # | Name | Type | Current rating | Descripton |
|---|---|---|---|---|
| 1 | ANT1 | Power | 2 A | Antenna lead 1 (for optional NFC connection) |
| 2 | ANT2 | Power | 2 A | Antenna lead 2 (for optional NFC connection) |
| 3 | Vcc | Power | 50 mA | 3 V supply to Slot Card. |
| 4 | SCL | Data | 50 mA | $I^2C$ clock signal |
| 5 | SDA | Data | 50 mA | $I^2C$ data signal |
| 6 | DISABLE | Data | 50 mA | Active high disable signal |
| 7 | VOUT | Power | 2 A | Connection to power supply input |
| 8 | GND | Power | 2 A | GND for power supply |

There are two possible types of electrical integration of a slot card with a host device:

Type IA—minimal interface of power signals and basic enablement. The Slot Card functions according to default configuration and does not support communication with the host device for control of its parameters. In the case of Type IA, only the DISABLE, Vout and GND signals may be in operation.

Type IB—in addition to power signals, a communication interface between the slot card and host device may be supported. In the case of Type IB, one or more of the remaining signals may be in operation.

Integration to a host device that is designed to work with Type IB Slot Card may be configured to accept a Type IA Slot Card, but will not be able to change its default behavior or to receive full communication from it. The slot card may provide the required voltage that is used by the host device's on-board circuitry to charge its internal battery, or supply the internal load.

The VOUT and GND pair may be configured to provide up to 2 A of current to and from the slot card. The slot card may be configured to provide a fixed 5V (+/−5%) on this pair of lines when it is on top of an active transmitter and it is enabled by the control bus, or enable signal. Voltage may decrease if the Slot Card applies current limiting.

Communication between the host device and the slot card may be performed via the SCL and SDA signals. The I²C signals include the SCL and SDA signals, which may be compatible with the I²C or SMB definitions, and may be designed to provide a communication channel from the Slot Card to the host device and optionally, to the device battery. The I²C may be implemented by an I²C interface that is common on all handset application processors. The signals may be weakly pulled high by the host device using pull-up resistors of 20 kΩ connected to the host device VIO supply of 1.8V. The host and slot card actively pull signals to the Low state for '0' state and float the bus for '1'.

The slot card may support optional interrupt generation from slot card to host device. If enabled, the slot card may pull the SDA signal to zero for ~10 microseconds to indicate the status change. The host device can then use the standard I²C transaction to query the slot card for its exact status.

The DISABLE signal may used by the host device to disable charging (by pulling the signal to '1'). The DISABLE signal may be connected internally in the slot card to GND via a resistor. An unconnected DISABLE signal will therefore be guaranteed to be at '0' state, allowing charging.

The exact behavior of the clot card in response to this signal may depend on its operational state (whether or not it is connected to a transmitter), and host device setting of the slot card's secondary inductor terminate register. The slot card behavior for the different states may be according to Table 2:

TABLE 2

Slot Card behavior for different states

| DISABLE signal state | Slot Card is active on transmitter & Terminate register = 0 | Slot Card is active on transmitter & Terminate register = 1 | Slot Card is not active on transmitter |
|---|---|---|---|
| '1' | Disable power output to Host. Continue standard PMA protocol exchange with wireless power transmitter | Disable power output to Host. Send end-of-charge signals to wireless power transmitter | Slot Card signaling is disabled. The Slot Card will not respond to any digital ping |
| '0' | Power outputs are enabled. Signaling is active as per PMA protocol | | Slot Card signaling is enabled. The Slot Card will respond to digital pings |

When the DISABLE signal is pulled high ('1'), the slot card will disable its power output.

If Terminate register is '1' (default behavior) then, if it is connected to a transmitter, it will send an EOC signal and it will not send any signals to transmitters, even if digital ping is detected.

If Terminate register is '0', the slot card will function normally and respond to transmitters, but its power output to the host device will be switched off.

When the DISABLE signal is pulled low ('0') the slot card may resume charging operation.

When the slot card is connected to a wireless power transmitter, it may re-enable its power output and continue charging operation. If the slot card is not connected, then it will be ready to respond to any digital ping initiated by a valid wireless power transmitter.

A type IB slot card may also be configured to disable charging via the I²C transactions. In such a case, charging will be enabled only if both the DISABLE signal is at '0' and the I²C controlled enable bit is activated.

The Vcc signal line allows the host to supply power to the slot card controller when it is not drawing power from a wireless transmitter. The host device may be configured to provide a fixed voltage between 2.7-3.3V. The maximal current draw by the slot card may be 10 mA or less.

The ANT1 and ANT2 signals may provide access to an optional NFC antenna within the slot card. An NFC transceiver may connect to these signals and use the Slot Card antenna for NFC operation. The design of the slot card circuitry may expose high impedance at the operational range of the NFC signals.

Electronic Integration of the Wireless Power Receiver and the Host Device

Figure 21A:
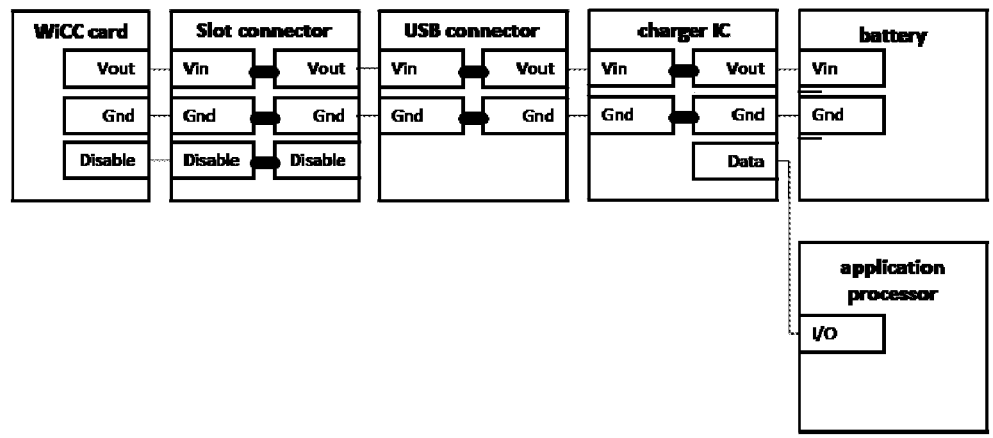
FIG. 21A schematically represents the electrical integration between a host device and a wireless power receiver ("WiCC") that is used as a single power source for the host device.

Reference is now made to FIG. 21A. The wireless power receiver ("WiCC") may be used as a single power source for the host device, for example use the WiCC as the input via a wireless power port ("slot connector") for a USB connector. In such a case, the WiCC output may go through the host charger power management integrated circuit ("charger IC") and then to the battery inputs. Further, the host application processor may not control the DISABLE signal of the wireless power receiver.

Figure 21B:
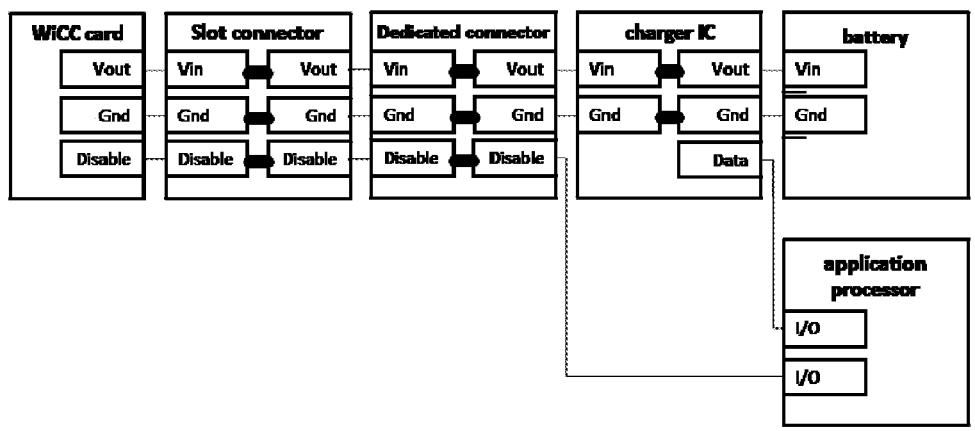
FIG. 21B schematically represents the electrical integration between a host device and a wireless power receiver ("WiCC") that is used as the sole power source for the host device, which incorporates a wireless power port ("slot connector") for the WiCC.

Reference is now made to FIG. 21B. The WiCC may be used as the sole power source for the host device that incorporates a wireless power port ("slot connector") for the wireless power receiver. In such a case, the wireless power receiver output may go through the host device charger IC and then to the battery inputs. A host device processor, e.g., and application processor, may control the disabling of the WiCC with the DISABLE signal through a dedicated connector and may also control the connection through the charger IC.

Figure 21C:
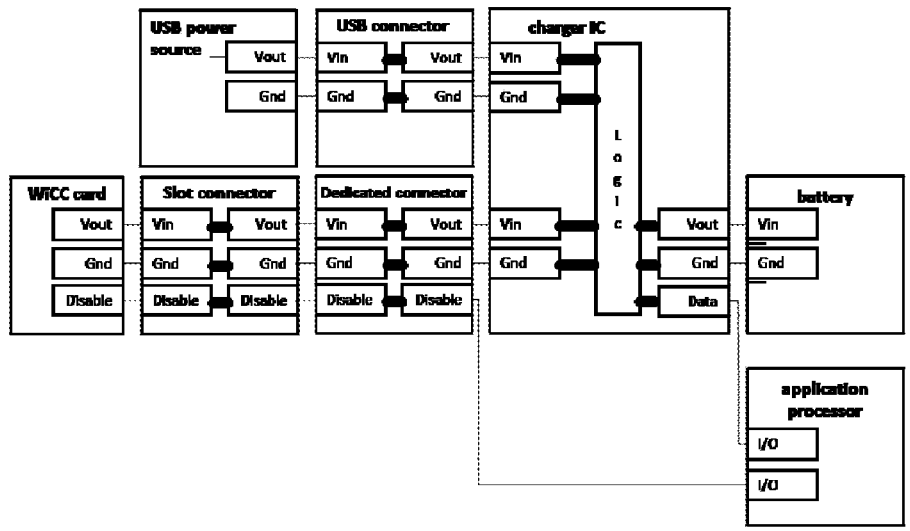
FIG. 21C schematically represents the electrical integration between a host device and a wireless power receiver ("WiCC"), where the host device has two separate charging inputs.

Reference is now made to FIG. 21C. The charger IC of the host device may have two separate charging inputs to support two separate sources: (1) the WiCC—via a slot connector; and (2) a wired power input, e.g., USB power source, a micro-USB power source or the like. A host device processor, e.g., an application processor, may control the charging of each of these sources separately.

Figure 21D:
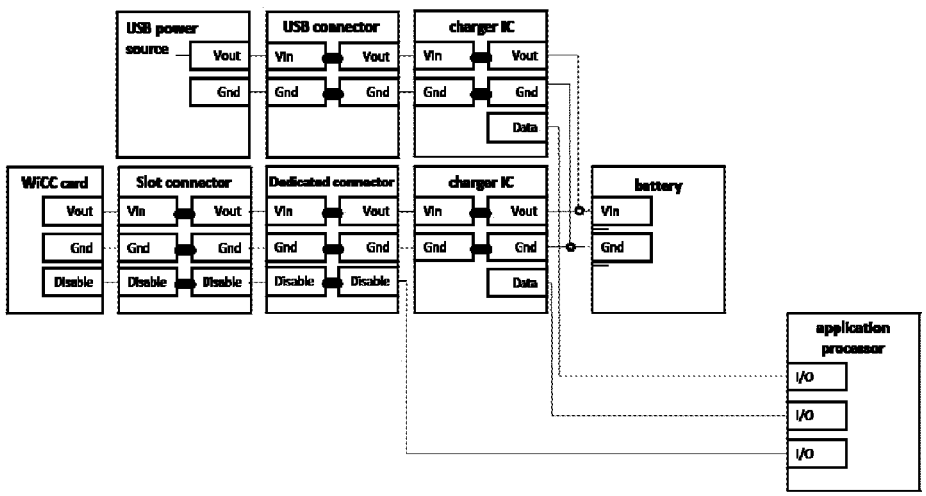
FIG. 21D schematically represents the electrical integration between a host device and a wireless power receiver ("WiCC"), where the host device have two input connectors and two charger IC units.

Reference is now made to FIG. 21D. The host device may have two input connectors (e.g., one WiCC connector and one connector for a wired power source such as micro-USB) and two charger IC units, each dedicated for each connector. For such a configuration, a host device processor, e.g., an application processor, may control each charger to receive charging indications and control their outputs.

Figure 21E:
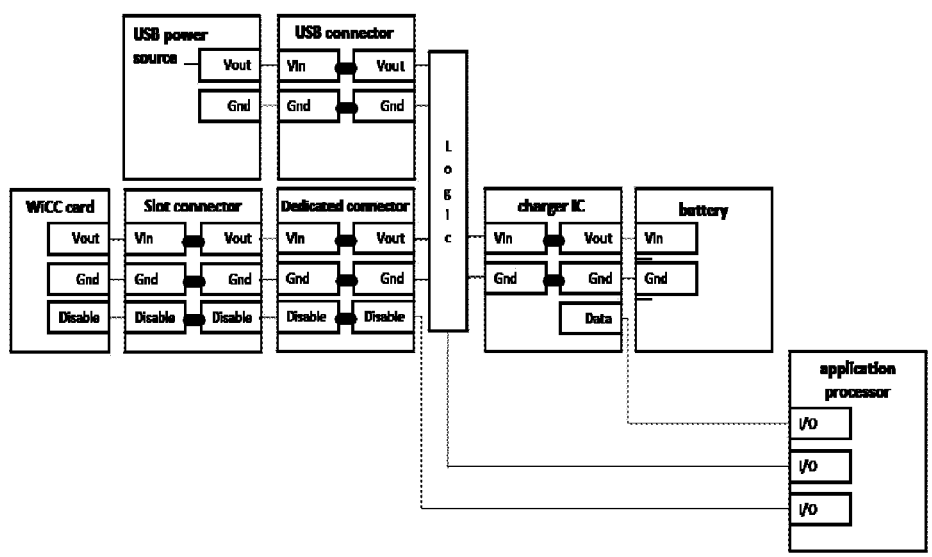
FIG. 21E schematically represents the electrical integration between a host device and a wireless power receiver ("WiCC"), where the host device includes a charger IC that has a single charging supply, and two inputs are supported through a logic power switch.

Reference is now made to FIG. 21E. The host device may include a charger IC that has a single charging supply. Two separate power sources: (1) the WiCC—via a slot connector; and (2) a wired power input, e.g., USB power source, a micro-USB power source or the like may be supported through connecting to the charger IC via a logic power switches between the two power sources.

Parameters for Disabling of the Wireless Power Receiver

The wireless power receiver card may be configured to terminate its operation and enter an end-of-charge state (EOC) under various conditions, including:

Load presence: a lack of connection to an electrical load to provide power to or charge. When the wireless power receiver card is active and the current flowing to the host device is lower than a no-load threshold current (Inl) for a predetermined period of time (Tnl), the No Load condition is set and the wireless power receiver card terminates its power output.

Time overage: The power output from the wireless power receiver has been ongoing beyond a predeterimed amount of time.

Output current level: The current output to the host device is too too high or too low.

Input voltage level: The voltage of the current induced in the secondary inductor is too high Output voltage level: The voltage of the power output to the host device is too high.

Temperature level: The temperature of the card is too high or too low.

Presence of wired power or data input: The host device is connected to a wired power and/or data input, e.g., a USB connection.

Disable signal: The wireless power receiver card terminates its power output if it receives a disable signal from the host device.

One or more of the above parameters may be configured by the host device, which transmits the parameters to the wireless power receiver through the data connection. In some cases, the configuration data may further be transmitted wirelessly, as needed, to the wireless power transmitter.

Some of the above paramaters may be predetermined, and may be in accordance with Tables 3 and 4:

TABLE 3

Time parameters

| Parameter | Symbol | Min | Typical | Max | Units |
|---|---|---|---|---|---|
| EOC threshold current | $I_{EOC}$ | 70 | 80 | 90 | mA |
| Time to enter EOC | $t_{EOC}$ | 175 | 180 | 185 | sec. |
| Time to enable EOC for charging completed | $t_{EOC\_EN}$ | 29 | 30 | 31 | Minutes |

TABLE 4

Protection parameters

| Parameter | Symbol | Min. | Typical | Max. | Units |
|---|---|---|---|---|---|
| Rectified input over voltage protection threshold | $V_{OVP\_IN}$ | 14.5 | 15 | 15.5 | V |
| Output over voltage protection threshold | $V_{OVP\_OUT}$ | 6 | 6.5 | 7 | V |
| Over current protection, high limit threshold | $I_{LIM\_HIGH}$ | 1.1 | 1.3 | 1.5 | A |
| Over current protection, low limit threshold | $I_{LIM\_LOW}$ | 0.6 | 0.7 | 0.8 | A |
| Output voltage at current limit | $V_{OUT\_ILIM}$ | 4.2 | | 5 | V |
| Temperature threshold to limit the current | $T_{LIM}$ | 43 | 45 | 47 | ° C. |
| Hysteresis temperature | $T_{HYS}$ | 3 | 5 | 7 | ° C. |
| Over temperature protection threshold | $T_{Max}$ | 58 | 60 | 62 | ° C. |

Once the wireless power receiver enters an EOC state, it may transmit a signal to instruct the wireless power transmitter to terminate the activation of the primary inductor and enter a standby mode.

Power Supply Functionality

The direct to battery mode of operation may allow for connection of the wireless power receiver card directly to the battery of the device. The wireless power receiver card may be operable to perform the functionality commonly embedded in battery charger circuitry. The wireless power receiver card controller may support some degree of autonomous operation allowing charging of the battery when the host device is not operational due to battery depletion. When battery reaches the required minimal charging level and host device resumes operation, the control over the parameters of charging may be set by the host device and implemented by the wireless power receiver card circuitry.

In some embodiments, the wireless power receiver card may be set by default to supply trickle charging current to the battery of 50 milliamps, say for the first class of card and 100 milliamps or so for the second and/or third class of card. Where appropriate a threshold may be set, for example in some embodiments, the current may be provided only if battery voltage is lower than, say N*3.6 volts, where N is the number of cells in the battery pack as indicated by the NCS signal.

The wireless power receiver card may allow setting of target charge current or target voltage. Once the target is set, the wireless power receiver card may monitor the current or voltage to match the defined setting. Furthermore, overvoltage and/or overcurrent thresholds may be set such that charging may be suspended if these limits are reached. Optionally, the voltage target may be set with resolution of 50 millivolts while the current is set in steps of 10 milliamps. The voltage tolerance of the wireless power receiver card may be +/−25 millivolts, and the current tolerance of the wireless power receiver card may be +/−5 milliamps. Maximal current may depend upon the wireless power receiver card class and number of cells being charged. Setting of the threshold values may be accomplished via the SMB.

Optionally, a wireless power receiver unit that has not been configured by its host device may be configured to operate in the autonomous mode. If battery voltage drops below 3.4 volts*N and no SMB activity has been detected for the last 10 seconds, then the wireless power receiver unit may revert to trickle charge mode of operation. The above procedure is used in order to compensate for unexpected shutdown of the host device.

Where appropriate, in the wall charger emulation operation the wireless power receiver card may be setting by default the power output to fixed voltage of N*4.2+0.8 volts, where N is the number of cells as indicated by the NCS signal.

The device controller may override this setting by using the SMB. Values that are lower than a threshold of say N*3.6 volts may be rejected in order to prevent lockup of charging function. The wireless power receiver card may by default use an over current threshold that is equal to the current rating, and limit the current if that threshold is crossed.

The overcurrent threshold may be programmed by the host device to lower values down to the trickle current by the host device via the I²C or the SMB.

For a wireless power receiver that includes a transmitter capability, the wireless power receiver card may be supplied via the Vsupply signal. By default the transmitter may not draw more than 500 milliamps from the supply.

The host device may enable higher current to be drawn by programming the current drawn using the I2C or SMB. The current may be limited to the maximal rated currents.

The drawing of current may be terminated and reset to default values if the voltage on the supply signals drops below N*3.4 volts (where N is the number of cells as indicated by NCS signal) or below 4.4 volts if fixed USB supply (say NCS=3) mode is used.

The wireless power receiver may include an over-temperature detector, and be configured to terminate operation with the wireless power transmitter if the temperature goes above a termination temperature threshold, $T_{term}$, e.g., of about 60° C. The wireless power receiver may further be configured to limit its output current to a lower current, Ilow, when a lowering temperature threshold, $T_{low}$, (which is set at a lower temperature compared to $T_{term}$) is crossed, and will return to normal operation when the temperature goes below $T_{low}$. In addition, the wireless power receiver may be configured to terminate operation if the temperature goes below a minimum temperature threshold of, e.g., 5° C. or 2° C.

In an exemplary embodiment, the wireless power receiver may have one more of the electrical features as defined in Table 5:

TABLE 5

WiCC signals

| Parameter | Symbol | Min. | Typical | Max. | Units |
|---|---|---|---|---|---|
| Output voltage | $V_{OUT}$ | 4.75 | 5 | 5.25 | V |
| Output current | $I_{OUT}$ | | 1 | 1.5 | A |
| System efficiency | η | | 70 | | % |
| System switching frequency | $F_{SW}$ | 100 | | 500 | kHz |
| Communication signals frequency | $F_{COMM}$ | 0.25 | | 8 | kHz |
| Maximum temperature | $T_{max}$ | | | 60 | ° C. |
| DISABLE input voltage-active high | $V_{DIS}$ | 1.8 | 3 | 5 | V |

$F_{COMM}$: The wireless power receiver card may communicate information with the wireless power transmitter by changing the load seen by the wireless power transmitter. This load variation results in a change in the transmitter coil current, which may be measured and interpreted by a processor in the inductive power transmitter. The inductive power receiving card may be configured to have this load variation occur at a range of frequencies, defined as $F_{COMM}$, in order to encode the information.

System Efficiency: Power transfer between the primary inductor in the wireless power transmitter and the secondary inductor in the wireless power receiver may be about 70%.

Communication Protocol

Various communication protocols may be used between the wireless power receiver unit and the host device. The communication protocol may be based on transactions over the SMB of the wireless power receiver card connector. Where appropriate, the wireless power receiver card may operate as a slave on the SMB. For example, it may use a fixed address, say 0x10101111. Accordingly, the wireless power receiver card may uses a Read and Write word protocol option of the SMB such that for each transaction of 4 bytes: the first byte includes the 7 bit address followed by the R/W bit, the second byte includes a command code and the third and fourth bytes are the command data (read or write).

Commands may be provided allowing the host device to query information regarding the wireless power receiver card identification including the card class, registration number for establishing validity/security, capabilities (e.g., embedded NFC (receiver and/or transmitter), charger emulation, direct to battery charging and NCS capability), supported standards, manufacture code, model number, serial number, statutes and control of the wireless power receiver. It may allow reading or setting of operational parameters such as the voltage (e.g., in millivolts) that the wireless power receiver is currently providing (or is set to provide), the current (e.g., in milliAmperes) that the wireless power receiver is currently providing (or is set to provide), the setting of the overvoltage protection, setting of the overcurrent protection, access to the 16 word FIFO of data received/transmitted from the transmitter to the host device via the wireless power receiver, setting of the maximal current draw allowed to the transmitter (e.g., in milliAmperes), setting a pointer to the specific receiver information to be read, reading or setting the current provided to the specific client by the transmitter, reading or setting the specific client identification info, access to the 16 word FIFO of data received/transmitted from the transmitter, state of host device initialization, whether or not the wireless power receiver is coupled to a wireless power transmitter, whether or not the wireless power transmitter is active, the number of other wireless power receivers coupled to the wireless power transmitter, the NCS value as latched on startup, the SEL value as latched on startup, presence of pending data to host device, and the status of FIFO.

In some standards the protocol may allow reading of the remote receiver's identification information. The protocol may provide for bi-directional communication channel between the transmitter and receivers to allow the host and the wireless power transmitter to communicate via the wireless power cards.

The communication channel may provide low throughput data mainly targeting mutual authentication and simple token exchanges.

NFC Integration

Optionally wireless power receiver units may enable integration of Near Field Communication (NFC) functionality on board or allow for sharing of the wireless power receiver's inductor antenna by an external NFC circuit (e.g. an NFC transceiver) located in the host device.

For the case of a wireless power receiver with integrated NFC, the NFC transceiver control may be performed via the SMB signals. The NFC device may be connected in parallel to the inductive power receiver controller. The NFC device may use a different address as to allow the host device access each of the devices with no contention. For NFC transceivers that support SWP connection to UICC card, the Spare line of the inductive power receiver connector will be used for connection to the device UICC card.

Wireless power receiver cards that do not include the NFC transceiver may be operable to enable the sharing of the wireless power antenna with NFC circuitry on the host device. Accordingly, connection to the antenna may be provided via the Ant1 & Ant2 signals and terminals such as described herein.

User Interface

Various user interface indications may be included on wireless power receiver card enabled devices. For example, the status bar of a device UI may present an icon when the wireless power receiver card is connected and charging from a transmitter. By clicking on the icon, a secondary window may open up to display selected information relating to the wireless charging function, such as UPWM class, standard, manufacture, current charging current and estimated time to full battery charging. Optionally, the icon may replace the icon for power line charging.

The status bar of the device may present the wireless charging icon whenever the wireless transmitter function is active. The number of active receivers that are connected to the transmitter should appear on top of the icon. By clicking on the icon, a secondary window may open up to display the information relating to the wireless charging transmitter function. The displayed information may include the connected receivers. Clicking on each one of them will open a third window with info on the specific receiver.

Reporting on connection and disconnection from wireless power transmitter or receiver should be provided. Reporting could be audible with blinking of the logos on the statues bar or by popping up indication windows as appropriate.

Thus, embodiments disclosed herein provide a low profile electronic system for inductive charging of the power pack of an electrical device ("host device") as well as wireless charging enabled power pack. The system may use a number of innovative features for reducing dimensions such as the use of application specific integrated circuits (ASIC) and various heat reduction features.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A retrofittable wireless power receiver for providing inductive power reception functionality to at least one host device, said retrofittable wireless power receiver comprising:
   a support platform;
   a secondary inductor operable to couple inductively with a primary inductor associated with a wireless power transmitter;
   a power reception circuit operable to control inductive power transfer from the primary inductor to the host device;
   a synchrorectifier;
   a near field communication antenna; and
   an array of electrical contacts comprising:
      a VOUT and GND pair of terminals wired to said sychrorectifier;
      a DISABLE terminal wired to said power reception circuit and configured to disable power transfer; and
      a pair of data contacts wired to said near field communication antenna.

2. The retrofittable wireless power receiver of claim 1, wherein said power reception circuit comprises a signal transmission circuit for passing feedback signals to the wireless power transmitter for regulating power transfer, said signal transmission circuit comprising at least one electrical element connectable to the secondary inductor according to a modulated signal.

3. A retrofittable wireless power receiver for providing inductive power reception functionality to at least one host device, said retrofittable wireless power receiver comprising:

a secondary inductor operable to couple inductively with a primary inductor associated with a wireless power transmitter;

a synchrorectifier;

a signal transmission circuit for passing feedback signals to the wireless power transmitter for regulating power transfer, said signal transmission circuit comprising at least one electrical element connectable to the secondary inductor according to a modulated signal; and an array of electrical contacts for conductively connecting the retrofittable wireless power receiver to a host device.

4. The retrofittable wireless power receiver of claim 3, wherein said array of electrical contacts comprises a VOUT and GND pair of terminals.

5. The retrofittable wireless power receiver of claim 4, wherein said VOUT and GND pair are configured to provide an output of 5V.

6. The retrofittable wireless power receiver of claim 3, wherein said array of electrical contacts comprises a DISABLE terminal configured to disable charging.

7. The retrofittable wireless power receiver of claim 3, wherein said array of electrical contacts comprises a DISABLE connected to a GND terminal via a resistor.

8. The retrofittable wireless power receiver of claim 3, wherein said array of electrical contacts further comprises a pair of data contacts.

9. The retrofittable wireless power receiver of claim 8, wherein said pair of data contacts are wired to a near field communication antenna.

10. The retrofittable wireless power receiver of claim 3 further comprising at least one magnetic shield for guiding magnetic flux away from electrical components of said host device.

11. The retrofittable wireless power receiver of claim 3, wherein said array of electrical contacts.

12. The retrofittable wireless power receiver of claim 3, wherein said signal transmission circuit is further configured to automatically terminate the charging process.

13. The retrofittable wireless power receiver of claim 3 further comprising a support platform.

14. The retrofittable wireless power receiver of claim 13, wherein said support platform comprises a rigid material.

15. The retrofittable wireless power receiver of claim 14, wherein said rigid material comprises a card.

16. The retrofittable wireless power receiver of claim 14, wherein said rigid material comprises a back cover of said host device.

17. An electrical device comprising:

a host charger power management integrated circuit wired to a battery;

a wired power input comprising a first VOUT and GND pair of power connectors wired to a first pair of charging inputs of the host charger power management integrated circuit;

a wireless power port for conductively connecting with a retrofittable wireless power receiver said wireless power port comprising a second VOUT and GND pair of power connectors wired to a second pair of charging inputs of the host charger power management integrated circuit; and a power DISABLE connector for communicating a DISABLE signal to disable charging.

18. The electrical device of claim 17 further comprising at least one pair of data contacts wired to a near field communication unit, said data contacts configured to couple with corresponding data contacts of said retrofittable wireless power receiver thereby providing a conductive path to a near field communication antenna wired to said corresponding data contacts.

19. The electrical device of claim 17 further comprising an application processor operable to control disabling wireless charging via said DISABLE connector.

20. The electrical device of claim 17, wherein said wired power input comprises a USB power connector.

* * * * *